(12) United States Patent
Kim et al.

(10) Patent No.: US 7,283,770 B2
(45) Date of Patent: Oct. 16, 2007

(54) IMAGE FORMING APPARATUS ADAPTED TO OVERLAP IMAGE ERRORS FROM DRIVING UNIT AND IMAGE BEARING BODIES AND METHOD OF MANUFACTURING SAME

(75) Inventors: Hyun-Soo Kim, Yongin-si (KR); Geun-Yong Park, Suwon-si (KR); Seock-deock Hong, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 127 days.

(21) Appl. No.: 11/167,447

(22) Filed: Jun. 28, 2005

(65) Prior Publication Data
US 2005/0286932 A1    Dec. 29, 2005

(30) Foreign Application Priority Data
Jun. 28, 2004   (KR) ...................... 10-2004-0048837
May 24, 2005   (KR) ...................... 10-2005-0043735

(51) Int. Cl.
G03G 15/00   (2006.01)
G03G 15/01   (2006.01)

(52) U.S. Cl. ...................... 399/167; 399/301
(58) Field of Classification Search ................ 399/116, 399/117, 121, 159, 167, 299, 301, 302, 308; 347/115, 116

See application file for complete search history.

(56) References Cited

U.S. PATENT DOCUMENTS 6,324,355 B1 * 11/2001 Matsui et al. ........... 399/167 X
6,507,713 B2 *  1/2003 Koide ................... 399/167 X

FOREIGN PATENT DOCUMENTS

| JP | 10-339976 | * 12/1998 |
| JP | 2001-324909 | 11/2001 |
| JP | 2002-304106 | 10/2002 |
| KR | 1999-017425 | 3/1999 |

* cited by examiner

Primary Examiner—Sandra L. Brase
(74) Attorney, Agent, or Firm—Roylance, Abrams, Berdo & Goodman, L.L.P.

(57) ABSTRACT

An image forming apparatus has a plurality of image bearing bodies in a predetermined sequence, an intermediate transfer medium for running in contact with each of the plurality of image bearing bodies, and a plurality of supporting rollers for driving the intermediate transfer medium. At least one image bearing body and at least one supporting roller are arranged such that a radius deviation of the image bearing body is in registration along a transfer medium with a radius deviation of the supporting roller.

18 Claims, 30 Drawing Sheets

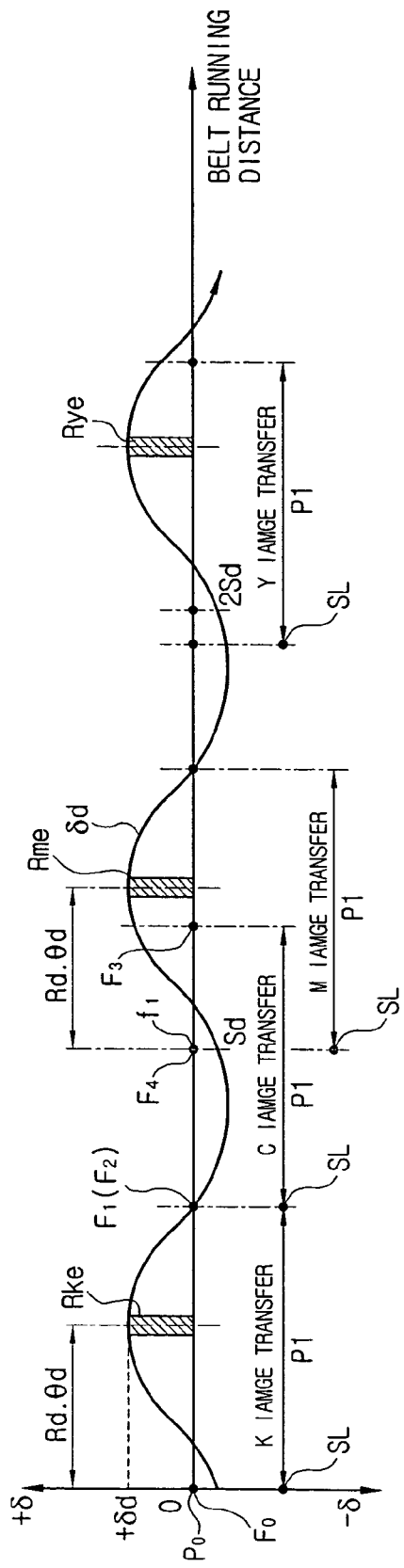

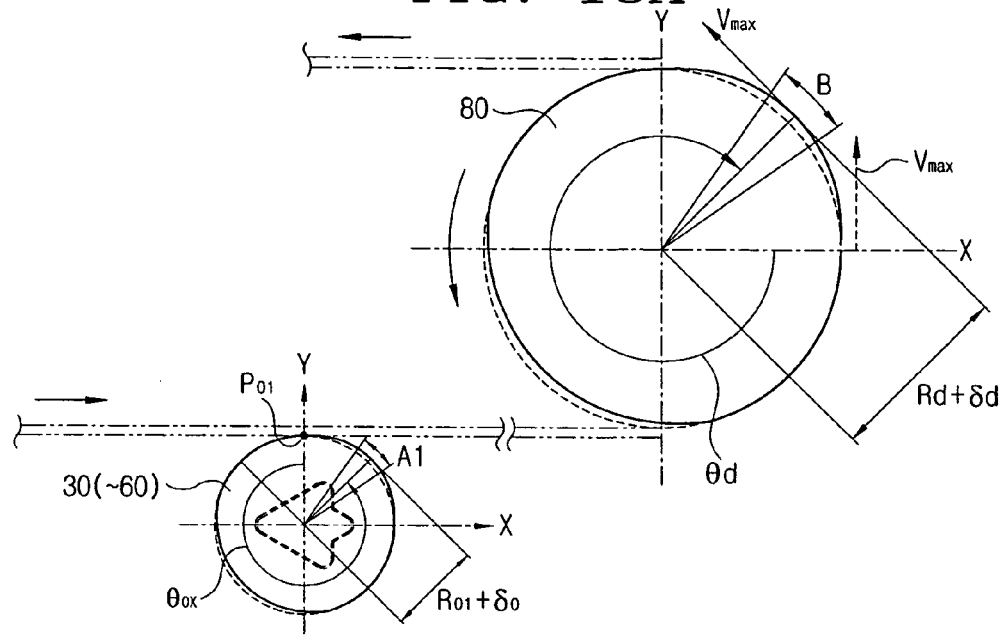
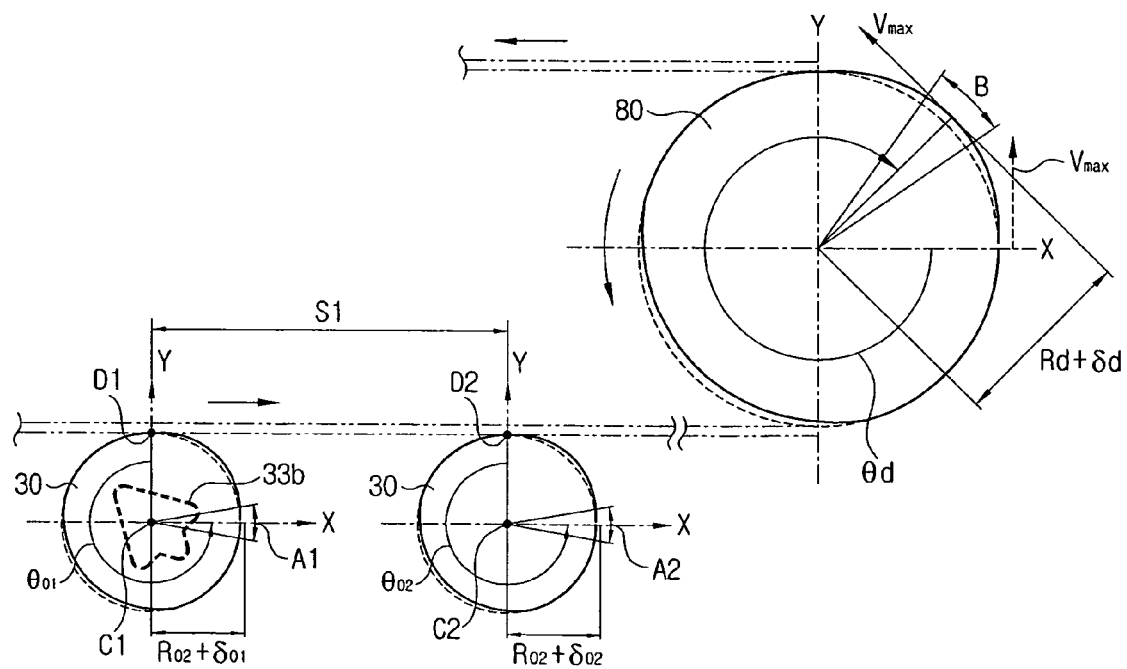

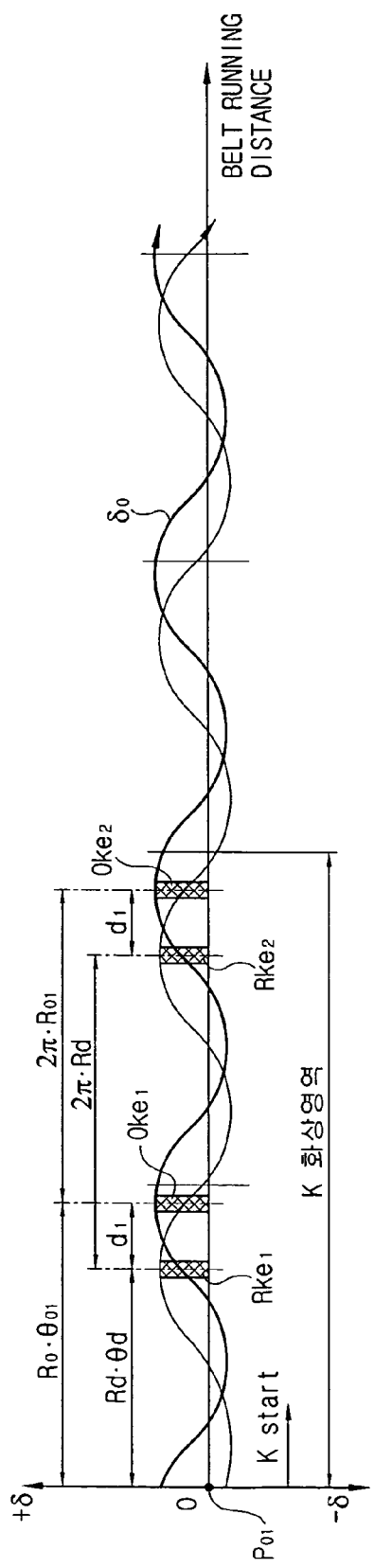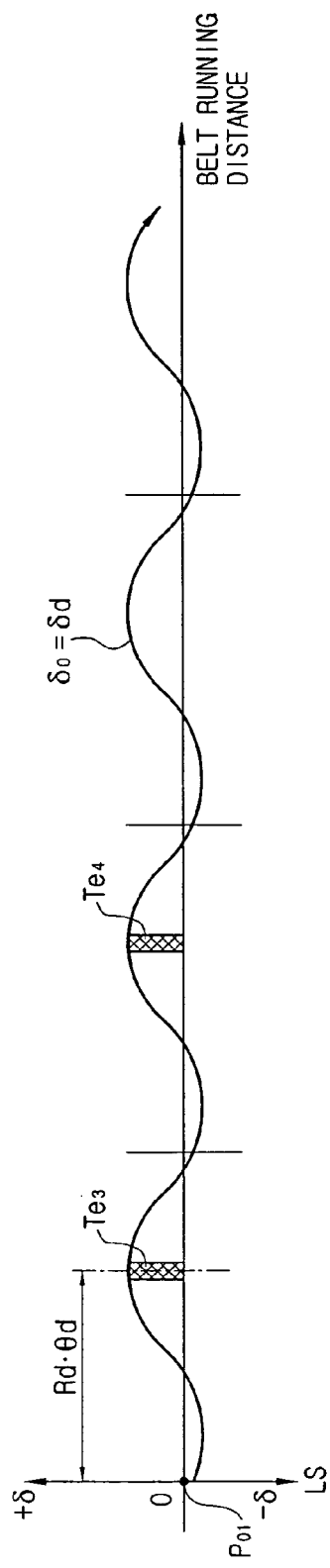

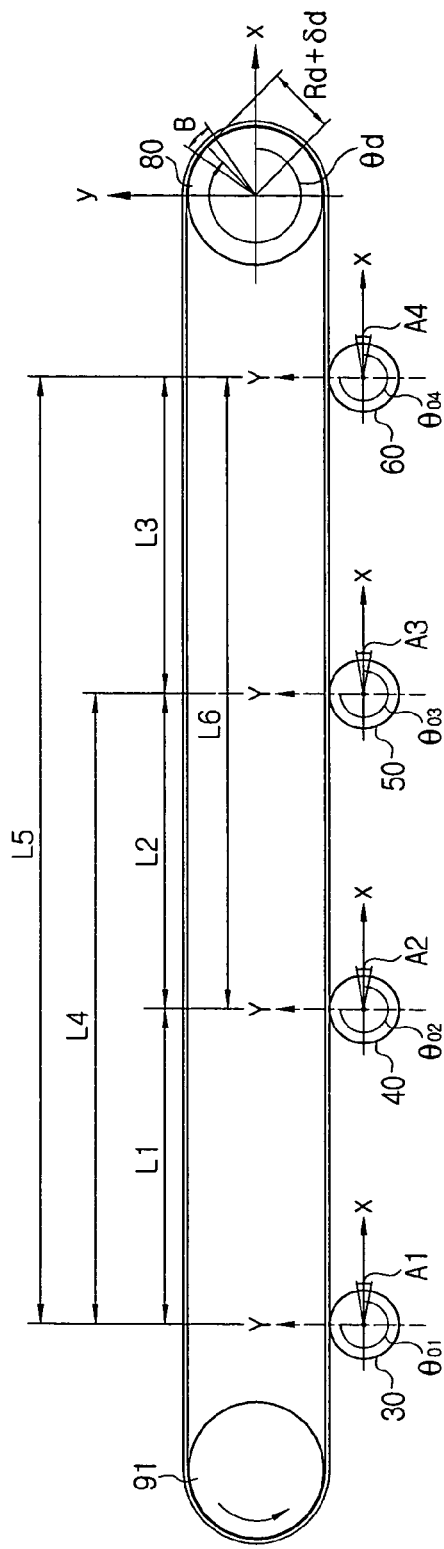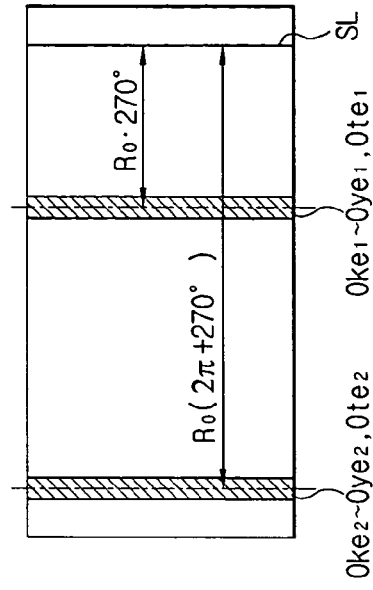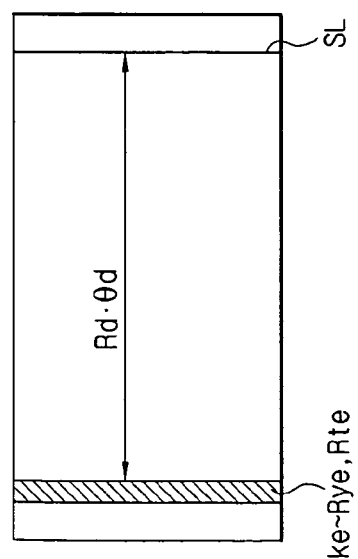

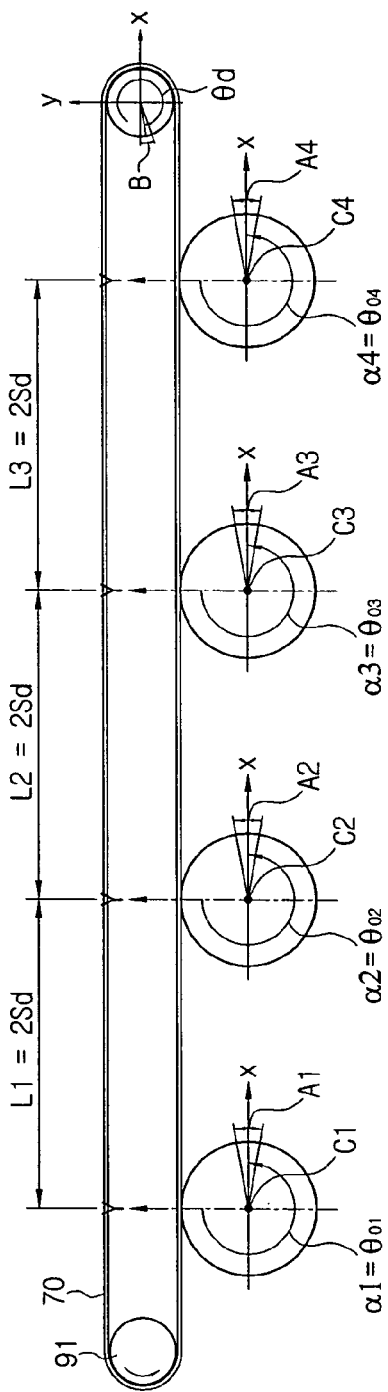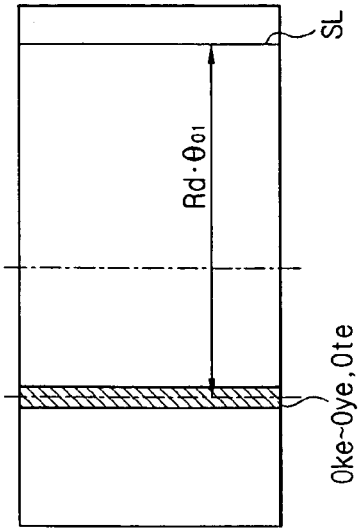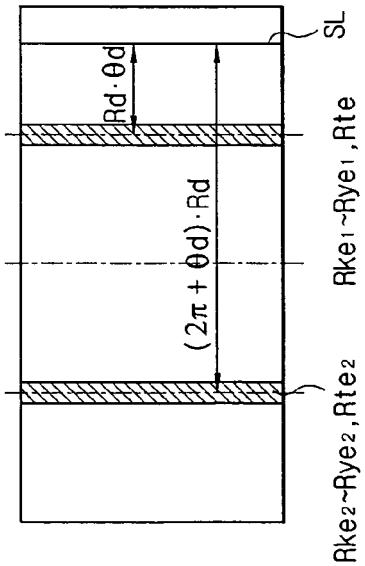

IMAGE FORMING APPARATUS ADAPTED TO OVERLAP IMAGE ERRORS FROM DRIVING UNIT AND IMAGE BEARING BODIES AND METHOD OF MANUFACTURING SAME

CROSS-REFERENCE TO RELATED APPLICATIONS

This application claims the benefit of Korean Patent Application No. 2004-48837 filed Jun. 28, 2004, and Korean Patent Application No. 2005-43735, filed May 24, 2005, in the Korean Intellectual Property Office, the disclosures of which are hereby incorporated by reference. This application is related to U.S. Patent Applications titled "Roller for Image Forming Apparatus and Method of Manufacturing Same," "Image Forming Apparatus Having Reduced Image Errors From Image Bearing Bodies and Method of Manufacturing Same," and "Image Forming Apparatus Adapted to Overlap Image Errors From Driving Unit and Image Bearing Bodies and Method of Manufacturing Same," each filed on even date herewith.

BACKGROUND OF THE INVENTION

1. Field of the Invention

The present invention relates to a driving unit for an image forming apparatus, a color image forming apparatus having the same, and a method of manufacturing an image forming apparatus having the driving unit.

2. Description of the Related Art

Generally, image forming apparatuses are classified into a monochromatic image forming apparatus and a color image forming apparatus. The monochromatic image forming apparatus forms an image in black and white by using only one color developer, while the color image forming apparatus forms a colorful image by using color developers such as magenta, cyan, yellow, and black.

An electrophotographic image forming apparatus forms an electrostatic latent image by scanning a laser beam onto an organic photoconductor (OPC), which is electrified by an electrifying unit to have a predetermined level of electric potential, using a light exposing unit. The electrostatic latent image is developed using a developer and then transferred into a visible image on supplied print paper. In a color image forming apparatus, the electrostatic latent image is developed by using color developers on the organic photoconductors and overlapped images are transferred onto an intermediate transfer medium, such as an Intermediate Transfer Belt (ITB). The color images overlapped on the intermediate transfer medium are transferred onto print paper. Subsequently, the print paper with a color image goes through a series of fixing processes before it is transferred out of the image forming apparatus.

FIG. 1 is a structural diagram showing a conventional color image forming apparatus that performs a two-step transferring process by using the intermediate transfer medium. Referring to FIG. 1, the color image forming apparatus comprises a belt 10, a supporting roller 11, four T1 rollers 12, 13, 14 and 15, four organic photoconductors 16, 17, 18 and 19, a T2 roller 20, and a belt driving roller 21.

Developers each corresponding to K (black), C (cyan), M (magenta), and Y (yellow) are attached to the electrostatic latent image area of each of the organic photoconductors 16, 17, 18 and 19. The T1 rollers 12, 13, 14 and 15 are set up to correspond to the organic photoconductors 16, 17, 18 and 19 with the belt 10 between the organic photoconductors 16, 17, 18 and 19 and the T1 rollers 12, 13, 14 and 15. Accordingly, the developers attached to the surfaces of the organic photoconductor 16, 17, 18 and 19 are primarily transferred to the surface of the belt 10 by the transferring activity of the T1 rollers 12, 13, 14 and 15. Herein, the respective color images of the organic photoconductors 16, 17, 18 and 19 are transferred onto the belt 10 at predetermined time intervals so that the color developers transferred to the belt 10 can be overlapped in registration into a complete color image. Therefore, the color developers are overlapped on the belt 10 to thereby form a complete color image. Subsequently, the color image on the belt 10 goes through a secondary transferring process between the T2 roller 20 and the belt driving roller 21. Also, the belt driving roller 21 runs the belt 10 at a proper rate.

The belt 10 and the organic photoconductors 16, 17, 18 and 19 are consumption goods with limited life spans, that must periodically be replaced.

A transferring unit including the belt 10 and developing units including each organic photoconductor 16, 17, 18 or 19 are typically set up in a detachable manner along with a predetermined coupling unit and the driving unit for providing power in the image forming apparatus.

When the consumption goods, that is, the transferring unit and the developing units, are replaced, the structure of the coupling unit for performing relative motion of the driving unit, the transferring unit, and the developing units is significant. That is, it is important to connect the transferring unit and the developing units to have the same rotational axis as the driving unit. It is also important to realize highly precise color registration in consideration of the so-called total runout between the transferring unit and the developing unit. This is particularly important in view of manufacturing tolerances in the external circumferential surface of the driving roller of the transferring unit.

Herein, the total runout can be understood to include a phenomenon that the belt 10 rotates at a predetermined rate, but small changes in the instantaneous rotation rate occur due to the manufacturing tolerance of the external circumferential surface of the driving roller. The total runout affects the developing units in the same period through the belt 10. Therefore, it is important to equalize the influence of the total runout on the developing units and improve the quality of a color image.

Additionally, the organic photoconductors and the driving roller may have deviations in their radii if the outer circumferences thereof do not make a perfect circle due to manufacturing tolerances. Such deviations result in errors of a composite color image on the belt as the color image partially stretches or cuts due to the aforementioned deviations in the OPC rollers and the driving roller.

SUMMARY OF THE INVENTION

It is, therefore, an object of the present invention to provide a roller which enables controlling the orientation of a predetermined radial displacement.

It is another object of the present invention to provide a method of manufacturing a roller which enables controlling the orientation of a predetermined radial displacement.

It is another object of the present invention to provide an improved driving unit of an image forming apparatus which enables minimizing an image error caused due to radial errors in rollers supporting the belt.

It is another object of the present invention to provide an improved image forming apparatus which enables minimizing an image error caused due to a plurality of image bearing bodies.

It is another object of the present invention to provide an improved image forming apparatus which enables minimizing an image error caused due to a plurality of image bearing bodies and belt supporting rollers.

The above aspects and other features of the present invention can substantially be achieved by providing a roller including a roller body having a radial displacement along the direction of its circumference; and a driven coupler engaged with one end of the roller body, for complimentary mating with a driving coupler for driving a driving force. The roller body has a mark formed on a predetermined position for indication of radial displacement.

The driven coupler includes a positioning part for determining a position of engaging with the driving coupler. The roller body is engaged with the driven coupler such that the positioning part maintains a predetermined angle with respect to the mark.

The mark is preferably provided at a predetermined angle with respect to a maximum radial displacement location of the roller body.

According to one aspect of the present invention, an image bearing body for use in an image forming apparatus includes a drum body having a radial displacement along the direction of its circumference; and a driven coupler engaged with one end of the roller body, for complimentary mating with a driving coupler for driving a driving force. The drum body preferably has a mark formed on a predetermined position for indication of the location of maximum radial displacement.

The mark is preferably provided at a predetermined location with respect to a maximum radial displacement location.

The driven coupler preferably includes a positioning part for determining a position of engaging with the driving coupler. The driven coupler may be engaged with the drum body such that the positioning part maintains a predetermined angle with respect to the mark.

The driven coupler preferably includes a non-circular coupling part formed at one end either in concave or convex fashion to receive a driving force in an engagement with the driven coupler. The positioning part may be extended from the coupling part in the direction of the radius of the driven coupler.

According to another aspect of the present invention, a method of manufacturing a roller including a roller body having a radial displacement along the direction of its circumference, and a driven coupler engaged with one end of the roller body, is provided. The method may include the steps of identifying a location of radial displacement of the roller body; and setting the position of the driven coupler with respect to the identified location and engaging the driven coupler with the roller body in said position.

The step of finding the location having a radial displacement preferably includes the steps of finding a point of maximum radial displacement by measuring an end of the roller body; and forming a mark on the roller body for indication of the found point of maximum radial displacement.

The step of engaging the driven coupler preferably includes assembling the driven coupler with the roller body in a manner such that a positioning part of the driven coupler maintains a predetermined angle with respect to the point of maximum radial displacement and that the relative positions of engaging the driven coupler and the driving coupler are determined.

The step of engaging the driven coupler preferably includes the steps of supporting the roller body on a first jig such that the point of maximum radial displacement is positioned at a predetermined angle with respect to a reference coordinate axis; supporting the driven coupler on a second jig such that the driven coupler is positioned at a predetermined angle with respect to the reference coordinate axis; and moving the first and the second jigs relative to each other and thereby engaging the driven coupler with the roller body.

According to yet another aspect of the present invention, a driving unit of an image forming apparatus may include a driving gear for driving a plurality of image bearing bodies which are arranged in a predetermined sequence, and a driving gear for driving a plurality of supporting rollers which support a belt running on the plurality of image bearing bodies. A distance between centers of rotation of at least two of the plurality of driving gears is preferably a positive integral multiple of the length of circumference of one of the supporting rollers.

Each of the distances between the centers of rotation of the plurality of driving gears is preferably a positive integral multiple of the length of the circumference of at least one of the supporting rollers.

One of the supporting rollers may be a driving roller which receives a driving force in engagement with the driving gear.

One of the supporting rollers may be a roller having a radial displacement.

The driving gear preferably includes first through fourth driving gears in a predetermined sequence with respect to the direction of belt running, which satisfy at least one of the following equations:

[Equation Set 1]

$$L1 = 1 \cdot Sd \cdot (1 \pm 0.05)(1=1,2,3,\ldots) \quad (1)$$

$$L2 = m \cdot Sd \cdot (1 \pm 0.05)(m=1,2,3,\ldots) \quad (2)$$

$$L3 = n \cdot Sd \cdot (1 \pm 0.05)(n=1,2,3,\ldots) \quad (3)$$

$$L4 = o \cdot Sd \cdot (1 \pm 0.05)(o=1,2,3,\ldots) \quad (4)$$

$$L5 = p \cdot Sd \cdot (1 \pm 0.05)(p=1,2,3,\ldots) \quad (5)$$

$$L6 = q \cdot Sd \cdot (1 \pm 0.05)(q=1,2,3,\ldots) \quad (6)$$

where L1 is the distance between the centers of first and second driving gears,

L2 is the distance between the centers of second and third driving gears,

L3 is the distance between the centers of third and fourth driving gears,

L4 is the distance between the centers of first and third driving gears,

L5 is the distance between the centers of first and fourth driving gears,

L6 is the distance between the centers of second and fourth driving gears, and

Sd is the length of the circumference of the one of the supporting rollers.

The driving gears are preferably mounted to satisfy all of the equations in Equation Set 1.

The driving gears are preferably mounted to satisfy L1=L2=L3.

The driving gears are preferably mounted to satisfy L1=L2=L3, and L1, L2, and L3 are positive integer multiples of Sd.

The radius of the supporting rollers is preferably equal to the radius of the image bearing bodies.

A plurality of driving couplers are preferably provided to a center of rotation of each of the plurality of driving gears, to transmit a driving force in engagement with each of the plurality of image bearing bodies.

The driving coupler may include a coupling part configured to have a non-circular section corresponding to each of the driven couplers provided to an end of each image bearing body; and a positioning part provided to a side of the coupling part to determine a position of engagement such that the driving coupler engages with the driven coupler at a fixed posture.

The coupling part may be a coupling recess sunken into an end of the coupling part in a non-circular shape, and the positioning part may be a recess sunken into an inner side of the coupling part to a predetermined depth.

The driven coupler may include a shaft protruding from an end toward the center of rotation, and a shaft hole at a bottom of the coupling recess for engagement with the shaft.

The coupling part may be a coupling protrusion extending from an end in a non-circular shape, and the positioning part may be a protrusion extending from an outer portion of the coupling protrusion.

According to yet another aspect of the present invention, an image forming apparatus preferably includes a plurality of image bearing bodies arranged in a predetermined sequence; an intermediate transfer medium running in contact with each of the plurality of image bearing bodies; and a plurality of supporting rollers for driving the intermediate transfer medium. A distance between centers of rotation of at least two image bearing bodies is a positive integral multiple of the length of the circumference of at least one of the supporting rollers.

The image bearing bodies preferably include first to fourth image bearing bodies which are arranged in a predetermined sequence with reference to the direction in which the intermediate transfer medium runs, and the first to fourth image bearing bodies preferably satisfy at least one of the following equations:

[Equation Set 1]

$$L1 = l \cdot Sd \cdot (1 \pm 0.05)(l=1,2,3,\ldots) \quad (1)$$

$$L2 = m \cdot Sd \cdot (1 \pm 0.05)(m=1,2,3,\ldots) \quad (2)$$

$$L3 = n \cdot Sd \cdot (1 \pm 0.05)(n=1,2,3,\ldots) \quad (3)$$

$$L4 = o \cdot Sd \cdot (1 \pm 0.05)(o=1,2,3,\ldots) \quad (4)$$

$$L5 = p \cdot Sd \cdot (1 \pm 0.05)(p=1,2,3,\ldots) \quad (5)$$

$$L6 = q \cdot Sd \cdot (1 \pm 0.05)(q=1,2,3,\ldots) \quad (6)$$

where L1 is the distance between the centers of first and second driving gears,

L2 is the distance between the centers of second and third driving gears,

L3 is the distance between the centers of third and fourth driving gears,

L4 is the distance between the centers of first and third driving gears,

L5 is the distance between the centers of first and fourth driving gears,

L6 is the distance between the centers of second and fourth driving gears, and

Sd is the length of circumference of the one of the supporting rollers.

The image bearing bodies are preferably mounted to satisfy all of the equations in Equation Set 1.

The image bearing bodies are preferably mounted to satisfy L1=L2=L3.

The image bearing bodies are preferably mounted to satisfy L1=L2=L3, and L1, L2 and L3 are positive integer multiples of Sd.

The plurality of supporting rollers preferably include a driving roller for driving the intermediate transfer medium while being rotated with a driving force transmitted thereto, and an idle roller being passive-rotated while supporting the intermediate transfer medium. Sd defines the length of circumference of a supporting roller.

A driving unit is preferably provided for driving the image bearing bodies and the supporting rollers.

The driving unit preferably includes a first driving unit for driving the plurality of image bearing bodies at the same time; and a second driving unit for driving one of the plurality of supporting rollers independently.

The first driving unit preferably includes a plurality of driving gears provided to correspond to each of the plurality of image bearing bodies, and rotated in association with each other; and a first driving motor for providing a driving force to drive the plurality of driving gears at the same time.

The second driving unit preferably includes a second driving motor; and one driving gear engaged with one of the supporting rollers, and driven by the second driving motor.

Each of the driving gears and each of the image bearing bodies preferably include at their corresponding ends, a driving coupler and a driven coupler for complimentary mating with the driving coupler.

The driving and the driven couplers preferably include coupling parts at their ends provided in a non-circular section and complimentarily mated with each other; and positioning parts extended from a side of each of the coupling parts to a predetermined configuration to determine a posture of engagement of the driving and driven couplers.

The image bearing bodies have a radial displacement in which the radius of the image bearing body varies, and also have intervals A1, A2, A3 and A4 having a predetermined location of maximum radial displacement, and the first to fourth image bearing bodies may be mounted to satisfy one of the following equations:

[Equation Set 2]

$$\{2\pi \cdot 1 + (\alpha 2 - \alpha 1)\} \cdot Ro \cdot (1 \pm 0.05) = L1, (l=0,1,2,\ldots), (Ro=Ro1=Ro2) \quad ①$$

$$\{2\pi \cdot m + (\alpha 3 - \alpha 1)\} \cdot Ro \cdot (1 \pm 0.05) = L1 + L2, (m=0, 1, 2,\ldots), (Ro=Ro1=Ro3) \quad ②$$

$$\{2\pi \cdot n + (\alpha 4 - \alpha 1)\} \cdot Ro \cdot (1 \pm 0.05) = L1 + L2 + L3, (n=0,1, 2\ldots), (Ro=Ro1=Ro4) \quad ③$$

where α1 is the angle, which is measured from the transfer starting location of the first image bearing body to the center of the interval A1, in the direction of reverse rotation of the first image bearing bodies, α2 is the angle, which is measured from the transfer starting location of the second image bearing body to the center of the interval A2, in the direction of reverse rotation of the second image bearing bodies, α3 is the angle, which is measured from the transfer starting location of the third image bearing body to the center of the interval A3, in the direction of reverse rotation of the third image bearing bodies, $\alpha 4$ is the angle, which is measured from the transfer starting location of the fourth image bearing body to the center of the interval A4, in the direction of reverse rotation of the fourth image bearing bodies, and Ro1, Ro2, Ro3 and Ro4 are radii of the first through fourth image bearing bodies.

The image bearing bodies preferably satisfy L1=L2=L3.

The image bearing bodies preferably satisfy L1=L2=L3, while L1, L2 and L3 are positive integer multiples of Sd.

A driving unit is preferably provided for driving the image bearing bodies and the supporting rollers, and each of the image bearing bodies preferably have at one end a driven coupler for receiving a driving force in engagement with the driving unit.

The driven couplers preferably each include a positioning part for determining a position of engagement with respect to the driving unit. The driven couplers may be engaged such that the intervals A1, A2, A3 and A4 of the respective image bearing bodies are formed at a predetermined angle with respect to the positioning parts.

The driving unit preferably includes a first driving unit for driving the first through fourth image bearing bodies at the same time; and a second driving unit for driving the supporting rollers independently.

The first driving unit preferably includes a plurality of driving gears provided to correspond to the plurality of image bearing bodies, respectively, rotating altogether in association with each other, and each having a driven coupler at one end to engage with the driven coupler; and a first driving motor for providing a driving force to drive the plurality of driving gears at the same time.

The first and second image bearing bodies are preferably mounted to satisfy the first equation of the equations 2-1, and satisfy $\alpha 1 = \alpha 2$.

The first and third image bearing bodies are preferably mounted to satisfy the third equation of the equations 2-1, and satisfy $\alpha 1 = \alpha 3$.

The first and fourth image bearing bodies are preferably mounted to satisfy the third equation of the equations 2-1, and satisfy $\alpha 1 = \alpha 4$.

The first to fourth image bearing bodies are preferably mounted to satisfy all of the equations 2-1, and satisfy $\alpha 1 = \alpha 2 = \alpha 3 = \alpha 4$.

The image bearing bodies have a radial displacement in which the radius of the image bearing body varies, and also have intervals A1, A2, A3 and A4 having a predetermined locations of maximum radial displacement, and at least two of the first through fourth image bearing bodies are mounted to satisfy one of the following equations:

[Equation Set 3]

$$\{2\pi l + (\alpha 2 - \alpha 1)\} \cdot Ro \cdot (1 \pm 0.05) = L1, (l=0,1,2,\ldots), (Ro=Ro1=Ro2) \quad (1)$$

$$\{2\pi \cdot m + (\alpha 3 - \alpha 2)\} \cdot Ro \cdot (1 \pm 0.05) = L2, (m=0,1,2,\ldots), (Ro=Ro2=Ro3) \quad (2)$$

$$\{2\pi \cdot n + (\alpha 4 - \alpha 3)\} \cdot Ro \cdot (1 \pm 0.05) = L3, (n=0,1,2,\ldots), (Ro=Ro3=Ro4) \quad (3)$$

where $\alpha 1$ is the angle of center of the interval A1, measured from the transfer starting location of the first image bearing body in the direction of reverse rotation of the image bearing bodies, $\alpha 2$ is the angle of center of the interval A2, measured from the transfer starting location of the second image bearing body in the direction of reverse rotation of the image bearing bodies, $\alpha 3$ is the angle of center of the interval A3, measured from the transfer starting location of the third image bearing body in the direction of reverse rotation of the image bearing bodies, $\alpha 4$ is the angle of center of the interval A4, measured from the transfer starting location of the fourth image bearing body in the direction of reverse rotation of the image bearing bodies, and Ro1, Ro2, Ro3 and Ro4 are radii of the first to fourth image bearing bodies.

The image bearing bodies preferably satisfy L1=L2=L3.

The image bearing bodies preferably satisfy L1=L2=L3, while L1, L2 and L3 may be positive integral multiples of Sd.

The image bearing bodies are preferably mounted to satisfy all of the equations 2-2, and satisfy $\alpha 1 = \alpha 2 = \alpha 3 = \alpha 4$.

The image bearing bodies each have a radial displacement in which the radius of the image bearing body varies, and an interval A having a maximum radial displacement at a predetermined location, wherein, when one of the supporting rollers has a radial displacement in which the radius varies, and an interval B having a maximum radial displacement, and with reference to a predetermined (X, Y) coordinate system based on the center of rotation of the supporting rollers and the image bearing rollers, the image bearing bodies and the supporting rollers are mounted to satisfy one of the following equations:

[Equation Set 3]

$$Rd \cdot \theta d = (2\pi \cdot 1 + \theta ox) \cdot Rox \cdot (1 \pm 0.05)$$

$$(1=1,2,3,\ldots), (x=1,2,3,\ldots), Rd = z \cdot Rox, (z=2,3,4,5,\ldots) \quad (1)$$

$$Rd \cdot \theta d = Rox \cdot \theta ox (1 \pm 0.05)$$

$$Rd = \theta ox, (x=1,2,3,\ldots) \quad (2)$$

$$(2\pi \cdot h + \theta d) \cdot Rd = Rox \cdot \theta ox \cdot (1 \pm 0.05)$$

$$(h=1,2,3,\ldots), (x=1,2,3,\ldots), Rox = k \cdot Rd, (k=2,3,4,5,\ldots) \quad (3)$$

where, $\theta d$ is the angle of the center of the interval B in the direction of reverse rotation of the supporting rollers along the axis +X of the (X, Y) coordinate system, $\theta ox$ is the angle measured from the axis +Y of the (x)th image bearing body in the running direction of the intermediate transfer medium to the center of the interval A in the reverse rotational direction of the image bearing body, Rox is the radius of the (x)th image bearing body, and Rd is the radius of the supporting rollers.

The axis +X is preferably defined to be parallel with reference to the running direction of the intermediate transfer medium, such that when the center of the interval B is positioned on the axis +X, the speed change of intermediate transfer medium reaches a maximum.

When the radius of the supporting rollers is larger than the radius of the image bearing bodies by interger multiples, the integer being 2 or more, the image bearing bodies and the supporting rollers are preferably arranged to satisfy the first equation of the Equation Set 3.

When the radius of the image bearing bodies equals the radius of the supporting rollers, the image bearing bodies and the supporting rollers are preferably arranged to satisfy the second equation of Equation Set 3.

When the radius of the image bearing bodies is larger than the radius of the supporting rollers by an integer multiple, the integer being 2 or more, the image bearing bodies and the supporting rollers are preferably arranged to satisfy the third equation of Equation Set 3.

A first driving unit is preferably provided for driving the image bearing bodies at the same time, and a second driving unit is preferably provided for driving one of the supporting rollers.

The image bearing bodies each preferably include a drum body, a driven coupler engaged with one end of the drum body to receive a driving force in connection with the first driving unit.

The drum body of each of the image bearing bodies preferably have a mark for indicating the maximum radial displacement interval A.

The driven coupler of each of the image bearing bodies preferably include a positioning part for determining a position of engagement with the first driving unit, and the image bearing bodies and the driven couplers are preferably engaged such that the positioning part is positioned at a predetermined angle with respect to the mark.

The supporting rollers each preferably include a roller body, and a driven coupler engaged with one end of the roller body to receive a driving force from the second driving unit.

The driven coupler of each of the supporting rollers preferably include a positioning part to determine a position of engagement with respect to the second driving unit, and the roller body is preferably provided with a mark for indicating the interval B at a predetermined angle with respect to the positioning part.

The image bearing bodies preferably have identical radii.

The image bearing bodies are preferably arranged to satisfy L1=L2=L3.

The image bearing bodies each have a radial displacement in which the radius of the image bearing body varies, and an interval A having a maximum radial displacement at a predetermined location, wherein when, one of the supporting rollers has a radial displacement in which the radius varies, and an interval B having a maximum radial displacement, and with reference to a predetermined (X, Y) coordinate system based on the center of rotation of the supporting rollers and the image bearing rollers, the image bearing bodies and the supporting rollers are mounted to satisfy one of the following equations:

[Equation Set 3]

$$Rd \cdot \theta d = (2\pi \cdot 1 + \theta ox) \cdot Rox \cdot (1 \pm 0.05)$$

$$(1=1,2,3,\ldots),(x=1,2,3,\ldots),Rd=z \cdot Rox,(z=2,3,4,5,\ldots) \quad \text{①}$$

$$Rd \cdot \theta d = Rox \cdot \theta ox \cdot (1 \pm 0.05)$$

$$Rd = \theta ox,(x=1, 2, 3, \ldots) \quad \text{②}$$

$$(2\pi \cdot h + \theta d) \cdot Rd = Rox \cdot \theta ox \cdot (1 \pm 0.05)$$

$$(h=1,2,3,\ldots),(x=1,2,3,\ldots), Rox=k \cdot Rd,(k=2,3,4,5,\ldots) \quad \text{③}$$

where, $\theta d$ is the angle of center of the interval B in the direction of reverse rotation of the supporting rollers along the axis +X of the (X, Y) coordinate system, $\theta ox$ is the angle measured from the axis +Y of the (x)th image bearing body in the running direction of the intermediate transfer medium to the center of the interval A in the reverse rotational direction of the image bearing body, Rox is the radius of the (x)th image bearing body, and Rd is the radius of the supporting rollers.

The axis +X is preferably defined to be parallel with reference to the running direction of the intermediate transfer medium, such thatwhen the center of the interval B is positioned on the axis +X, the speed change of intermediate transfer medium reaches a maximum.

When the radius of the supporting rollers is larger than the radius of the image bearing bodies by an integer multiple, the integer being 2 or more, the image bearing bodies and the supporting rollers are preferably arranged to satisfy the first equation of Equation Set 3.

When the radius of the image bearing bodies equals the radius of the supporting rollers, the image bearing bodies and the supporting rollers may be arranged to satisfy the second equation of Equation Set 3.

When the radius of the image bearing bodies is larger than the radius of the supporting rollers by an integer multiple, the integer being 2 or more, the image bearing bodies and the supporting rollers are preferably arranged to satisfy the third equation of the Equation set 3.

The image bearing bodies are preferably mounted to satisfy L1=L2=L3.

The image bearing bodies preferably satisfy L1=L2=L3, while L1, L2 and L3 are a positive integer multiple of Sd.

A driving unit is preferably provided for driving the image bearing bodies and the supporting rollers, and the image bearing bodies each preferably have a driven coupler at one end to receive a driving force in connection with the driving unit.

The driven couplers each preferably have a positioning part for determining a position of engagement with the driving unit, and the driven couplers are preferably engaged such that the intervals A1, A2, A3 and A4 of the respective image bearing bodies are formed at a predetermined angle with respect to the positioning parts.

The driving unit preferably includes a first driving unit for driving the first to fourth image bearing bodies at the same time; and a second driving unit for driving the supporting rollers independently.

The first driving unit preferably includes a plurality of driving gears provided to correspond to the plurality of image bearing bodies, respectively, rotating altogether in association with each other, and each having a driven coupler at one end to engage with the driven coupler; and a first driving motor for providing a driving force to drive the plurality of driving gears at the same time.

The first and second image bearing bodies are preferably mounted to satisfy the first equation of equations 2-1, and satisfy $\alpha 1=\alpha 2$.

The first and third image bearing bodies are preferably mounted to satisfy the third equation of equations 2-1, and satisfy $\alpha 1=\alpha 3$.

The first and fourth image bearing bodies are preferably mounted to satisfy the third equation of equations 2-1, and satisfy $\alpha 1=\alpha 4$.

The first to fourth image bearing bodies are preferably mounted to satisfy all of the equations 2-1, and satisfy $\alpha 1=\alpha 2=\alpha 3=\alpha 4$.

According to yet another aspect of the present invention, an image forming apparatus preferably includes a plurality of image bearing bodies arranged in a predetermined sequence, and having a radial displacement, and also having an interval A having a maximum radial displacement; an intermediate transfer medium running in contact with each of the plurality of image bearing bodies; and a plurality of supporting rollers for guiding the running of the transfer medium while supporting the transfer medium, and having a radial displacement in which the radius varies, and also having an interval B having a maximum radial displacement, wherein, with reference to a predetermined (X, Y) coordinate system based on the center of rotation of the supporting rollers and the image bearing rollers, the image bearing bodies and the supporting rollers are mounted to satisfy one of the following equations:

[Equation Set 3]

$$Rd \cdot \theta d = (2\pi \cdot 1 + \theta ox) \cdot Rox \cdot (1 \pm 0.05)$$

$$(1=1,2,3,\ldots),(x=1,2,3,\ldots), Rd=z \cdot Rox, (z=2,3,4,,\ldots) \quad ①$$

$$Rd \cdot \theta d = Rox \cdot \theta ox \cdot (1 \pm 0.05)$$

$$Rd = \theta ox, (x=1,2,3,\ldots) \quad ②$$

$$(2\pi \cdot h + \theta d) \cdot Rd = Rox \cdot \theta ox \cdot (1 \pm 0.05)$$

$$(h=1,2,3,\ldots),(x=1,2,3,\ldots), Rox = k \cdot Rd, (k=2,3,4,5,\ldots) \quad ③$$

where, θd is the angle of center of the interval B in the direction of reverse rotation of the supporting rollers along the axis +X of the (X, Y) coordinate system, θox is the angle measured from the axis +Y of the (x)th image bearing body in the running direction of the intermediate transfer medium to the center of the interval A in the reverse rotational direction of the image bearing body, Rox is the radius of the (x)th image bearing body, and Rd is the radius of the supporting rollers.

The axis +X is preferably defined to be parallel with reference to the running direction of the intermediate transfer medium, such that when the center of the interval B is positioned on the axis +X, the speed change of intermediate transfer medium reaches a maximum.

When the radius of the supporting rollers is larger than the radius of the image bearing bodies by an integer multiple, the integer being 2 or more, the image bearing bodies and the supporting rollers are preferably arranged to satisfy the first equation of Equation Set 3.

When the radius of the image bearing bodies equal the radius of the supporting rollers, the image bearing bodies and the supporting rollers are preferably arranged to satisfy the second equation of Equation Set 3.

When the radius of the image bearing bodies is larger than the radius of the supporting rollers by an integer multiple, the integer being 2 or more, the image bearing bodies and the supporting rollers are preferably arranged to satisfy the third equation of Equation Set 3.

A driving unit is preferably provided for driving the image bearing bodies and the supporting rollers, and the image bearing bodies each preferably have a driven coupler at one end to receive a driving force in connection with the driving unit.

The driven couplers each preferably have a positioning part for determining a position of engagement with the driving unit, and the driven couplers are preferably engaged such that the intervals A1, A2, A3 and A4 of the respective image bearing bodies are formed at a predetermined angle with respect to the positioning parts.

The first driving unit preferably includes a plurality of driving gears provided to correspond to the plurality of image bearing bodies, respectively, rotating altogether in association with each other, and each having a driven coupler at one end to engage with the driven coupler; and a first driving motor for providing a driving force to drive the plurality of driving gears at the same time.

The second driving unit preferably includes a driving gear provided to correspond to the supporting rollers, and having a driving coupler at one end for engagement with the driven coupler which is provided at an end of each of the supporting rollers; and a second driving motor for driving the driving gear.

BRIEF DESCRIPTION OF THE DRAWINGS

The above aspects and features of the present invention will be more apparent by describing certain embodiments of the present invention with reference to the accompanying drawings, in which:

FIGS. 8B and 8C are graphs provided to illustrate image error caused due to manufacturing tolerances in the radius of the driving roller in the state of FIG. 8A;

FIG. 18A is a view showing an example in which the driving roller is larger than the image bearing body;

FIG. 18C is a schematic structure view provided for explanation of an image forming apparatus according to a fourth embodiment of the present invention;

FIG. 19B is a graph showing an image error caused due to the image bearing body and the driving roller in the state of FIG. 19A;

FIG. 19D is a graph provided for explanation of an image error caused due to the driving roller and the image bearing body in the state of FIG. 19C;

FIG. 21A is a schematic structure view provided for explanation of an image forming apparatus according to a seventh embodiment of the present invention;

FIG. 21B is a schematic view of an image error caused due to the driving roller in the state of FIG. 21A;

FIG. 21C is a schematic view of an image error caused due to the image bearing body in the state of FIG. 21A;

FIG. 23A is a structure view of an image forming apparatus according to a ninth embodiment of the present invention;

FIG. 23B is a schematic view of an image error caused due to the driving roller in the state of FIG. 23A;

FIG. 23C is a schematic view of an image error caused due to the image bearing body in the state of FIG. 23A.

It should be understood that throughout the drawings, like reference numbers are used to depict like elements features and structure.

DETAILED DESCRIPTION OF EXEMPLARY EMBODIMENTS

Certain exemplary embodiments of the present invention will now be described in greater detail with reference to the accompanying drawings.

The matters defined in the description such as a detailed construction and elements are provided to assist in a comprehensive understanding of the invention. Thus, it should be apparent to those of ordinary skill in the art that various changes and modifications can be made to the exemplary embodiments described herein without departing from the scope and spirit of the invention. Also, descriptions of well-known functions or constructions are omitted for clarity and consciseness in describing exemplary embodiments of the present invention.

Figure 1:
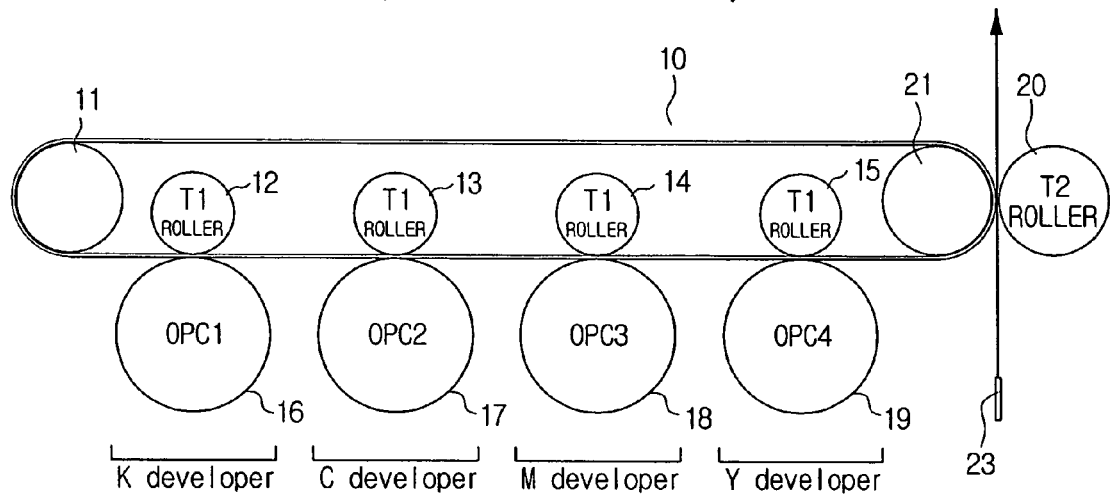
FIG. 1 is a schematic view showing the structure of a conventional color image forming apparatus.
Figure 2:
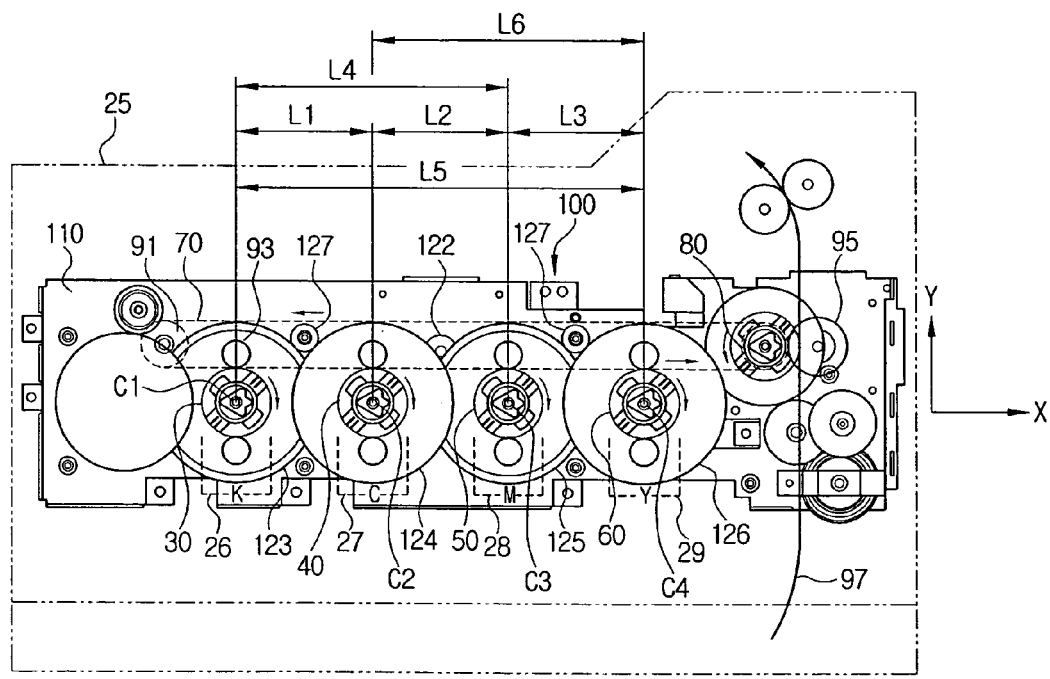
FIG. 2 is a schematic view illustrating the structure of an image forming apparatus according to an embodiment of the present invention.

Referring to FIG. 2, an image forming apparatus according to an embodiment of the present invention includes a plurality of rotary rollers 30, 40, 50, 60, a belt 70 disposed to run in contact with the plurality of rotary rollers 30, 40, 50, 60, a plurality of supporting rollers 80, 91 to support the belt 70, and a driving unit 100.

In the embodiment illustrated in FIG. 2, the plurality of rotary rollers 30, 40, 50, 60 are exemplified as organic photoconductors (OPCs) which are provided to transfer each of the color images onto the belt 70 in a certain sequence. More specifically, in the following description of an exemplary embodiment, there are four rollers, that is, there are four OPCs 30, 40, 50, 60 disclosed to independently transfer to the belt 70 color images which typically include black (K), cyan (C), magenta (M) and yellow (Y) color images in an overlaying manner.

Additionally, in this particular example of an exemplary embodiment of the present invention, the respective OPCs 30, 40, 50, 60 sequentially transfer the black, cyan, magenta and yellow color images onto the belt 70 as an overlay of a color image along the running direction of the belt 70 (The OPCs 30, 40, 50, 60 rotate in a clockwise direction in this example).

It will be understood that the following described features of an exemplary embodiment of the present invention are equally applicable to other situations such as when there are more or fewer than four OPCs 30, 40, 50, 60 employed. One of ordinary skill in the art will also understand that the respective OPCs 30, 40, 50, 60 can be arranged along the running direction of the belt 70, in a different sequence from that which is described herein.

Developing units 26, 27, 28, 29 for the respective colors are disposed near, and preferably below the OPCs 30, 40, 50, 60, to form images in each color on the outer circumference of the OPCs 30, 40, 50, 60. Any suitable generally-known structures can be applied as the developing units 26, 27, 28, 29, and one will appreciate that the present invention is not limited to the structures of the developing units 26, 27, 28, 29 described with reference to the exemplary embodiment.

The belt 70 is supported by the driving roller 80, the supporting roller 91 and a plurality of T1 rollers 93 to run in a predetermined direction. The belt 70 is run by the rotational force of the driving roller 80 and receives color images from each of the OPCs 30, 40, 50, 60 in an overlaying manner. As a result, a full color image is formed and then transferred onto a printing medium 97 which is passed between the belt 70 and the T2 roller 95. The driving roller 80 is connected with the driving unit 100 and receives the driving force from the driving unit 100 to move the belt 70. The supporting roller 91 may be elastically biased toward the belt 70 so as to support the belt 70 with a constant tension.

Figure 3:
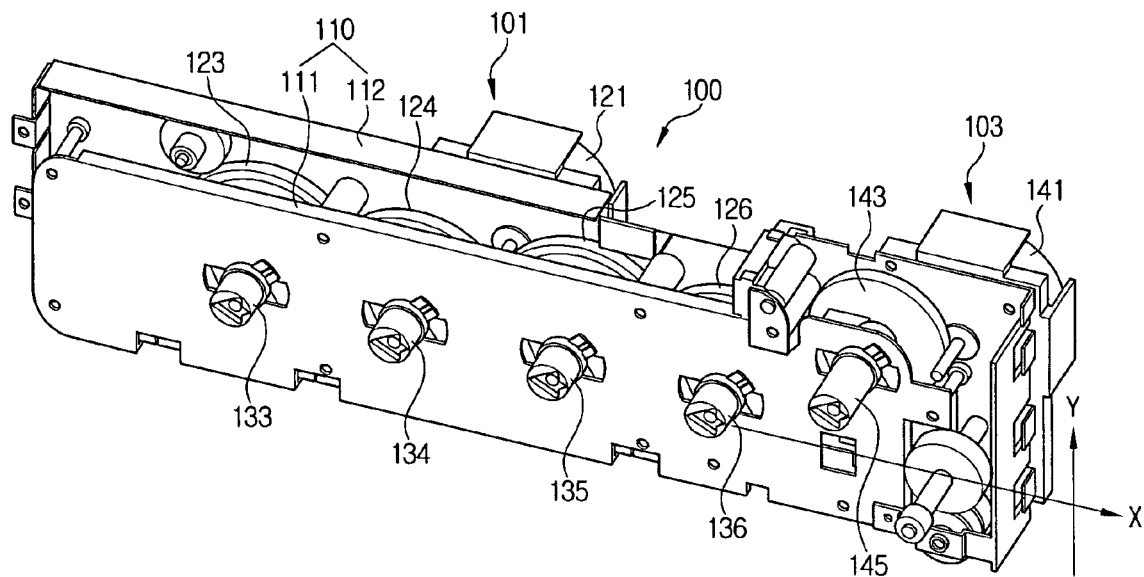
FIG. 3 is a perspective view of a driving unit of FIG. 2.

Referring to FIGS. 2 and 3, the driving unit 100 includes a frame 110, a first driving part 101 provided on the frame 110 that drives the OPCs 30, 40, 50, 60, and a second driving part 103 that drives the driving roller 80.

The frame 110 includes a front frame 111 and a rear frame 112 coupled in substantially parallel relation with each other.

The first driving part 101 includes a first driving motor 121 installed on the frame 110, first main gears, that is, first through fourth driving gears 123, 124, 125, 126 for each of the colors corresponding to the OPCs 30, 40, 50, 60, and first driving couplers 133, 134, 135, 136 provided at the rotational axes of the first through fourth driving gears 123, 124, 125, 126, respectively. The first through fourth driving gears 123, 124, 125, 126 are arranged at predetermined intervals, and disposed to rotate between the frames 111 and 112. Reference numeral 122 of FIG. 2 denotes a shaft gear which is provided to the driving shaft of the driving motor 121 and drives the respective driving gears 124 and 125. Additionally, reference numeral 127 denotes an idle gear which moves the driving gears 123, 124, 125, 126 in association with each other. One driving motor 121 is positioned approximately in the middle of the four driving gears 123, 124, 125, 126 to rotate the driving gears 123, 124, 125, 126 in the same direction.

The first through fourth driving couplers 133, 134, 135, 136 of each color are rotated together with the driving gears 123, 124, 125, 126. The first through fourth driving couplers 133, 134, 135, 136 are constructed such that each is engaged with a driven coupler at one end of each OPC 30, 40, 50, 60 to transmit driving force. The driving couplers 133, 134, 135, 136 and driven couplers will be described in greater detail below.

The second driving part 103 includes a second driving motor 141 installed on the frame 110, a second main gear, that is, a fifth driving gear 143 rotatably placed between the frames 111 and 112 and rotated by the second driving motor 141, and a fifth driving coupler 145 provided at the rotational axis of the fifth driving gear 143. The fifth driving gear 143 is preferably driven separately from the first through fourth driving gears 123, 124, 125, 126. The fifth driving coupler 145 is rotated together with the fifth driving gear 143, and is configured such that it is complimentarily engaged with the driven coupler at the driving roller 80 to transmit the driving force. In the exemplary embodiment, all of the first through fifth driving couplers 133, 134, 135, 136 and 145 are shown to have identical coupling structures. In addition, other structures of the OPCs 30, 40, 50, 60, and in particular, the structure of the driven couplers can be understood to be substantially identical in this embodiment. Accordingly, for the sake of brevity, only the K color OPC 30 and the first driving coupler 133 will be described as a representative example of the others. Similarly, description of the first driven coupler 133 can appropriately replace that of the fifth driving coupler 145 corresponding to the driving roller 80.

Meanwhile, being consumables, the OPCs 30, 40, 50, 60 have limited lifespans that expire when used more than a predetermined number of times. The OPCs 30, 40, 50, 60 may be separately installed, or in an alternative example, formed integrally with the developing units 26, 27, 28, 29 and removably placed in the image forming apparatus body 25.

The OPCs 30, 40, 50, 60 are rotated by the driving force transmitted from the driving unit 100. The OPCs 30, 40, 50, 60 are each joined with a passive-driven coupling structure for complimentary mating with the first through fourth driving couplers 133, 134, 135, 136 so that the OPCs 30, 40, 50, 60 receive driving force from the driving unit 100 when mounted in the image forming apparatus body 25. Since the respective OPCs 30, 40, 50, 60 can have essentially the same structure, only the K color OPC 30 for forming an image in black (K) as shown in FIG. 4A will be representatively explained below.

Figure 4A:
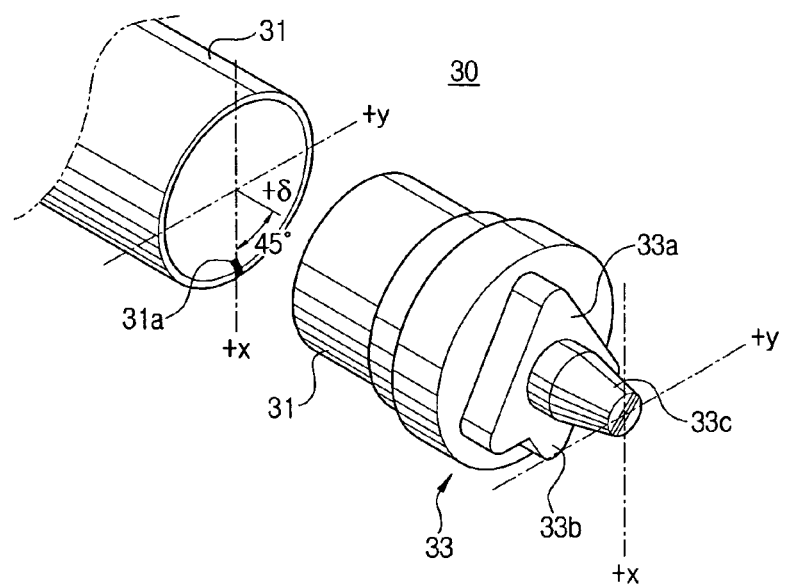
FIG. 4A is a perspective view showing an image bearing body disassembled.

Referring to FIG. 4A, the K color OPC (hereinafter, 'OPC') 30 includes a cylindrical drum body 31, and a driven coupler 33 engaged with one end of the drum body 31. The drum body 31 is preferably formed of metal material such as stainless steel, and preferably has the configuration of a cylinder with both ends open. A photoconductive layer is preferably coated or applied to the outer circumference of the drum body 31.

Figure 4B:
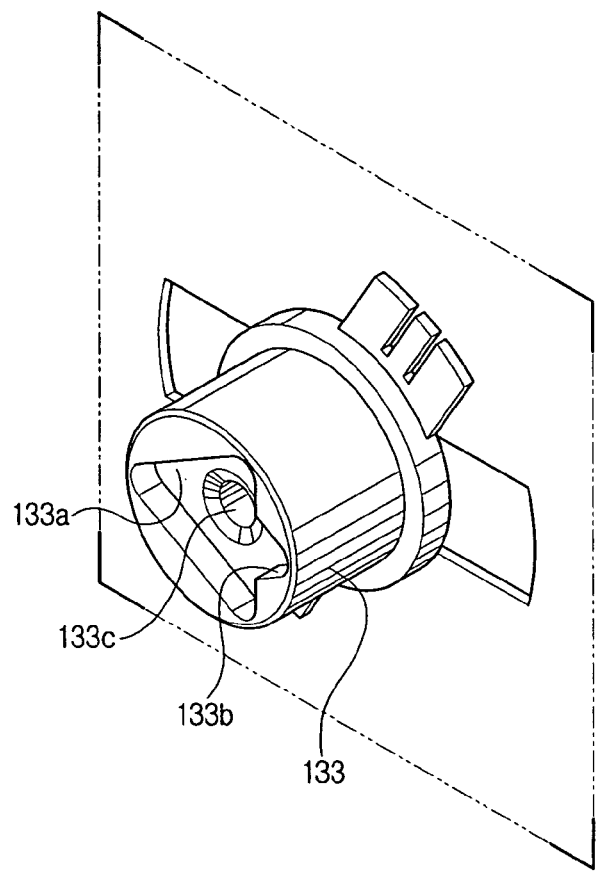
FIG. 4B is a perspective view showing a driving coupler of FIG. 3.

In an exemplary embodiment, one end of the driven coupler 33 is press-fit to an end of the drum body 31. At the other end, the driven coupler 33 is provided with a coupling part 33a with non-circular cross section, and a positioning part 33b protruding from a side of the coupling part 33a with a predetermined shape. The coupling part 33a is mated with the first driving coupler 133, shown in FIG. 4B, of the driving unit 100 to transmit driving force. The positioning part 33b determines the position of the driven coupler 33, that is, determines a coupling angle of the OPC 30 with respect to the first driving coupler 133. The same structures as that of the first driven coupler 33 are applied to the other OPCs 40, 50, 60 and therefore, only the first driven coupler 33 of the K color OPC 30 will be representatively explained below.

The first driven coupler 33 preferably also includes a shaft 33c protruding along the rotational axis of the coupling part 33a. The shaft 33c is coupled to the shaft hole 133c, shown in FIG. 4B, of the first driving coupler 133, to guide the first driving coupler 133 and the first driven coupler 33 to coaxially mated with each other.

The first driving coupler 133 preferably also includes a coupling part 133a sunken from the end in a non-circular configuration, a positioning part 133b sunken from an inner side of the coupling part 133a, and a shaft hole 133c. The coupling part 133a is configured in correspondence with the coupling part 33a of the driven coupler 33, and the positioning part 133b is configured in correspondence with the positioning part 33b of the driven coupler 33.

Figure 4C:
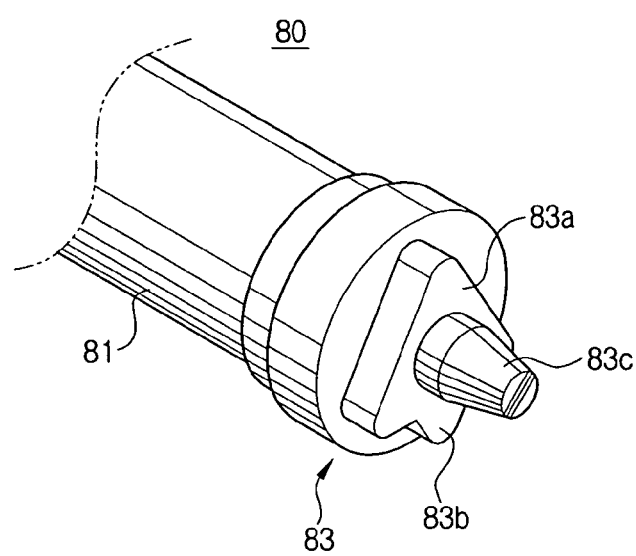
FIG. 4C is a perspective view of a driving roller of FIG. 2.

As shown in FIG. 4C, the driving roller 80 includes a roller body 81, and a driven coupler 83 coupled with an end of the roller body 81. The driven coupler 83 may have the same structure as the driven coupler 33 of the OPC 30 of FIG. 4A. More specifically, the driven coupler 83 includes a coupling part 83a of a non-circular cross section, and a positioning part 83b protruding from a side of the coupling part 83a. The driven coupler 83 of the driving roller 80 is coupled to the fifth driving coupler 145 as shown in FIG. 3. Because the driven coupler 83 has a substantially identical configuration as that of the driven coupler 33 of FIG. 4A, the fifth driving coupler 145 may have essentially the same structure as that of the first driving coupler 133 which is engaged with the driven coupler 30. Accordingly, description about the fifth driving coupler 145 can be replaced with the description about the first driving coupler 133 described with reference to FIG. 4B.

The roller body 81 of the driving roller 80 has a predetermined radius Rd, and a circumference of Sd=2π·Rd. The circumference 'Sd' of the driving roller 80 may be the same or different than the circumference of the OPCs 30, 40, 50, 60, and the detailed operation and effect of each case will be explained below.

Figure 5:
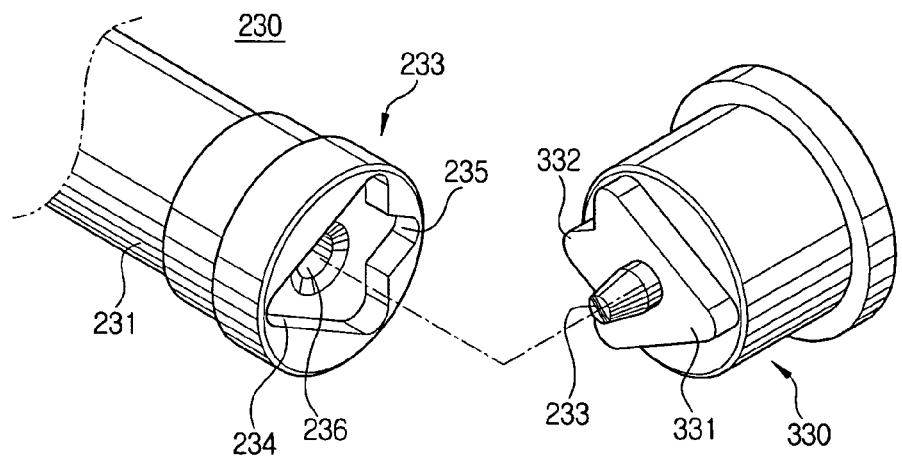
FIG. 5 is a perspective view of an image bearing body and a driving coupler of FIG. 4A according to another embodiment of the present invention.

The first through fourth driving couplers 133, 134, 135, 136 and the driven coupler 33 are preferably configured in an opposing manner. More specifically, as shown in FIG. 5, the driven coupler 233 is formed on one end of the roller body 231 of the OPC 230, and the driven coupler 233 preferably has a coupling part 234 sunken in a non-circular configuration, and a positioning part 235 extending from the coupling part 234. In this case, the driving coupler 330 corresponding to the driven coupler 233 of the OPC 230 preferably has, as shown in FIG. 5, a coupling part 331 protruding from an end in a non-circular configuration, and a positioning part 332 protruding from a side of the coupling part 331. The positioning part 332 is complimentarily mated with the positioning part 235 of the driven coupler 233. The driven coupler 233 preferably has a shaft hole 236, while the driving coupler 330 preferably has a shaft 233 for complimentary mating with the shaft hole 236.

In other words, the driven coupler 233 is preferably formed in a concave manner in the end of the OPC 30, while the end of the driving coupler 330 corresponding to the driven coupler 233 is preferably configured in a convex manner. The exemplary embodiment of FIG. 5 is preferably applied to all of the OPCs 30, 40, 50, 60, and all of the first through fourth driving couplers 133, 134, 135, 136.

Although not shown, the structure of the coupler as shown in FIG. 5 can be applied to the driving roller 80 and the fifth driving coupler 145 as well. Also, although not described in detail, a variety of coupler structures can be applied to the supporting roller 91 as well.

Meanwhile, the bodies of the rollers such as OPCs 30, 40, 50, 60 or the driving roller 80 are typically mass-produced using a metal molding process, as is known in the art. An important aspect in mass-producing roller bodies, that is, in the mass-production of the drum bodies, is to achieve a perfect circle along the outer circumference. However, perfect circles have yet to be achieved, and there are always tolerances or errors during processing, which result in the drum body having an imperfect cross section. This will now be explained in greater detail with reference to the organic photoconductor 30 as a representative example.

Figure 6:
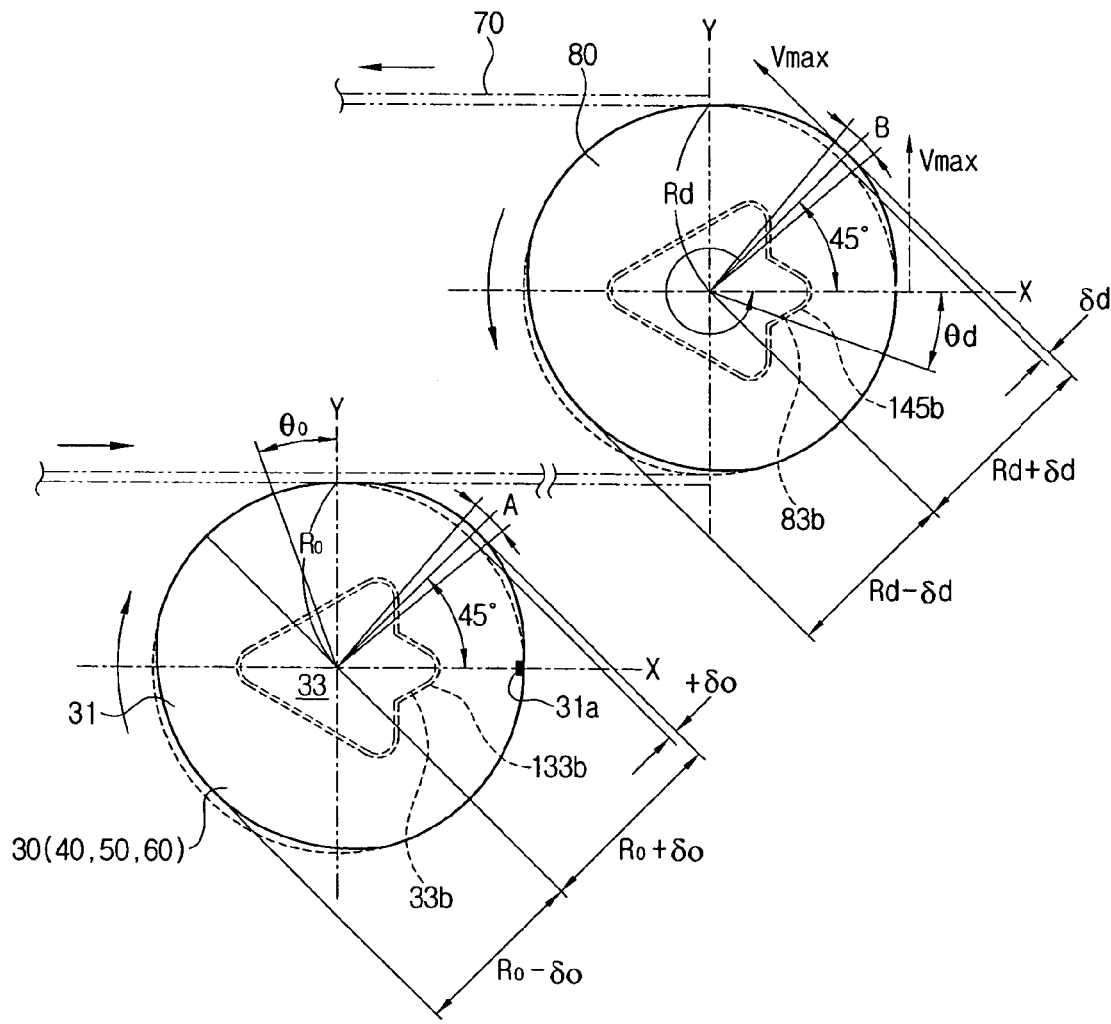
FIG. 6 is a schematic view of a radial displacement caused due to manufacturing tolerances of the image bearing body and the driving roller of FIG. 2.

FIG. 6 illustrates in exaggerated fashion, a 'runout' occurring in the outer circumference of the drum body 31, which is a radial displacement of the drum body 31 in a predetermined interval. More specifically, the runout causes a radial displacement δo, which is a varyation in the radius according to a rotational cycle of the OPC 30. The radial displacement δo can be defined by the maximum and minimum values of variations in the nominal radius appearing as a sinusoidal curve in one rotational cycle of the drum body 31, that is, in one rotational cycle of the OPC 30. In this particular embodiment, the maximum radial displacement of the roller body 31 is +δo, and the minimum radial displacement is −δo. Additionally, as shown in FIG. 6, the interval A is defined with reference to the maximum radial displacement +δo, which contributes to an image error as will be described below. The range of the interval A is variable according to the size of the radial displacement δo.

As described above, an operator needs to know the interval A in order to control any influence of the roller body 31 cause by radial displacement δo. To this end, as shown in FIG. 4A, the roller body 31 may be indicated with a mark 31a for indication of the location of interval A. The mark 31a may be formed on the outer or inner circumference of the roller body 31 to correspond to the center of the interval A. As can be appreciated, the mark 31a could also be formed at any predetermined angle away from the center of the interval A, and still identify the location of interval A.

As described above, by marking the interval A, the operator can regulate the relative orientation between the centers of the positioning part 33b of the driven coupler 33 and the interval A during assembly of the driven coupler 33 with respect to the drum body 31. In other words, as shown in FIGS. 4A and 6, marks 31a are preferably uniformly formed during the manufacturing process at a position 45 degrees (+45°) away from the center of the interval A in the rotational direction of the OPC. Then the positioning part 33b is aligned with the mark 31a, and the drum body 31 and the driven coupler 33 are engaged with each other. By assembling all the OPCs in the above-described manner, the positioning parts 33b of multiple rollers can be positioned in the same location with respect to the interval A.

Figure 7A:
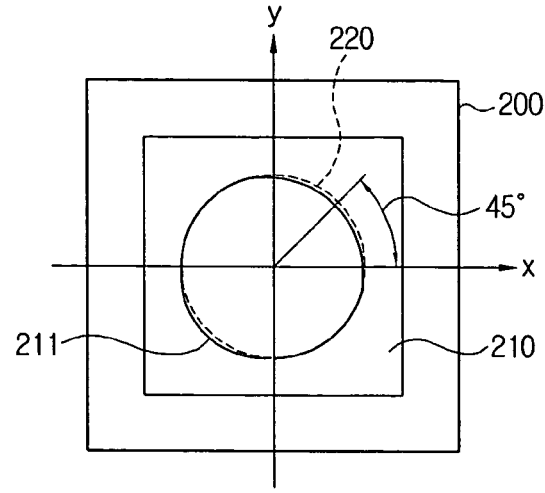
FIG. 7A is a view of the process of monitoring an end of the image bearing body of FIG. 4A.

A variety of methods can be employed to align the positioning part 33b with the mark 31a. For example, as shown in FIG. 7A, the respective ends of the drum body 31 may be captured through a camera (not shown), and a captured image may be displayed through a screen of a predetermined monitor 200. Reference coordinates (x, y) may be set on the screen 210, together with a reference complete circle 211. By placing such that the reference coordinates (x, y) overlap the reference complete circle 211, the center of the interval A of the captured image, that is, the maximum radial displacement +δo can be located. Accordingly, by adjusting such that the maximum radial displacement +δo is located 315° in the clockwise direction from the +x axis, the mark 31a is can preferably be indicated on the outer surface, or on the end of the drum body 31 at a location which corresponds to the +x axis.

Figure 7B:
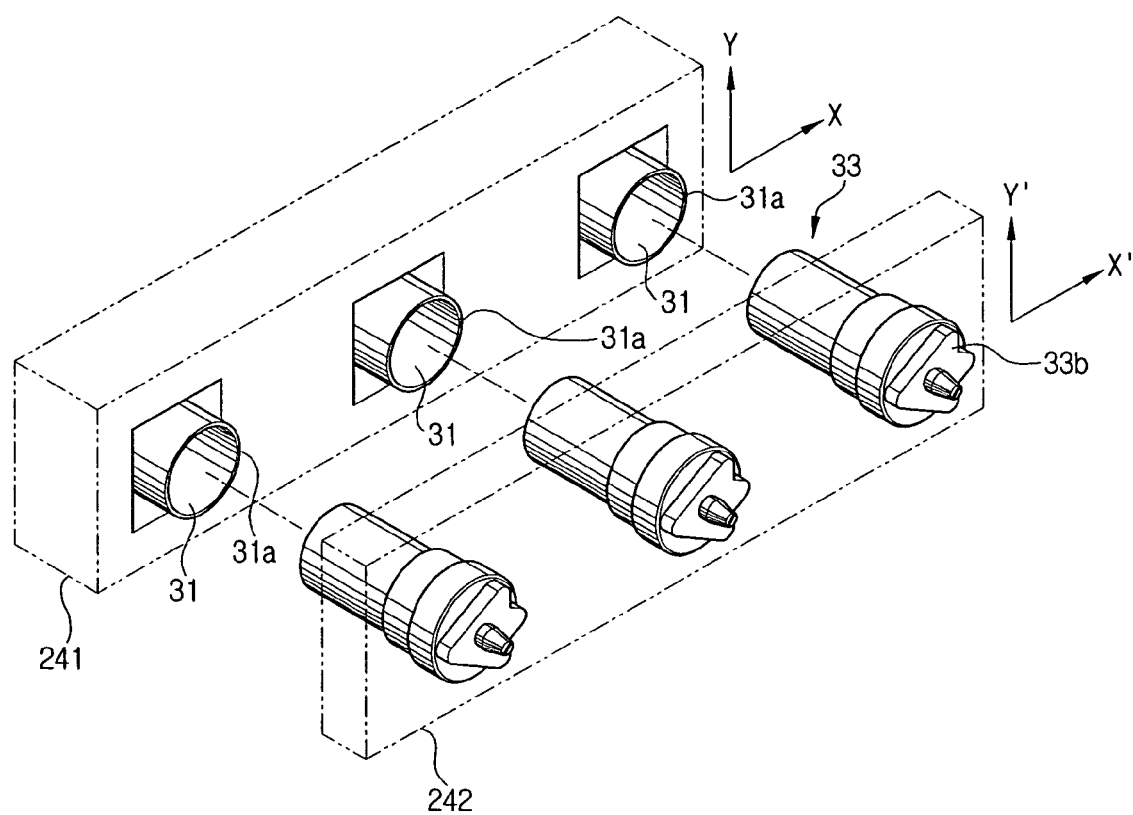
FIG. 7B is a view of the process of assembling the image bearing bodies of FIG. 4A.

Next, as shown in FIG. 7B, the drum bodies 31 bearing marks 31a thereon are supported on a first jig 241, with the marks 31a being located on the +x axis of the reference (x, y) coordinate system. The driven coupler 33 is supported on a second jig 242, and in here too, the driven coupler 33 is arranged such that the positioning part 33b is positioned on the +x' axis of the reference coordinate system (x', y'). In such a manner, the two jigs 241, 242 are oppositely arranged such that the reference coordinate systems (x, y) and (x', y') can be aligned with each other. Then by moving the two jigs 230, 240 towards each other, the driven couplers 33 are respectively joined with the plurality of drum bodies 31 and therefore, assembled all at the same time with the same relative orientations. It is possible that the positioning part 33b is positioned with respect to the center of the interval A of each drum body 31. Although it has been described above with reference to one example where the plurality of OPCs are assembled at the same time, one will understand that this should not be considered as limiting, because the OPCs can be assembled separately one by one with the same relative orientations.

In another example, a structure is separately prepared in which the drum body 31 is rotatably supported on the first jig 241. In this case, separate detecting equipment such as a mark sensor or a monitor detects whether the mark 31a is positioned on the +x axis while the drum body 31 is rotated. Accordingly, when the mark 31a is detected to be positioned on the +x axis, the drum body 31 is stationed, and coupled with the driven coupler 33 such that the positioning part 33b is oriented with respect to the mark 31a.

The OPC 30, after being assembled in the manner as described above, can be positioned in the center of the interval A, which is −45 degrees from the positioning part 33b. Accordingly, in consideration of the fact that the interval A is located in correspondence with the positioning part 33b, it is possible to minimize the generation of image errors due to deviations in the radius of the OPC drum at interval A by controlling the positions of the OPCs during assembling and installing.

Although it has been described above that the drum body 31 is assembled with the driven coupler 33 with reference to the interval A having the maximum radial displacement +δo as an example, it will be appreciated that the initial position of the positioning part 33b can also be set with reference to other intervals, such as an interval having −δo, or δo=0.

In the manner described above, it should also be understood that the other color OPCs 40, 50, 60 each have an interval A that can be oriented −45 degrees away from the positioning parts 33b.

The driving roller 80 also has a runout as a result of manufacturing processes, and as shown in FIG. 6, has a maximum radial displacement +δd in the circumferential direction. The radial displacement +δd due to runout is, as in the case of the OPC 30, expressed as a sinusoidal curve in a one rotational cycle of the driving roller, and can be defined by the maximum and minimum values thereof. In this particular embodiment, the maximum radial displacement of the driving roller 80 is +δd, and the minimum radial displacement is −δd. The interval having the maximum radial displacement +δd is an interval B. The interval B also influences image errors (described in detail below) due to the driving roller 80, and can be defined in a variety of ways. In the same manner as in the assembling of OPC 30, the driving roller 80 is oriented such that the positioning part 83b can be positioned at a predetermined rotational angle from the center of the interval B by controlling the assembly of the roller body 81 and the driven coupler 83 during the assembling process. In the following example, the positioning part 83a of the driven coupler 83 is located 45 degrees (that is, −45°) from the center of the interval B in an opposite direction with respect to the rotation of the driving roller 80.

Meanwhile, the maximum and minimum radial displacements ±δd of the driving roller 80 influences the speed of the belt 70. In other words, the tangential speed maximizes to Vdmax in the center of the interval B of the driving roller 80. Accordingly, when the interval B and the belt 70 contact tightly to the driving roller 80 and therefore, the positions of force application are aligned with each other, that is, when the direction of the tangential speed Vdmax runs parallel with the +y axis as shown in an imaginary line of FIG. 6, the belt 70 runs at maximum speed. Accordingly, as the running speed of the belt 70 changes, color images of the OPCs 30, 40, 50, 60 transferred onto the belt 70 may be distorted so that the images are stretched, blurred or cut. Because the belt 70 changes speed periodically in a rotational cycle, the image error periodically occurs on the belt 70 in correspondence with the rotational cycle of the driving roller 80.

Methods according to exemplary embodiments of the present invention to improve image errors caused due to the radial displacement δd of the driving roller 80 will be explained below. In the following explanation, it is assumed that the OPCs 30, 40, 50, 60 and the supporting roller 91 are free from the runout, and therefore, the radial displacement of the OPCs 30, 40, 50, 60 is δo=0. Accordingly, it is assumed that the radial displacement δd of the driving roller 80 is the only influence on the image being transferred onto the belt 70. As the first step to minimize image errors, the influence of the driving roller 80 is minimized and one example of doing so will be described below.

First, as described above with reference to FIG. 6, it is assumed that the center of the interval B of the driving roller 80, which has the maximum radial displacement +δd, is positioned on the +45° angle when the rotation of the driving roller 80 from the positioning part 83b is expressed by the unit of +angles. It should be appreciated that the angle of +45° is a random interval selected for the convenience of explanation. The driving roller 80 has a predetermined radius Rd and a circumference Sd=2π·Rd. With the driving roller 80 with the radial displacement δd being arranged, the OPCs 30, 40, 50, 60 are arranged to satisfy one of the following six conditions of equations 1 to reduce image error of the image being overlain on the belt 70:

[Equation Set 1]

$$L1 = l \cdot Sd \cdot (1 \pm 0.05)(l=1,2,3,\ldots) \quad (1)$$

$$L2 = m \cdot Sd \cdot (1 \pm 0.05)(m=1,2,3,\ldots) \quad (2)$$

$$L3 = n \cdot Sd \cdot (1 \pm 0.05)(n=1,2,3,\ldots) \quad (3)$$

$$L4 = o \cdot Sd \cdot (1 \pm 0.05)(o=1,2,3,\ldots) \quad (4)$$

$$L5 = p \cdot Sd \cdot (1 \pm 0.05)(p=1,2,3,\ldots) \quad (5)$$

$$L6 = q \cdot Sd \cdot (1 \pm 0.05)(q=1,2,3,\ldots) \quad (6)$$

Referring to FIG. 2, the distance between the centers C1, C2 of first and second driving gears 123, 124 is L1, the distance between the centers C2, C3 of second and third driving gears 124, 125 is L2, the distance between the centers C3, C4 of third and fourth driving gears 125, 126 is L3, the distance between the centers C1, C3 of first and third driving gears 123, 125 is L4, the distance between the centers C1, C4 of first and fourth driving gears 123, 126 is L5, and the distance between the centers C2, C4 of second and fourth driving gears 124, 126 is L6.

Driving couplers 133, 134, 135, 136 are provided to the respective driving gears 123, 124, 125, 126, and the OPCs 30, 40, 50, 60 are rotatably engaged with the driving couplers 133, 134, 135, 136. Accordingly, the centers C1, C2, C3, C4 are aligned with the center of rotation of each of the OPCs 30, 40, 50, 60. Accordingly, it can be understood that the OPCs 30, 40, 50, 60 are arranged to satisfy at least one of the equations 1. Of course, L1 refers to the distance between the centers C1, C2 of the K color OPC 30 and the C color OPC 40, L2 refers to the distance between the centers C2, C3 of the C color OPC 40 and the M color OPC 50, L3 refers to the distance between the centers C3, C4 of the M color OPC 50 and the Y color OPC 60, L4 refers to the distance between the centers C1, C3 of the K color OPC 30 and the M color OPC 50, L5 refers to the distance between the centers C1, C4 of the K color OPC 30 and the Y color OPC 40, and L6 refers to the distance between the centers C2, C4 of the C color OPC 40 and the Y color OPC 60.

Accordingly, by setting the image forming apparatus system to satisfy at least one of the equations in Equation Set 1, image errors due to variations in the radius of the driving roller 80 can be reduced. FIG. 2 shows a preferred embodiment in which the OPCs 30, 40, 50, 60 are arranged to satisfy all the equations in Equation Set 1, such that L1=L2=L3=Sd.

Image errors occur frequently on the image on the belt 70 due to the interval B of the driving roller 80 when the OPCs 30, 40, 50, 60 are arranged to satisfy none of the equations 1, and this will be described in detail below. In the following three examples, the radius Rd of the driving roller 80 and the radius Ro of the OPCs 30, 40, 50, 60 are mainly considered.

Figure 8A:
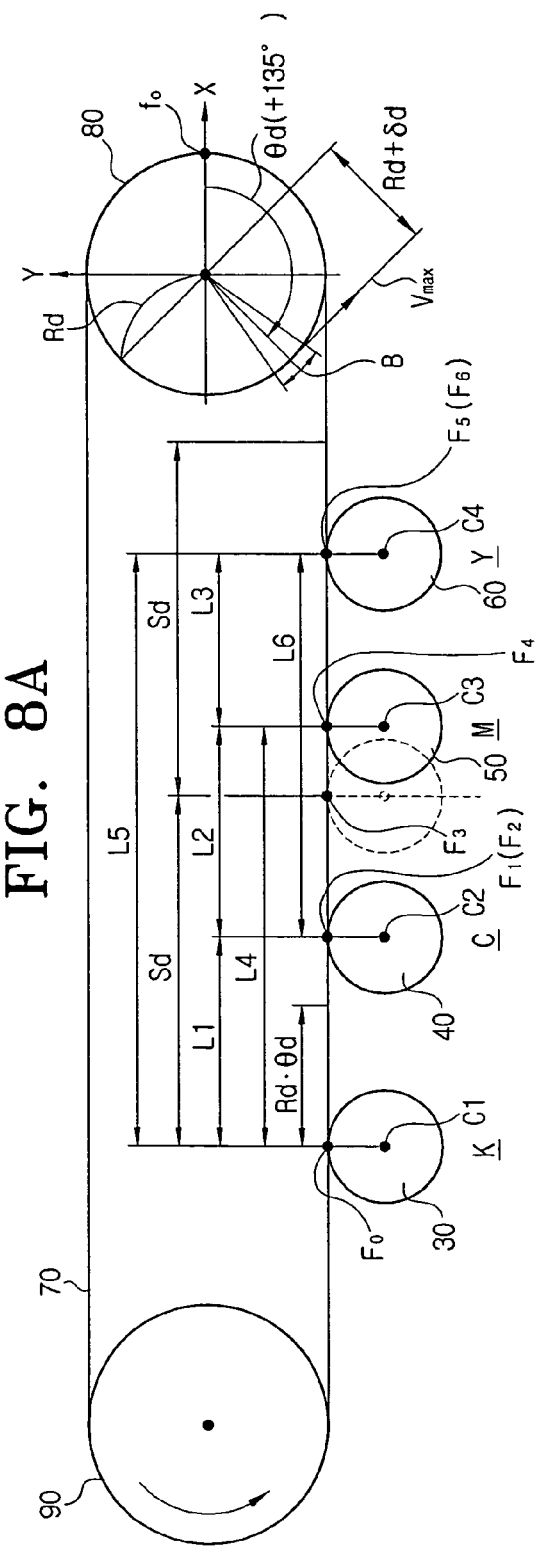
FIG. 8A is a schematic structure view of an image forming apparatus according to a first embodiment of the present invention.

FIG. 8A shows the first example where the driving roller 80 has a bigger radius than the OPC rollers 30, 40, 50, 60 (Rd>Ro). In the example of FIG. 8A, the OPCs 30, 40, 50, 60 do not satisfy any of the equations in Equation Set 1. In other words, distances between any two of the centers C1, C2, C3, C4 of the respective OPCs 30, 40, 50, 60 are not integer multiples of the circumference Sd of the driving roller 80.

Figure 8B:
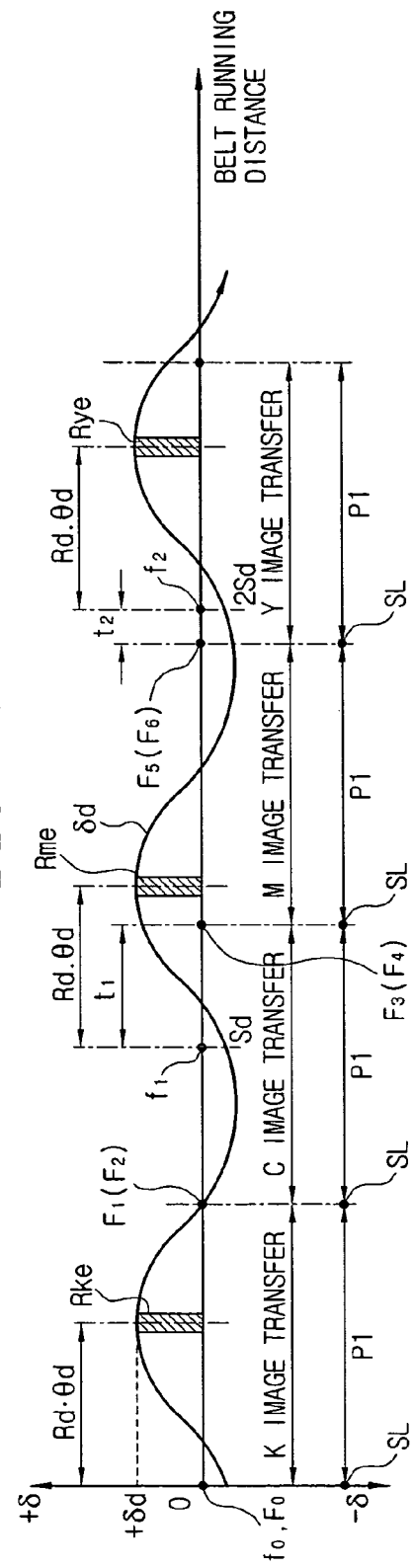

With reference to FIG. 8A, it is assumed that the K color image is initially transferred with the center of the interval B being positioned at $\theta d$ (+135°) along the axis +X. As shown in FIG. 8B, the radial displacement $\delta d$ repeats in a sinusoidal manner according to the running distance of the belt 70, and the interval B appears once in every rotational cycle of the driving roller 80. With reference to FIG. 8A, it is assumed that the K image transfer starts from the location F0, and one rotational cycle of the driving roller 80 starts from when the location f0 is simultaneously positioned on the axis +x. As shown in FIG. 8B, the center of the image error Rke of the K image caused due to the interval B, is centered at the location which is distanced apart from the location F0 as much as $Rd \cdot \theta d$.

When the length of the image transferred by each image bearing body is short enough, that is, when the location F1 where the K image transfer ends, and the location F2 where the C image starts transfer, are aligned with each other, the interval of C image transfer is not influenced by the interval B. Therefore, no image error due to the interval B does not occur in the C image. In other words, the K image transfer ends before the belt 70 moves by the distance of 1Sd, and the C image transfer starts. Because the location F3 where the C image transfer ends, is positioned before the belt 70 moves from the location F0 by the distance of $Sd+Rd \cdot \theta d$, no image error occurs in the C image.

Next, when it is assumed that the M image transfer location F4 is the same as the location F3, an image error Rme occurs in the M image due to the interval B at the location which is a predetermined distance away from the location F4. Because the distance L4 is not an integer multiple of Sd, the M image transfer start location F4 is positioned after one rotational cycle of the driving roller 80 and the running of the belt 80 as much as t1 from the location f1 where the second rotational cycle of the driving roller 80 starts. When the respective color image transfer intervals are represented in a unit image area P1, the M image error Rme occurs at different locations from the starting line SL of the unit image area P1. In other words, two image errors Rke, Rme appear in the unit image area P1 at a distance apart from one another by $Rd \cdot \theta d - t1$.

According to the same principle, the location F5 where the M image transfer ends, and the location F6 where the Y image transfer starts, are positioned before the belt 70 is run as much as 2Sd, that is, before the driving roller 80 completes a second rotational cycle. Accordingly, an image error Rye due to the interval B also occurs in the Y image. Here, because the Y image transfer start location F6 is positioned a predetermined distance (t2) from the location f2 where the second rotational cycle of the driving roller 80 starts, the center of the Y image error Rye occurs away from the starting line SL by $t2+Rd \cdot \theta d$.

As explained above, when Rd>Ro, there may be a color image such as a C image, which is not influenced by the interval B of the driving roller 80 because the OPC rollers complete revolutions more often than the larger driving roller. Accordingly, a color OPC 40 which corresponds to the error-free color image, needs not be considered, but at least two of the respectively-spaced image errors Rke, Rme, Rye should be aligned with each other to reduce the frequency of image error occurrence within the unit image area P1. In the following description, a method of aligning the K and M image errors Rke, Rme will be described as one example of the present invention.

In order to align the two image errors Rke, Rme, the system is realized to satisfy the fourth equation of the equation set 1. That is, a distance between the centers C1, C3 of the two OPCs 30, 50 may be set to $L4=o \cdot Sd (o=1,2,3,\ldots)$. To this end, as indicated by an imaginary line in FIG. 8A, the OPC 50 is positioned with its center C3 being distanced from the center C1 by $oSd$ with $o=1$.

Accordingly, as the system is set as described above, if the K image starts to be transferred, the center of the K image error Rke occurs away from the starting line SL as much as $Rd \cdot \theta d$. The C image is free from an image error as mentioned above with reference to FIG. 8B.

Meanwhile, as shown in FIG. 8C, because the center C3 of the M OPC 50 is positioned at a 1Sd location, that is, at a location f1 where the second rotational cycle of the driving roller 80 starts, the M image transfer starting location F4 precedes the location F3 where the C image transfer ends. The location F4 is same as the location f1. Accordingly, the center of the M image error Rme due to the interval B occurs away from the starting line SL of the unit image area P1 as much as $Rd \cdot \theta d$. As a result, the K and M image errors Rke, Rme are overlapped at the same relative location. Because the frequency of image error occurrences can be reduced in a final form of color image being printed, a higher quality print is possible. A Y image error Rye has not been considered in this description. The Y image error Rye may occur at a different location from the K and M image errors Rke, Rme as described above with reference to FIG. 8B.

Of course, the Y image error Rye can also be aligned with the other image errors, by establishing the system to satisfy the fourth and third equations of Equation Set 1, or by establishing the system to satisfy the fourth and fifth equations of Equation Set 1. The principle according to which K, M, Y image errors Rke, Rme, Rye are overlapped by satisfying the above conditions, can be easily understood from the above-mentioned process of aligning the two image errors. Therefore, a detailed description thereof will be omitted for the sake of brevity.

In this particular embodiment, the transfer intervals of each of the color OPCs 30, 40, 50, 60 are randomly set, and also the starting and ending points of color images are randomly set for the convenience of explanation. Accordingly, one will appreciate that the above particular case should not be construed as limiting. Various examples are possible under the condition of Rd>Ro, and the number of image errors of a unit image area can variously change. It is only clear that, regardless of the number of image errors, at least two image errors should aligned with each other by satisfying at least one of the equations in Equation Set 1 to reduce the total number of occurrences of image errors due to variations in the radius of the driving roller 80.

Furthermore, although FIG. 8A depicts that the variable o=1 in the fourth equation of the Equation Set 1, this is just one example, and it will be appreciated that the same effect is obtained when the variable o is an integer number which is equal to or greater than 1.

Figure 9A:
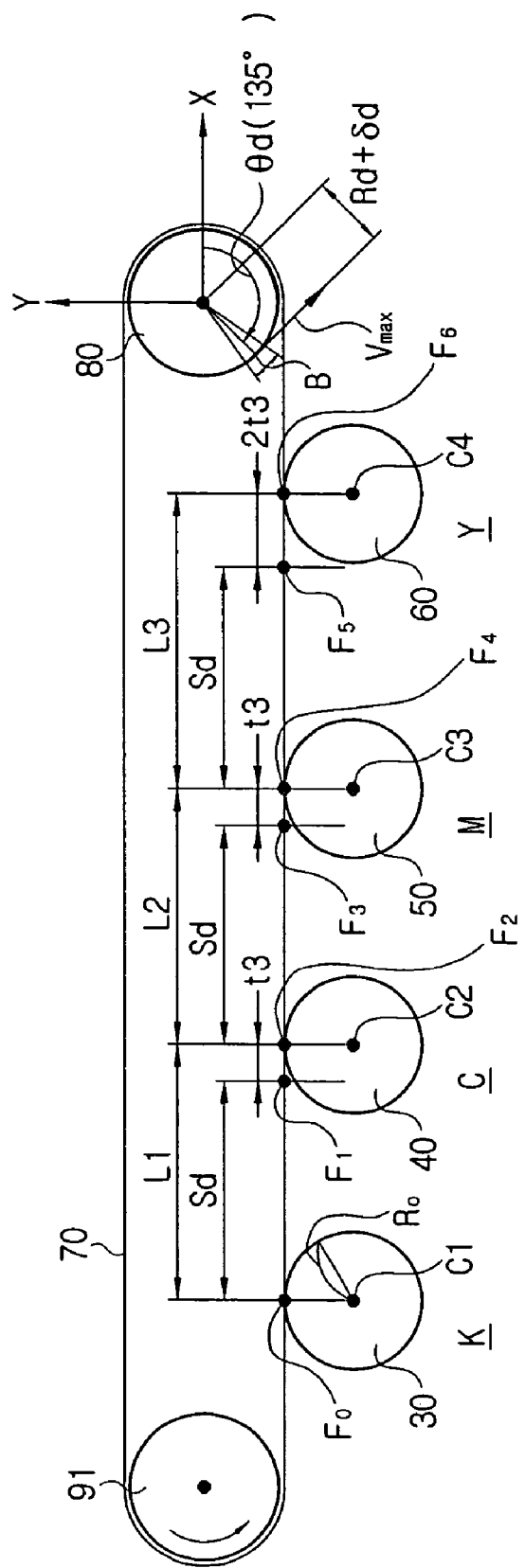
FIG. 9A is a structure view of a conventional image forming apparatus.

A second example of the first step will now be described. As shown in FIG. 9A, a first example of image errors is described when none of the equations of Equation Set 1 are met and the driving roller radius is equal to the OPC roller radius (Rd=Ro), followed by the description of a method of reducing the image error by satisfying at least one of the equations in Equation Set 1.

Figure 9B:
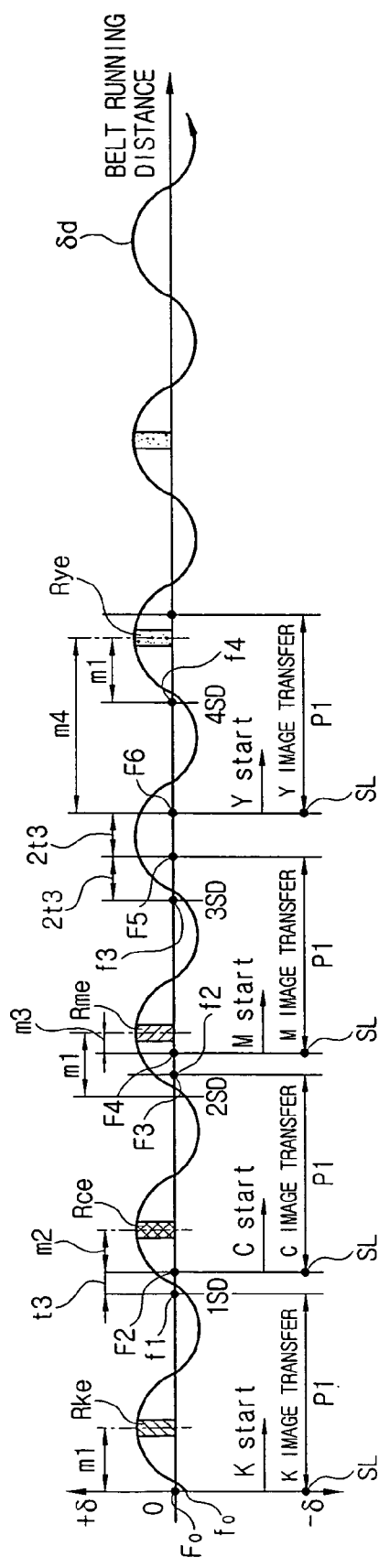
FIG. 9B is a graph of an image error caused due to manufacturing tolerances in the radius of the driving roller in the image forming apparatus shown in FIG. 9A.

Referring first to FIG. 9A, it is assumed that the K color image starts to be transferred when +δd, that is, when the center of the interval B is at a location θd (135°) with reference to the axis +X. As shown in FIG. 9B, an image error Rke due to the interval B occurs away from the K image transfer starting line SL by a distance of m1=Rd·θd. That is, the starting line SL of the K image starts from the location F0, and when the starting line SL reaches the location F1 where the K image transfer is completed (based on the assumption that one unit image is completed with one rotational cycle of the driving roller 80), the center of the interval B of the driving roller 80 is at the initial location (that is, 135° of axis X) as shown in FIG. 9A. Here, because the distance L1 between the centers C1, C2 of the two OPCs 30, 40 is longer than the circumference Sd of the driving roller 80 as much as t3, the belt 70 moves further from the location F1 by the interval of t3, and the C color image starts transfer from the location F2. It is assumed for purposes of illustration that the rotational angle of the driving roller 80 corresponding to the interval t3 is 45°. In this case, the center of the image error Rce of the C image due to the interval B occurs away from the location F1 as much as Rd·θd, but in consideration of the fact that the actual starting line SL of the C image is F2, the center of the image error Rce occurs away from the starting line SL of the unit image area P1 as much as m2=Rd·θd−t3=Rd·(θd−45°)=Rd·90°. Accordingly, the distance between the centers of the two image errors Rke, Rce are away from the unit image area as much as t3=Rd·90°.

Additionally, because the distance L2 between the centers C2, C3 of the C and M OPCs 40, 50 is longer than Sd as much as t3, the M image starts to be transferred onto the belt 70 when the belt 70 moves from the location F3 where the C image transfer ends, by t3=Rd·45°. The location F4 is at a distance 2t3 from the starting point f2 of the second rotational cycle of the driving roller 80. Accordingly, when considering the fact that the center of the M image error Rme due to the interval B occurs at a distance that the belt 70 is run from the location f2 by Rd·θd, the actual center of the M image error Rme occurs away from the starting line SL of the M unit image area P1 by m3=Rd·θd−2t3=m1−2Rd·45°=Rd(θd−90°)=Rd·45°. As a result, the M image error Rme occurs at a different location of the unit image area P1 from the K and C image errors Rke, Rce.

Referring to FIG. 9A, the distance between the centers C3, C4 of the M and Y OPCs 50, 60 is exemplified as L3=Sd+2t3. In this case, the starting point f3 of the third rotational cycle of the driving roller 80 precedes the location F5 where the M image transfer ends, by the interval of 2t3. Because the distance of the two OPCs 50, 60 is further distanced than Sd by the interval of 2t3, the transfer of Y image starts from the location F6 where the belt 70 is moved further from the location F5 by the interval of 2t3. The location F6 is where the belt 70 is moved from the location f3 by the interval of 4t3. Accordingly, an image error due to the interval B does not occur in the third rotational cycle of the driving roller, and Y image error Rye occurs from a location which is distanced from the starting location f4 of the fifth rotational cycle by m1=Rd·θd. The Y image error Rye occurs because the location f4 is in the Y image transfer interval. In this situation, the Y image error Rye occurs at a location F6, which is distanced from the starting line SL of the unit image area P1 as much as m4=Sd+m1−4t3=+Rd·2π+Rd·θd−4Rd·45°=Rd(2π−45°). Because the Y image error Rye occurs in the unit image area P1 at a different relative location from the other image errors Rke, Rce, Rme, it affects the image quality. As described above, when Rd=Ro, at least one image error occurs within each of the transferred color images. More specifically, although FIGS. 9A and 9B depict an example where all of the color images are transferred within one rotational cycle of the OPCs 30, 40, 50, 60, one color image can be completed by the two rotational cycles of the OPCs 30, 40, 50, 60. In this case too, one image error occurs in each of the transferred color images. Accordingly, the image quality can be greatly improved by aligning at least two image errors by making at least two of the OPC rollers satisfy at least one of the equations in Equation Set 1.

Figure 10A:
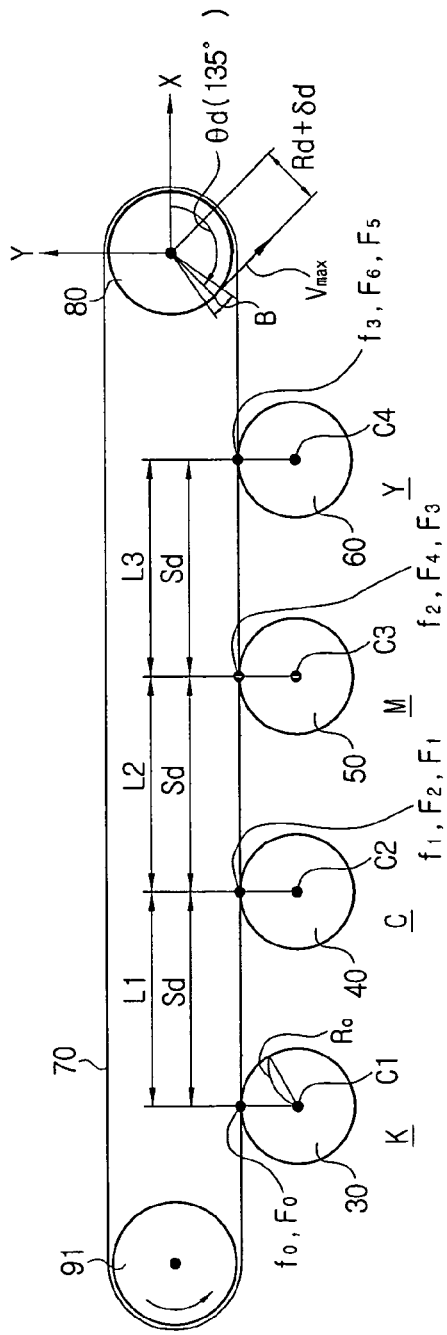
FIG. 10A is a schematic structure view of an image forming apparatus according to a second embodiment of the present invention.
Figure 10B:
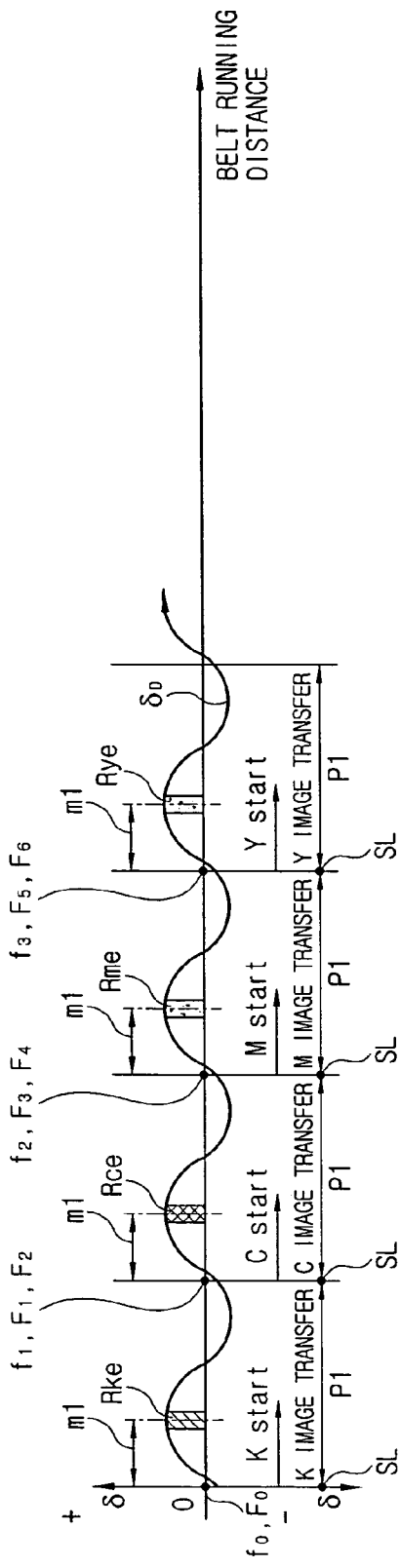
FIG. 10B is a graph of an image error caused due to manufacturing tolerances in the radius of the driving roller in the state of FIG. 10A.

In the following second example of the first step, it will be exemplified that the system is set to satisfy all of the equations of Equation Set 1. Referring to FIG. 10A, the system is set such that distances between the centers C1, C2, C3, C4 of the OPCs 30, 40, 50, 60 satisfy L1=L2=L3=Sd. In such a situation, when the center of the interval B of the driving roller is rotated along the +x axis by θd=135°, it is assumed that the K image is initially transferred onto the belt 70 at a location F0. If it is assumed that one unit image is formed in one rotational cycle of the OPCs 30, 40, 50, 60, the distance L1 between the centers C1, C2 of the two OPCs 30, 40 corresponds to an integer multiple of Sd, that is, L1=1Sd. Accordingly, as shown in FIGS. 10A and 10B, the distance from the location F0 where the K image transfer starts until the location F1 where the K image transfer ends, corresponds to the distance between the location f0 where the first rotational cycle of the driving roller 80 begins until the location f1 where the second rotational cycle of the driving roller 80 begins. Accordingly, a K image error Rke occurs with its center being located at a distance where the belt 70 is run by m1=Rd·θd.

Next, because the C image transfer start point F2 meets the location F1, and the location f1 also meets the location F1, the center of the C image error Rce occurring in the C image due to the interval B is positioned at the location F1, that is, at a distance from the starting line SL of the C image by m1=Rd·θd. As a result, the K and C image errors Rke, Rce are overlapped at the same location.

Furthermore, because L1=L2=1Sd, the M image transfer start point F4 is positioned at the same location as the C image transfer end location F3, and as the starting point f2 of the third rotational cycle of the driving roller 80. Because the center of the M image error Rme due to the interval B is at a m1=Rd·θd distance from the SL location, which is identical to the location F3, the K and C image errors Rke, Rce can be superimposed at the same location.

Additionally, because L1=L2=L3=Sd, the Y image transfer start point F6 is at the same location as the M image transfer end location F5, and as the start point f3 of the fourth rotational cycle of the driving roller 80. Accordingly, the center of the Y image error Rye due to the interval B occurs at the location F6, that is, at a distance from the starting line SL of the unit image area P1 as much as m1=Rd·θd. Because the Y image error Rye occurs at the same location as the overlap of the K, C and M image errors Rke, Rce, Rme, the number of image errors of unit image area P1 can be greatly reduced, and as a result, the image quality improves.

The third example of the first step where Rd<Ro will now be described.

Figure 11A:
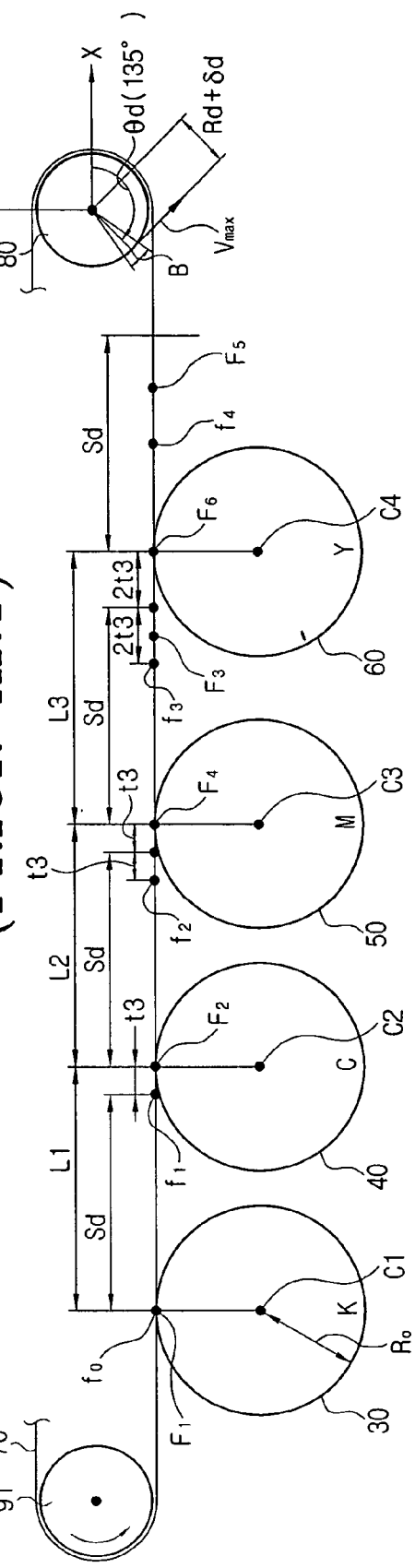
FIG. 11A is a schematic structure view provided for explanation of another conventional printer.

FIG. 11A shows the system when Ro=2Rd. In the following description, it will be assumed that each color image is completed by one rotation of the OPCs 30, 40, 50, 60. Accordingly, the OPCs 30, 40, 50, 60 rotate once during two rotations of the driving roller 80 of FIGS. 11A and 11B, and one unit image is formed by one rotation of the OPCs 30, 40, 50, 60. Referring to FIG. 11A, an exemplary system is illustrated in which the centers C1, C2, C3, C4 of the respective OPCs 30, 40, 50, 60 do not satisfy any of the equations of Equation Set 1. In such a situation, the K image is initially transferred onto the belt 70 when the maximum radial displacement +δd of the driving roller 80, that is, the center of the interval B is rotated from the axis +X by θd (+135°). The location of the interval B, that is, the location of θd is randomly set for the convenience of explanation.

When the K image is transferred onto the belt 70 at the K image transfer starting point F0, the starting point f0 of the first rotation of the driving roller 80 meets the location F0. Accordingly, the center of the first K image error Rke1 due to the interval B occurs at a distance where the belt 70 is run from the unit image transfer starting line SL as much as m1=Rd·θd. Since the K image transfer is completed by one rotation of the OPC 30, the driving roller 80 rotates twice during the transfer of the K image. Accordingly, the second K image error Rke2 occurs at a distance where the belt 70 is run from the center of the first K image error Rke1 as much as 1Sd=2π·Rd. That is, two K image errors Rke1, Rke2 occur in one unit image area P1 due to the interval B, and the center of the second K image error Rke2 occurs away from the SL as much as Sd+m1.

Meanwhile, because the distance between the centers C1, C2 of the two OPCs 30, 40 is L1=1Sd+t3, the C image transfer starts at a location F2 where the belt 70 is run by the interval of t3 from the starting point f1 of the second rotation of the driving roller 80. Accordingly, the center of the first C image error Rce1, which is caused due to the interval B in the second rotation of the driving roller 80, appears at a location where the belt 70 is moved from the location f1 as much as m1. As a result, the center of the first C image error Rce1 occurs away from the starting line SL of the C image transfer by m2=m1−t3. For the convenience of explanation, the distance corresponding to the interval t3 is defined to be the length of circumference when the driving roller 80 rotates by 45°. Accordingly, m2=Rd·θd−Rd·45°=Rd(θd−45°). As a result, the center of the first C image error Rce1 is at a different location from the centers of the two K image errors Rke1, Rke2 in the unit image area P1.

The second C image error Rce2 is caused due to the interval B while the C image is transferred and during the third rotation of the driving roller 80. The center of the second C image error Rce2 appears at a distance where the belt 80 is moved from the center of the C image error Rce1 by the interval of Sd. Accordingly, the center of the second C image error Rce2 is at a distance from the starting line SL of the C unit image P1 by m2+Sd=Rd(θd−45°)+2πRd=Rd·(2π+90°).

Because the distance between centers C2 and C3 of the C color OPC 40 and the M color OPC 50 is L2=Sd+t3, the transfer of the M image starts from the point F4. The transfer staring point F4 of the M color image is away from the point F0 by 2Sd+2t3, that is, away from the point f2 by 2t3. Accordingly, the center of the first M color image error Rme1 caused due to the interval B in the unit image area P1 is positioned away from the point f2 by m1=Rd·θd. Accordingly, the distance between the center of the image error Rme1 and the SL of the unit image area P1 during the M image transfer is m3=m1−2t3=Rd·θd−2Rd·45°=Rd·(θd−90°). The center of the second M color image error Rme2 caused due to the interval B occurs away from the center of the image error Rme1 at a position where the belt 70 is moved by a distance of Sd. Accordingly, the second M color image error Rme2 occurs away from the SL of the M color image by m3+Sd=Rd•(θd−90°)+2π•Rd=Rd•(2π+45°). Accordingly, the two M color image errors Rme1 and Rme2 occur at different locations from the K and C color image errors Rke1, Rke2, Rme 1 and Rme2.

Referring to FIG. 11A, the distance between the centers C3 and C4 of the M color OPC 50 and the Y color OPC 60 is L3=Sd+2t3. Accordingly, the transfer starting point F6 of the Y color image is located at a position where the belt 70 is moved from the point f0 by a distance of 3Sd+4t3. Then, the center of the first Y color image error Rye1 caused due to the interval B during the fourth rotation of the driving roller 8 occurs away from the F6 by a distance of m4. Since the distance between the point F6 and the point f3 is 4t3, the distance between the point F6 and the point f4 is Sd−4t3. Also, the distance between the point f4 and the first Y color image error Rye1 is m1. Accordingly, m4=Sd−4t3+m1=2π·Rd−4Rd·45°+Rd·θd=Rd·(2π−45°). The second Y color image error Rye1 occurs at a position where the belt 70 is moved from the center of the first Y color image Rye1 by a distance of Sd. Accordingly, the center of the second Y color image error Rye1 occurs away from the SL of the Y color unit image P1 by m4+Sd=Rd·(4π−45°). As described above, the Y color images Rye1 and Rye1 occur at different positions from the K, C, and M color image errors in the unit image area P1, and as a result, many image errors occur in the unit image area P1.

As described above, the number of image errors can be reduced thief the pair of color image errors occurring in the image area P1 are aligned with each other. Therefore, the image quality is improved.

Figure 12A:
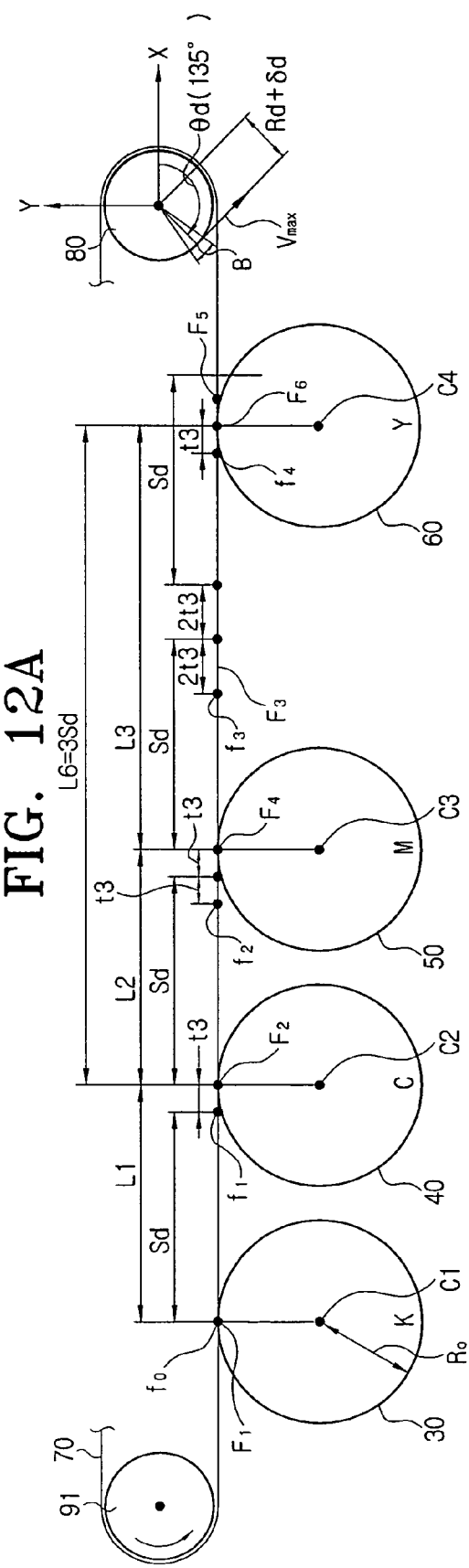
FIG. 12A is a schematic structure view showing an image forming apparatus according to a third embodiment of the present invention.
Figure 12B:
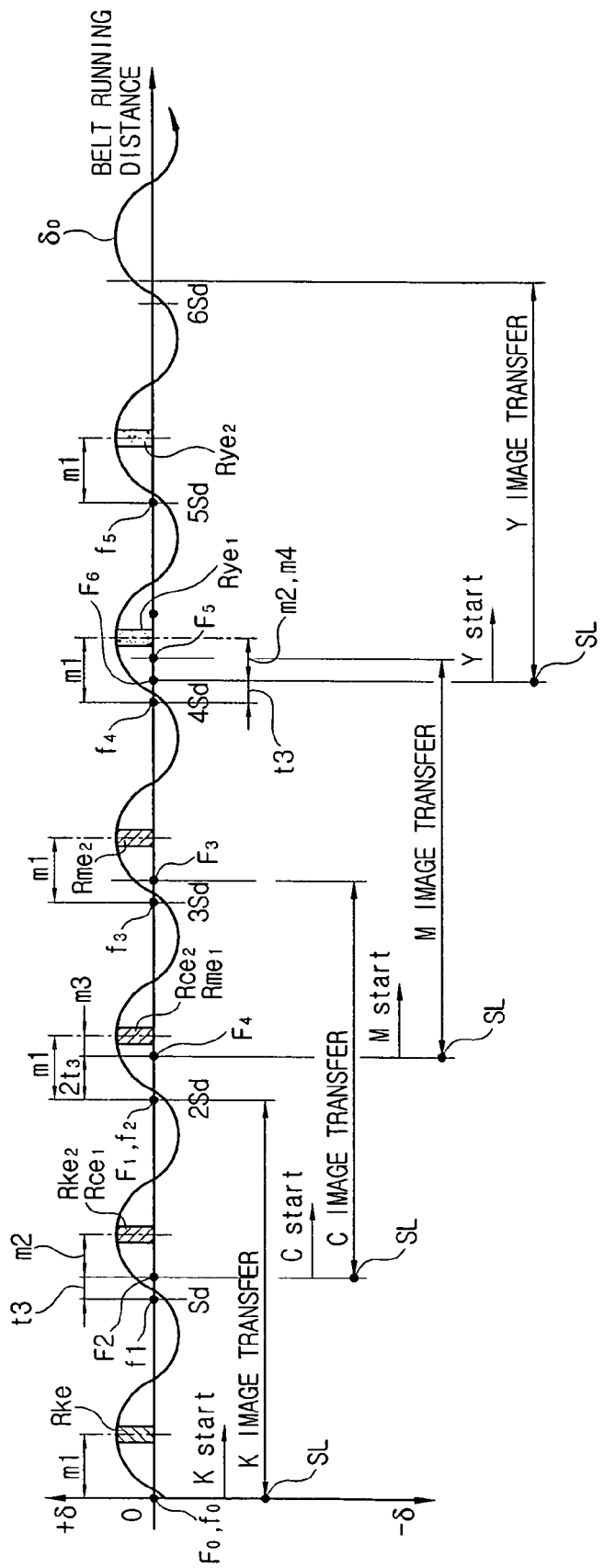
FIG. 12B is a graph of an image error caused due to manufacturing tolerances in the radius of the driving roller in the state of FIG. 12A.

Hereinafter, a method of aligning the two C and Y color image errors (Rce1, Rce2)(Rye1, Rye2) with each other will now be described with reference to FIGS. 12A and 12B. To this end, the image forming system is arranged to satisfy the sixth equation of Equation Set 1. That is, the two OPCs 40 and 60 are arranged as shown in FIG. 12A to satisfy L6=q·Sd. FIG. 12A shows L6=3Sd. That is, the distance between the centers C2 and C4 of the C color and Y color OPCs 40 and 60 is an integer multiple (in this example, 3) of the outer circumference Sd of the driving roller 80. The remaining distances L1, L2, L3, L4, AND L5 are not necessarily integer multiples of the outer circumference Sd. Comparing the configurations illustrated in FIGS. 11A and 12A, only the Y color OPC 60 of FIG. 12A varies in location. Therefore, the remaining OPCs 30, 40, 50 are understood to be arranged at the same position in FIG. 12A as in FIG. 11A.

Figure 11B:
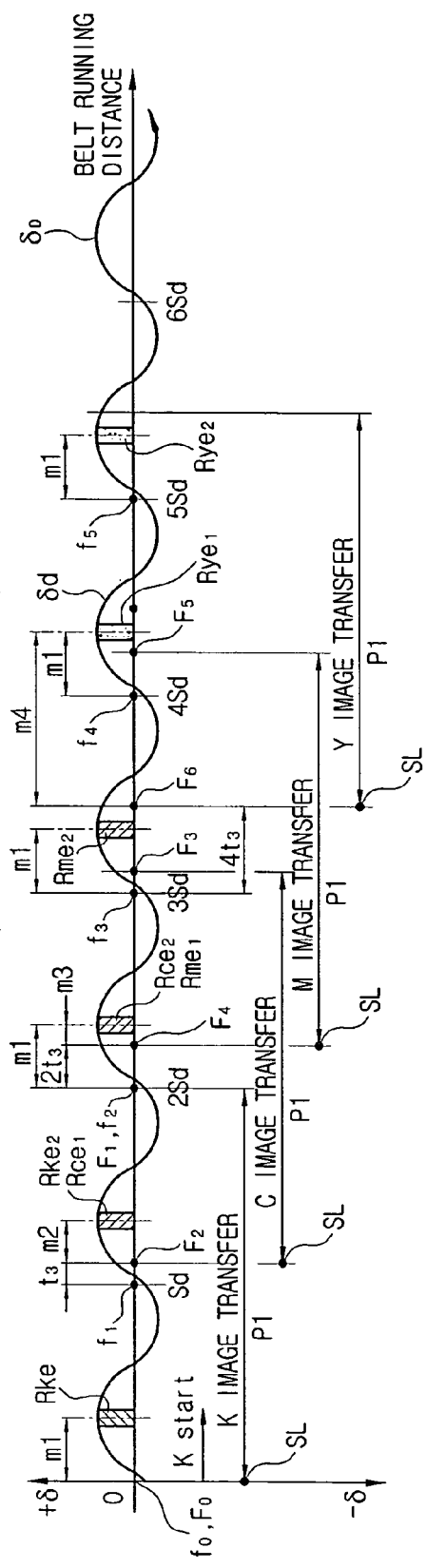
FIG. 11B is a graph of an image error caused due to manufacturing tolerances in the radius of the driving roller in the state of FIG. 11A

When the K color image is transferred from the point F0 in the state of FIG. 12A, the K color image transfer is performed during the two rotational cycles of the driving roller 80. Accordingly, the first and the second K color image errors (Rke1)(Rke2) due to the B interval occur at the same location as shown in FIGS. 11A and 11B. That is, the center of the first K color image error (Rke1) occurs away from the point f0 (F0) at a distance where the belt 70 is moved by a distance of m1=Rd·θd, and the center of the second K color image error (Rke2) occurs away from the point f0 at a distance where the belt 70 is moved by Sd+m2.

The first and the second C color image errors (Rce1) (Rce2) occur at the same location during the transfer of the C color image as shown in FIG. 11B. That is, as shown in FIG. 12B, the center of the first C color image error Rce1 occurs away from the point F2 (the transfer starting line SL of the C color unit image) at a distance where the belt 70 is moved by m2=m1-t3=Rd·θd-Rd·45°=Rd (θd-45°). The center of the second C color image error Rce2 occurs away from the point f2 at a distance where the belt 70 is moved past F2 by m2+Sd=Rd·(θd-45°)=2π·Rd=Rd·(2π+90°).

The first M color image error (Rme1) occurs away from the point F4 at a distance where the belt 70 is moved by a distance of m3=m1--2t3=Rd·θd-2Rd·45°=Rd·(θd-90°). The center of the second M color image error Rme2 occurs away from the point F4 at a distance where the belt 70 is moved by a distance of m3+Sd=Rd·(θd-90°)+2πRd=Rd·(2π+45°).

Since the center C4 of the Y color OPC 60 is distanced away from the center C2 by a distance of 3Sd, the point F6 from which the Y color image is transferred is located a distance where the belt 70 is moved from the point F2 from which the C color mage is transferred by three times the circumference of Sd (3Sd). Then, the point F6 is distanced away from the point f4 by t3, and the center of the first Y color image error Rye1 occurs away from the point f4 by m1 due to the interval B. Accordingly, since the center of the first Y color image error Rye1 occurs from the point F6, that is, from the transfer starting line (SL) of the Y color image, at a distance where the belt 70 is moved by m4=m1-t3=Rd·θd-Rd·45°=Rd·(θd-45°)=m2, the two image errors (Rce1, Rye1) are aligned with each other in the unit image area P1. Also, the center of the second Y color image error Rye2 occurs away from the point F6 at a distance where the belt 70 is moved by m4+Sd=m2+Sd=Rd·(θd-45°)+2π·Rd=Rd·(2π+90°). Accordingly, the second C image error (Rce2) and the second Y image error (Rye2) of the unit image area P1 are positioned away from the SL by the same distance and therefore, are aligned with each other.

As described above, in the full color image area P1 [where the images are transferred to the belt 70 through all of the four OPCs 30-60, there are six image errors including the overlay of image errors (Rke1, Rye1)(Rke2, Rye2), which is 2 errors less than the 8 image errors occurring in the construction of FIG. 11A. Accordingly, the image quality can be improved because the number of image errors decreases and thus, a reliability of a product can be improved.

In the above embodiment explained with reference to FIG. 12A, only the distance L6 between the centers of the C and Y color OPCs 40 and 60 are integer multiples of Sd. However, if at least one of the remaining distances L1, L2, L3, L4 and L5 satisfies the same conditions, the number of image errors aligned with each other can increase. Also, if Ro>Rd and the system is arranged to satisfy L1=L2=L3=n·Sd (n=1, 2, 3, . . . ), the 8 image errors decrease to the four overlaying images, and thus, the image quality can be improved. Since such an effect can be fully understood by referring to the previous descriptions with reference to FIGS. 12A and 12B, a detailed description will be omitted for the sake of brevity.

Also, in the description of an exemplary embodiment of the present invention using the Equation Set 1, the method of minimizing the occurrence of image errors caused due to the runout of the driving roller 80 is highlighted. However, this should not be considered as limiting. If an image error occurs due to a runout of the supporting roller 91, the occurrence of the image error can be minimized by using the above method and Equation Set 1 making any of the lengths L1-L6 equal to an integer multiple of the circumference of the supporting roller 91.

That is, the system is arranged to satisfy at least one of the equations in Equation Set 1 with respect to one of the driving roller 80 or the supporting roller 91 based on which has a greater radial displacement and greater effects on the image. On the other hand, with respect to the other roller, the runout can be minimized through a post-process such as precision machining, and the frequency of the image error occurrence caused by the supporting rollers of the belt 70 can be reduced.

Figure 13:
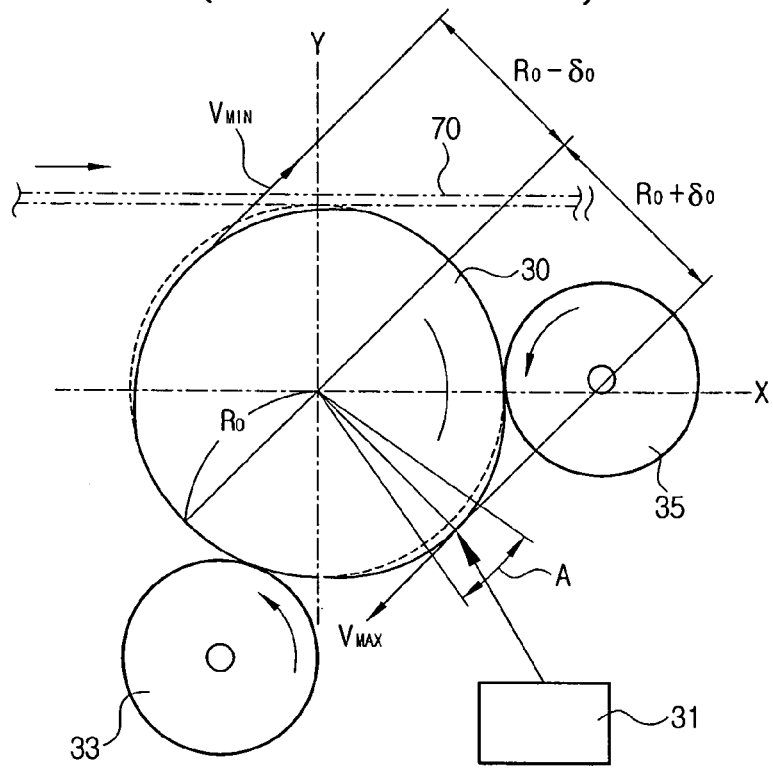
FIG. 13 is a structure view of a main part of a conventional image forming apparatus.

As described above with reference to FIGS. 4A though 7B, each OPC 30, 40, 50, 60 has an interval A having the maximum radial displacement +δo. An image error due to the interval A such as image blurring, image stretch, and image cut, occurs both in the color images formed on the respective OPCs 30, 40, 50, 60 and in the transfer image transferred to the belt 70. These will now be explained in greater detail with reference to FIG. 13. For example, in order to form a K color image, the OPC 30 is rotated and a surface of the OPC 30 rotated in contact with the charging roller 35 is charged with a predetermined electric potential. However, because the radius Ro of the OPC 30 increases as much as +δ0 due to the radial displacement +δo in the interval A, the interval A has a maximum tangential speed Vmax. Because the interval A passes more rapidly when being rotated in contact with the charging roller 35, the interval A receives less electric charge and thus has a lower electric potential than the other parts of the OPC 30.

Also, an electrostatic latent image is formed by scanning the surface of the OPC 30 with laser beams emitted from a laser scanning unit 31. During this procedure of forming the latent image, the interval A has increasing tangential speed Vmax. Accordingly, the interval A may have a decreasing amount of laser scan and increasing scan areas. The electrostatic latent image formed on the OPC 30 passes through the developing roller 33 so that toner particles are attracted from the developing roller 33 to the electrostatic latent image. Therefore, a visible image is obtained. During this procedure, however, the interval A passes in contact with the developing roller 33 more rapidly, and also, the amount of laser energy scanned onto the electrostatic latent image is less. As a result, less developer is attracted to the electrostatic image, and the developer attracted to the electrostatic image blurs due to the faster tangential speed. In summary, the visible image obtained on the surface of the OPC 30 through a series of procedures such as charging, laser scanning, and developing has an image error such as image blurring, image stretch, and image cut, in the interval A.

As described above, the visible image is formed on the surface of the OPC 30, but has an image error in the interval A prior to being transferred to the belt 70. The visible image which is transferred to the belt 70 may have an image error due to the interval A. As described above, the image error occurs due to the interval A caused by the runout of the OPC 30, 40, 50, 60, independently from the runout of the driving roller 80 as described above. Because one image error occurs in each OPC 30, 40, 50, 60 due to the runout of the OPCs 30, 40, 50, 60, a full color image may have a great number of image errors. For example, if each OPC 30, 40, 50, 60 is designed to rotate two times to form a unit image, two image errors may occur in each OPC 30, 40, 50, 60. As a result, a full color image has total eight image errors due to variations in radius of the OPCs 30, 40, 50, 60.

Meanwhile, the center of the interval A, which causes the image error to occur, can be arranged at a predetermined position with respect to the positioning part 33*b* of the driven coupler 33 as explained with reference to FIGS. 4A through 7B. That is, a mark 31*a* is formed on the drum body 31 at a predetermined angle from the center of the interval A, and the OPCs 30, 40, 50, 60 are assembled by coinciding the mark 31*a* with the positioning part 33*b*. Also, the OPCs 30, 40, 50, 60 can advantageously be assembled using a jig without requiring an extra measurement device.

Hereinafter, an image error occurring when the images are formed by using the respective OPCs 30, 40, 50, 60, each being mounted to have the center of the interval A positioned at a predetermined angle with respect to the positioning part 33*b*, will be described. Additionally, a method of reducing the number of image errors and an effect thereof according to an embodiment of the present invention will be described.

The description will mainly focus on the interval A of the respective OPCs 30, 40, 50, 60 which has radial displacement +δo. However, the like definition can be applied to an area having −δo. Because the image error becomes more problematic in the area having +δo than in the area having −δo, the description will be made mainly about the area having +δo.

For the convenience of the following exemplary explanation, it is assumed that the driving roller 80 and the supporting roller 91 form complete circles which have no runouts. It is also assumed that variations in speed of the belt 70 due to a radial displacement difference of the driving roller 80 and the supporting roller 91 does not occur, and that the belt 70 runs at a constant speed.

Figure 14A:
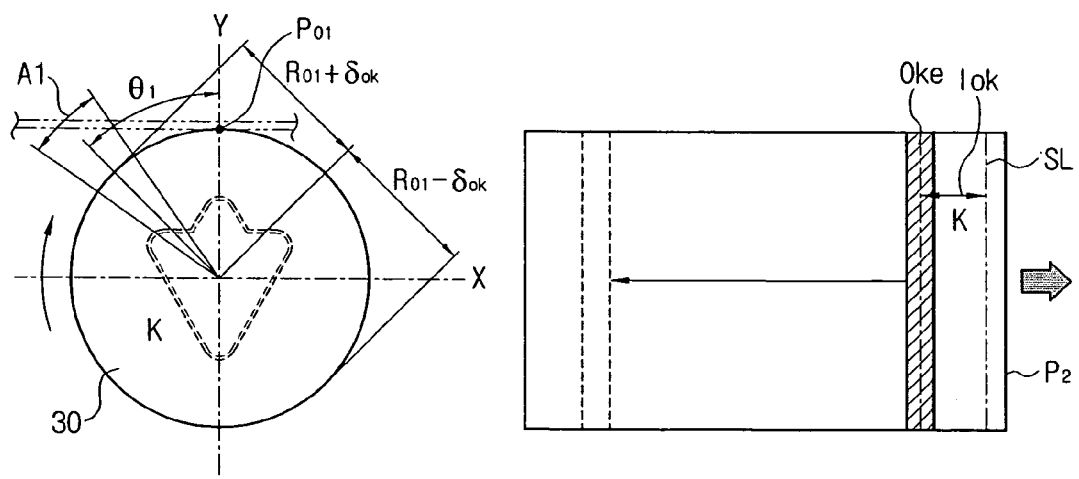
FIGS. 14A to 14D are schematic views of an image error caused due to image bearing bodies having radial displacement.

As shown in FIGS. 14A though 14D, the respective color OPCs 30, 40, 50, 60 are arranged in a manner so that the positioning parts 33*b* of the respective driven couplers are positioned at different angles from one another in a counterclockwise direction (+angle) from the axis Y. In this state, starting lines SL of unit images P2 are consecutively transferred to contact position Po1, Po2, Po3, and Po4 of the belt 70 with respect to the respective OPCs 30, 40, 50, 60, thereby forming an overlay of color images. The respective OPCs 30, 40, 50, 60 are arranged to have intervals A1, A2, A3, and A4, each having a maximum radial displacement +δo at a predetermined angle from the positioning part 33*b*. Also, as shown in FIGS. 14A through 14D, it is assumed that the respective OPCs have different postures at the beginning of the transfer. In the following, as case will be described in which the starting lines SL of the respective unit images P2 are transferred to the point Po1, Po2, Po3, and Po4 on the +Y axis of the respective OPCs 30, 40, 50, 60. That is, the postures of the respective OPCs 30, 40, 50, 60 refers to postures of the respective OPCs 30, 40, 50, 60 at the beginning of consecutive transfer of the respective color images K, C, M and Y.

As shown in FIG. 14A, if a printing starts when the K color OPC 30 is in contact with the axis +Y, the center of the interval A1 is positioned with respect to the +Y axis in a counterclockwise direction by angle $\ominus 1$. In FIGS. 14A through 14D, the centers of the intervals A1~A4 are distanced from the positioning part 33*b* by 45°. Accordingly, the K color image error Oke occurs at a predetermined position of the unit image area P2 of the belt 70 due to the interval A1. The image error Oke may include an image blurring, an image stretch, and an image cut. That is, because the tangential speed Vmax of the OPC 30 varies more rapidly in the interval A of the surface of the OPC 30 than the other intervals, a stretched electrostatic latent image is formed on the OPC (on the other hand, since the area −δo has a minimum tangential speed Vmin, a shrunken electrostatic latent image may occur). If the developing roller 33 performs a developing in contact with the OPC 30, there occurs an image blurring in the interval A1 due to difference from a nominal speed of the OPCs. When the image is transferred to the belt 70 through the above processes, there occurs a speed difference between the interval A1 and the belt 70 in contact with the interval A1, which results in the image blurring. The center of the K color image error Oke occurs away from the starting line SL by 1$ok$=Ro1·$\ominus 1$.

Figure 14B:
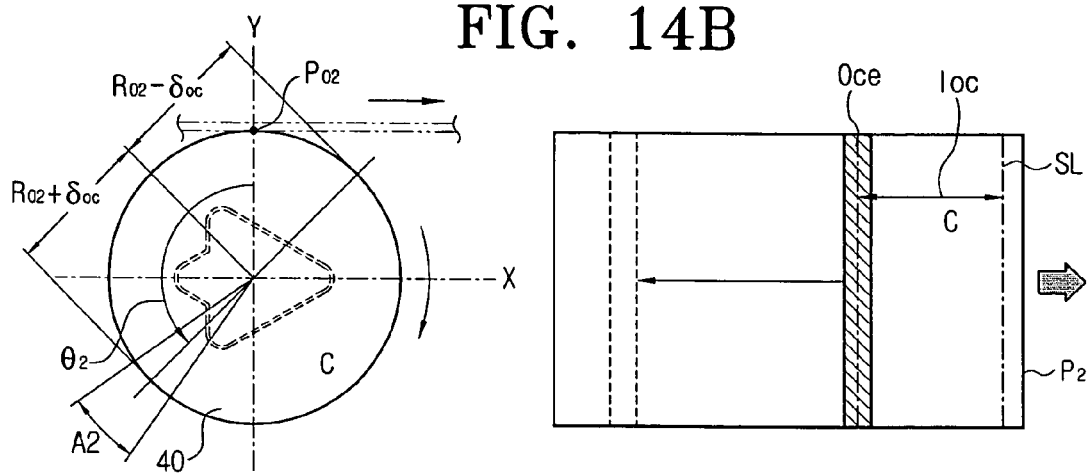

As shown in FIG. 14B, the C color OPC 40 has the center of the interval A2 positioned with respect to the +Y axis such that $\ominus 2$=+135°. In this case, the C color image error Oce occurs in the unit image area P2 due to the interval A2 and at a different position from that of the K color image error Oke. That is, the C color image error Oce occurs away from the starting line at position 1$oc$=Ro2·$\ominus 2$.

Figure 14C:
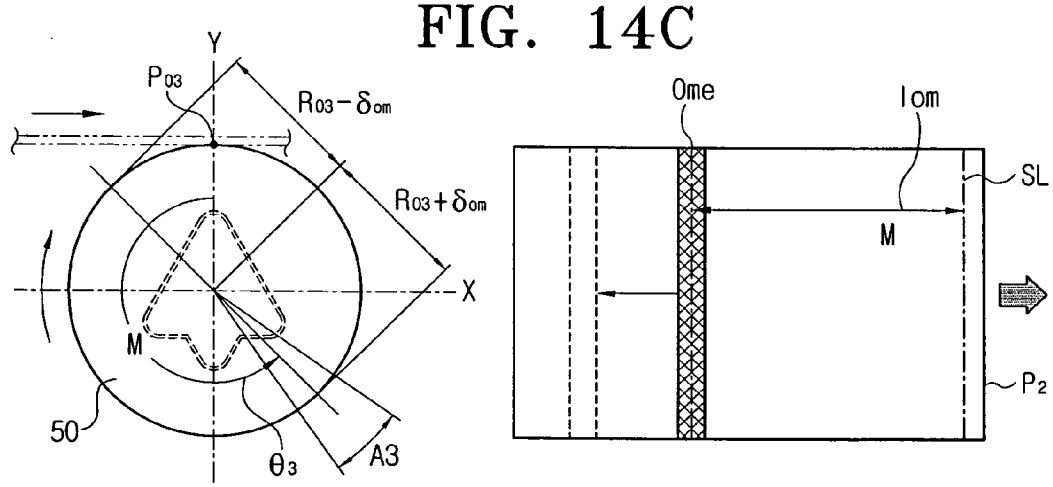

Referring to FIG. 14C, the center of the interval A3 of the M color OPC 50 is positioned with respect to the +Y axis in a counterclockwise direction such that $\ominus 3$=+225°. Accordingly, the M color image error Ome occurs in the unit image area P2 due to the interval A, and occurs at a different position from the K and C color image errors Oke and Oce. That is, the M color image error Ome occurs away from the staring line SL at position 1$om$=Ro3·$\ominus 3$.

Figure 14D:
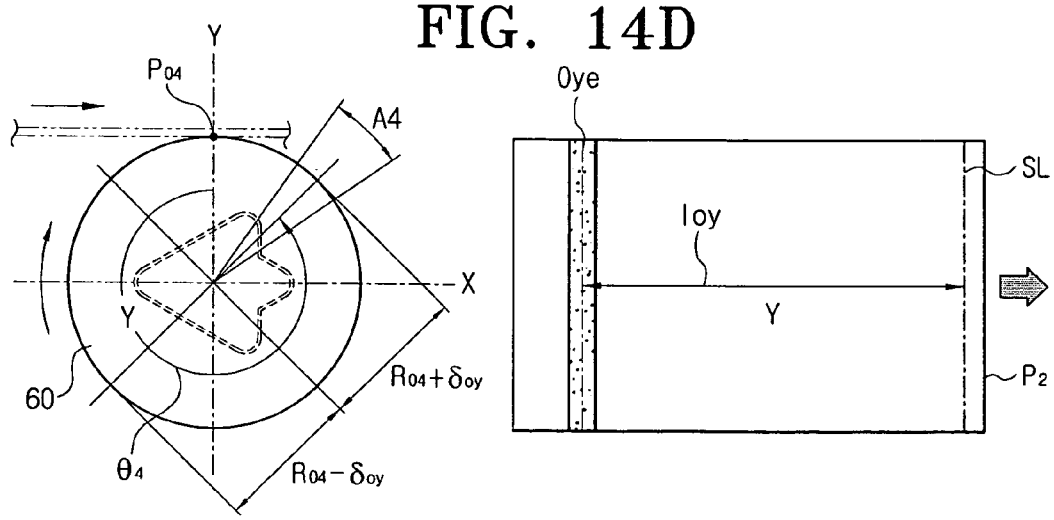
Figure 14E:
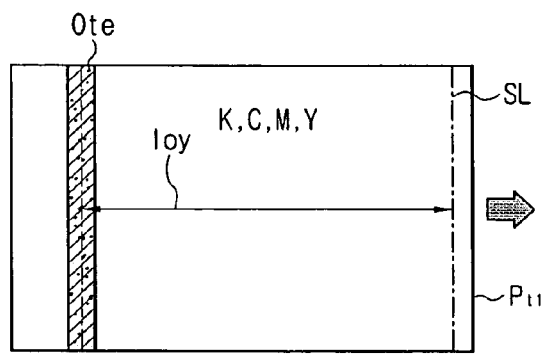
FIG. 14E is a view of an overlay of image errors which are caused due to the radial displacement of each image bearing body.

Referring to FIG. 14D, the center of the interval A4 of the Y color OPS 60 is positioned with respect to the +Y axis in a counterclockwise direction such that $\ominus 4$ =+315°. Accordingly, a Y color image color Oye occurs in the unit image area P2 due to the interval A4 of the OPC 60, but occurs at different positions from those of the K, C, M color image errors (Oke)(Oce)(Ome). That is, the Y color image error occurs away from the starting line SL at position 1$oy$=Ro4·$\ominus 4$.

Referring to FIGS. 14A and 14D, if Ro1=Ro4=Ro, a distance between the centers of the image erros Oke and Oce is 1$oc$−1$ok$=Ro·($\ominus 2$−$\ominus 1$). As a result, since the color image errors are misaligned in the unit image area P2, the respective color image errors Oke, Oce, Ome, Oye are located at different positions on the overlay of color images, which deteriorates an image quality.

An example of the above will be described in greater detail with reference to FIGS. 15A and 15B.

Figure 15A:
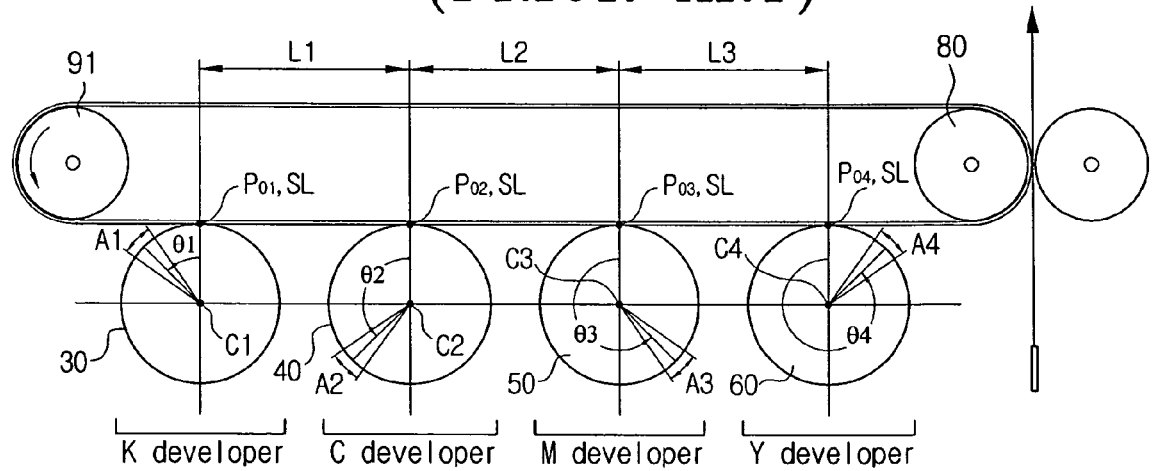
FIG. 15A is a schematic structure view of a conventional image forming apparatus in which an image bearing body having a radial displacement is employed.

FIG. 15A shows the OPCs 30, 40, 50, 60 of FIGS. 14A through 14D in a single view. In FIG. 15A, since the respective OPCs 30, 40, 50, 60 are illustrated with reference to staring points Po1, Po2, Po3, and Po4 for transferring the respective color image, time is not taken into account in the following description.

Figure 15B:
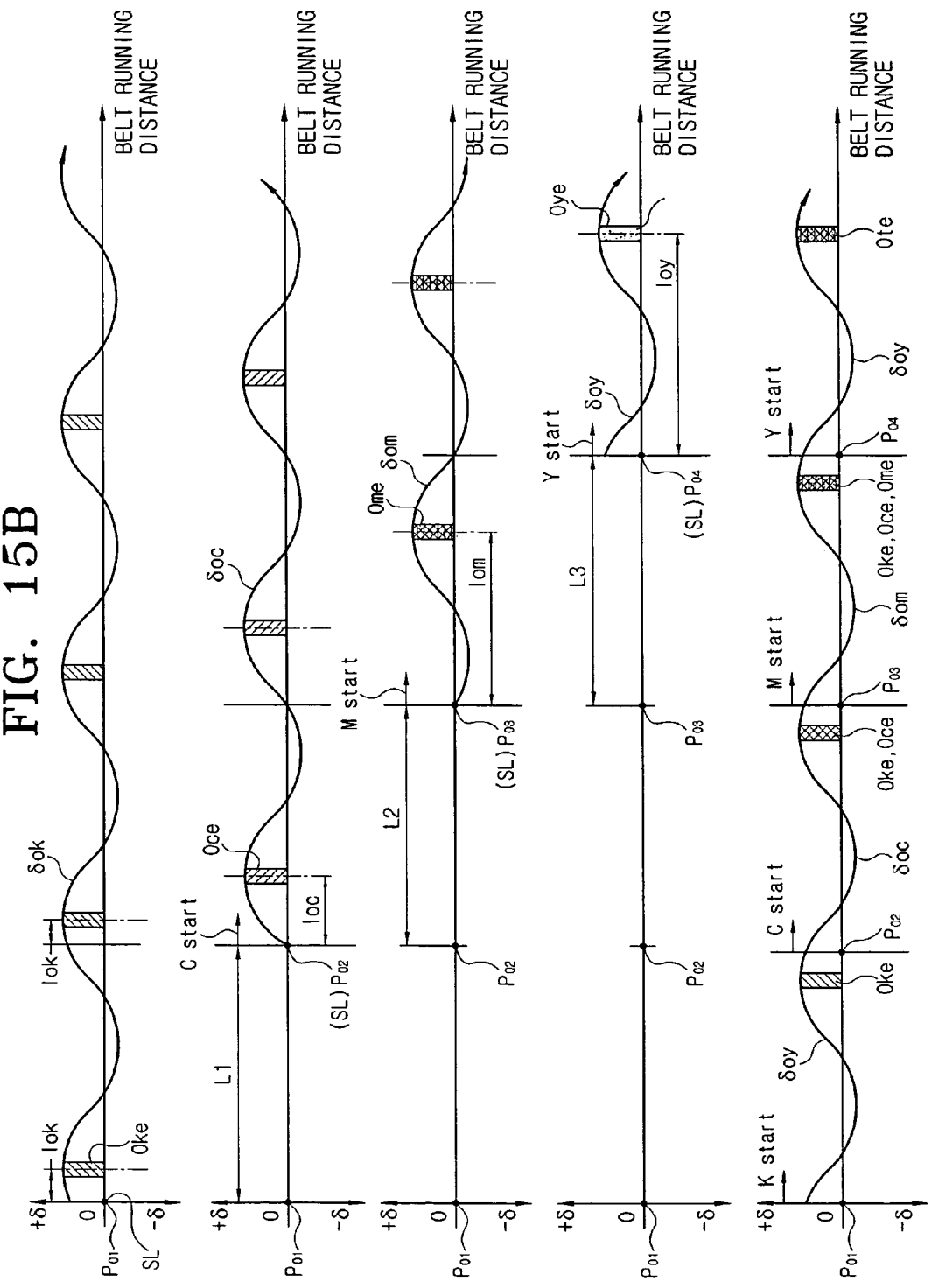
FIG. 15B is a graph of an image error caused due to the image bearing bodies of FIG. 15A.

FIG. 15B shows a radial displacement (δok,δoc,δom, δoy) per color in the form of sinusoidal curve according to a rotational cycle of the OPCs 30, 40, 50, 60. In the drawing, the intervals between centers of each OPC 30, 40, 50, 60 are not considered, and the radial displacement and image error per color are shown based on transfer points Po1, Po2, Po3, Po4 per color. The radius of each OPC 30, 40, 50, 60 is uniform, that is, Ro1=Ro2=Ro3=Ro4=Ro.

The first graph of FIG. 15B shows a radial displacement (δ ok) according to the rotational cycle of the OPC 30, assuming that the transfer of the K color OPC 30 starts in a position shown in FIGS. 14A and 15A. If assuming that an K unit image is formed when the OPC 30 is once rotated, the transfer of K color image starts from the point Po1, and therefore, the center of K image error Oke by the interval A1 occurs in one rotational cycle (unit image area; P2). That is, a distance traveled by 1ok=Ro·θ1=Ro~45° from the SL point for the belt 70 to transfer the K color image.

The second graph of FIG. 15B shows a radial displacement (δ oc) according to rotational cycle of the C color OPC 40 disposed as shown in FIG. 14B. The transfer of C color starts from the point Po2, and the point Po1, in which the transfer of K color image starts, aligns with the line SL, in which the transfer of C color image starts, at the point Po2. Referring to FIG. 15A, the interval between two points Po1 and Po2 on actual belt 70 is the distance L1 between the rotation centers C1, C2 of the two OPCs 30, 40. Accordingly, the SL of K color image starting the transfer from the point Po1 meets the point Po2 after the belt 70 travels L1 distance to start the transfer of C color image. In FIG. 14B, the interval A2 is located in a phase from the point Po2 to θ2 (115°), and therefore, the center of the C color image error Oce is located in the SL based on one rotational cycle (unit image area; P2). That is, the distance the belt 70 is traveled is 1oc=Ro·θ2 (115°) from the point Po2. If both of the two image errors Oke, Oce are generated in the unit image area P2, the graph shows that the interval between the centers of the two image errors Oke, Oce is 1oc−1ok=Ro·(θ2−θ1) as explained in FIG. 14B.

The third graph of FIG. 15B shows a radial displacement (δ om) according to the rotational cycle of the M color OPC 50 disposed as shown in FIG. 14C. The center of interval A3 is located on the phase of θ3 (225°) from the point Po3 in which the transfer of M color starts. The M color image error Ome by the interval A3 is generated in the M color image when the M OPC 50 is rotated by θ3. Accordingly, the center of the M color image error Oce is generated in the distance where the belt 70 travels from the point Po3 to 1om=Ro·θ3. When one rotational cycle of the OPC 50 is divided into 360°, the distance 1om=Ro·θ3 lies at a location which is rotated by approximately 225° from the point Po3. Accordingly, the distance between centers of two image errors Oce, Ome is 1om−1oc=Ro·(θ3−θ2). The interval between points Po2, Po3 represents the distance L2 between the rotational centers C2, C3 of the two OPCs 40, 50, and the SL of K color image and C color image aligns at the point Po3 with SL of M color image superimposed by the OPCs 30, 40.

The fourth graph of FIG. 15B shows a radial displacement (δ oy) according to rotational cycle of the Y color OPC 60 disposed as shown in FIG. 14D. The center of interval A4 is located in a phase of θ4 (315°) from the point Po4. Accordingly, the Y color image error Oye caused by interval A4 is generated as OPC 60 is rotated by approximately 315° when one rotational cycle (unit image area; P2) of the OPC 60 is divided into 360°. The center of the Y color image error Oye is located in a distance where the belt 70 travels from the point Po4 by 1oy=Ro·θ4=Ro·215°. The interval between the centers of the two image errors Ome, Oye is 1oy−1om=Ro·(θ4−θ3). As each color image is superimposed, image errors are generated in different positions, and therefore, the quality of the overlapped color images is deteriorated.

As shown in FIG. 15B, the phase of radial displacements (Γok,δoc,δom,δoy) per each color are different with respect to one rotational cycle (unit image area; P2). Accordingly, if assuming that the unit image area P2 is formed by one rotational cycle of the OPC, the image errors Oke, Oce, Ome, Oye per each color are generated at different relative positions. Four image errors are generated at different positions in the unit image area P2.

In FIGS. 14A-14D, and 15B, the radius of each OPC 30 to 60 is uniform as Ro, and one unit image is formed by one rotation of each OPC 30, 40, 50, 60. However, in practice, one unit image may not correlate with one rotation of an OPC. For example, one unit image may be formed by one, one and half, or two rotations according to the size of the radius of OPCs 30, 40, 50, 60. Accordingly, more than one image error may be introduced for each OPC per unit image area. Thus, at least four image errors, and possibly more, are generated in the unit image area of a full color image, and therefore, image quality is deteriorated.

In addition, in the foregoing description, it was assumed that all of the OPC's have the same radius. Of course, as one of ordinary skill in the art will appreciate, the principles described above could also be applied if the OPC drums are not all of equal radius. For example, rather than controlling the distance between rotation centers of OPCs, the same effect can be obtained by controlling the distance between contact points of the OPCs. That is, each OPC has a contact point on the belt 70. By controlling the length between contact points of OPCs along the belt, image errors caused by radius deviations in the OPCs can be overlapped, and thereby reduced. In such a scenario, because the radii are not equal, the length between centers of rotation may not necessarily be equal to the length along the belt between contact points.

If the position of each radial displacement +δ of OPCs 30 to 60 is aligned based on the initial transfer point of each OPC 30, 40, 50, 60, that is, if each OPC 30, 40, 50 is adjusted and arranged to generate each image error Oce, Ome, Oye shifted by a certain distance, only a single overlapped Ote of four color image errors is generated. As shown in the fifth graph of FIG. 15B, the radial displacement δok,δoc,δom,δoy of each OPCs 30, 40, 50, 60 appears in a regular pattern in the unit rotational cycle (unit image area; P2). Because each radial displacement δok,δoc,δom,δoy in the unit rotational cycle (unit image area; P2) is aligned, the image errors Oke, Oce, Ome, Oye per each color are aligned in the same phase.

The fifth graph of FIG. 15B shows image errors generated when each of four OPCs 30, 40, 50, 60 are aligned. However, the total number of image errors can be greatly reduced even when the image errors of at least two OPCs are superimposed. Hereinafter, an exemplary method and operation effect for overlaying image errors of two or more OPCs will be explained in detail.

FIGS. 14A-14D, and 15B were previously explained based on a sequence of transfer points of each OPCs. The following exemplary description will explain the relationship between OPCs based on the engagement relationship between each of the OPCs and the driven couplers corresponding to the OPCs at the time of system installation.

Accordingly, description will now be made with reference to FIGS. 16A to 16D.

Figure 16A:
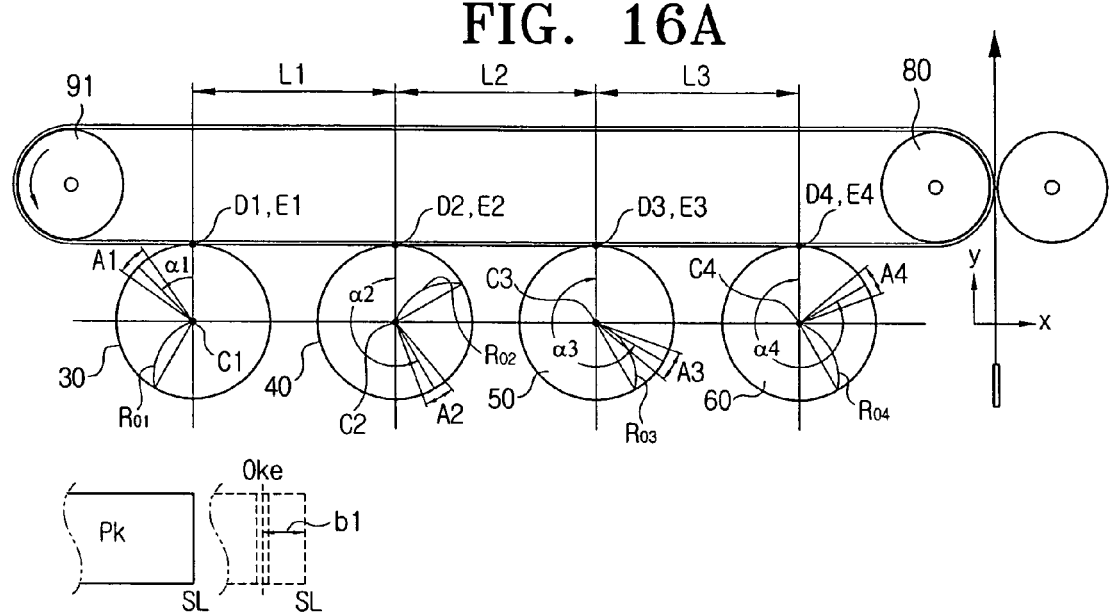
FIG. 16A through 16D are a schematic structure views of an image forming apparatus according to a third embodiment of the present invention.

FIG. 16A shows a point when the K color OPC 30 is initially transferred. The transfer start position with respect to the belt 70 is D1, the position of the K color OPC 30 contacting the belt 70 is E1, and the angle between E1 and the center of the maximum radial displacement area A1 is α1 (since the present drawing differs from FIGS. 14A to 14D which are based on the sequential transfer points of each OPCs, general angles $\alpha 1 \sim \alpha 4$ are used in FIG. 16A). At this time, the contacting point between the C color OPC 40 and the belt 70 is D2, the corresponding position of the C color OPC 40 is E2, and the angle between the E2 and the center of the maximum radial displacement area A2 of the C color OPC 40 is a2. The position on the belt 70 starting the transfer of the M color OPC 50 is D3, the contacting position of the M color OPC 50 is E3, and the angle between the E3 and the center of the maximum radial displacement area A3 is a3. The contacting point between the Y color OPC 60 and the belt 70 is D4, the corresponding position of the Y color OPC 60 is E4, and the angle between the E4 and the center of the maximum radial displacement area A4 of the Y color OPC 60 is a4. The distance between C1 and C2 is L1, the distance between C2 and C3 is L2, the distance between C3 and C4 is L3, and the radii of the OPCs 30, 40, 50, 60 are Ro1, Ro2, Ro3, Ro4. The OPCs may be mounted to meet any one of the following Equation Set 2.

[Equation Set 2]

$$\{2\pi \cdot 1+(\alpha 2-\alpha 1)\}\cdot Ro\cdot (1\pm 0.05)=L1,(1=0,1,2,\ldots),(Ro=Ro1=$$

$$\{2\pi \cdot m+(\alpha 3\alpha 1)\}\cdot Ro\cdot (1\pm 0.05)=L1+L2,(m=0,1,2,\ldots),(Ro=Ro1=Ro3) \qquad (2)$$

$$\{2\pi \cdot n+(\alpha 4\alpha 1)\}\cdot Ro\cdot (1\pm 0.05)=L1+L2+L3,(n=0,1,2,\ldots (Ro=Ro1=Ro4) \qquad (3)$$

In FIG. 16A, the K color OPC 30 is initially transferred to the K unit image Pk. The starting line SL of the K unit image Pk starts from the position D1 on the belt 70 and contacts the point E1 of the OPC 30. The center of interval A1 is located in the angle of $\alpha 1$ along the +Y axis from the point E1. The C color OPC 40 contacts the position D2 on the belt 70, and the center position of interval A2 is rotated by $\alpha 2$ from the contacting position E2 on the OPC 40. Likewise, each center of intervals A3 and A4 of the M color OPC 50 and the Y color OPC 60 is located at the angle rotated by $\alpha 3$, $\alpha 4$ from each E3 and E4.

Figure 16B:
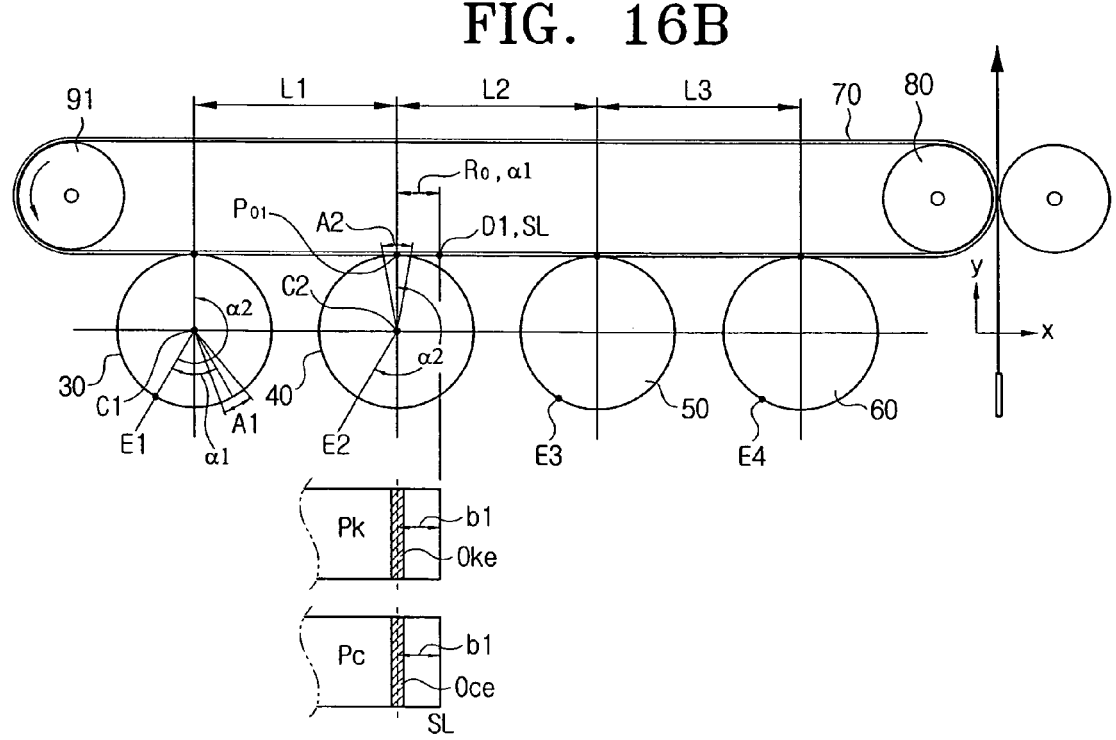

The K color image is transferred to the K unit image Pk in the state of FIG. 16A, and the center of the K image error Oke caused by the interval A1 appears away from the starting line SL by $b1=Ro\cdot \alpha 1=Ro1\cdot \alpha 1$. If the center of the C color image error Oce generated in the C unit image Pc by the interval A2 of the C OPC 40 is aligned with the center position of the image error Oke as the center of the K color image error Oke reaches the position Po6 contacting the C color OPC 40 and the belt 70 as shown in FIG. 16B, the two image errors Oke, Oce are superimposed at the same position. Here, the following equation meets the above conditions.

$$Ro\cdot \alpha 1+L1=Ro\cdot \alpha 2,(Ro=Ro1=Ro2) \qquad (1)$$

Because the distance of L1 is within one rotational circumference length $2\pi \cdot Ro$ of the OPC 30, that is, $L1<2\pi \cdot Ro$, the equation (1) may be generalized as follows:

$$Ro\cdot \alpha 1+L1=Ro\cdot (\alpha 2+2\pi \cdot 1),(1=0,1,2,\ldots) \qquad (2)$$

The above equation (2) can be rewritten as follows:

$$\{2\pi \cdot 1+(\alpha 2-\alpha 1)\}\cdot Ro=L1,(1=0,1,2,\ldots) \qquad (3)$$

The above equation (3) corresponds to the first equation of Equation Set 2. If two OPCs 30, 40 are arranged to satisfy equation (3), the image errors Oke, Oce by the intervals A1, A2 of K color and C color OPC 30, 40 are superimposed at the same position. More specifically, when setting each OPCs 30, 40 in the image forming apparatus, the K color OPC 30 is preferably first set as the S1 and Ro values are set.

Then, if a certain $\alpha 1$ value of the K color OPC 30 is substituted using the first equation of the equations 2, $\alpha 2$ of the C color OPC 40 can be obtained. Therefore, if the C color OPC 40 is properly arranged along axes X and Y based on the obtained $\alpha 2$, the image errors Oke, Oce can be superimposed.

Figure 16C:
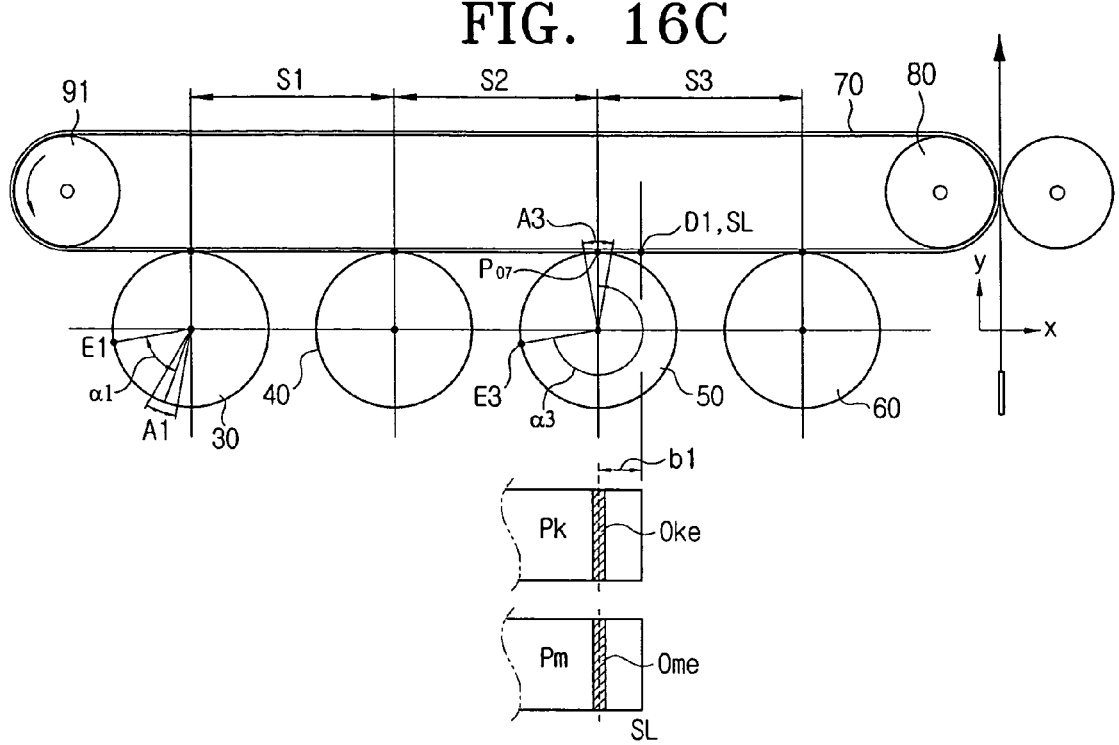

Additionally, as shown in FIG. 16A, the center of K image error Oke appears away from the starting line SL as much as $b1=Ro\cdot \alpha 1=Ro1\cdot \alpha 1$. If the center of the M image error Ome generated in the M unit image Pm by the interval A3 of the M color OPC 50 is aligned with the center of the K image error Oke as the center of the K image error Oke reaches the contacting position Po7 with respect to the belt 70 of the M OPC 50 as shown in FIG. 16C, the two image errors Oke, Ome are superimposed at the same position. To this end, the two OPCs 30, 50 need to meet the following equation (4).

$$Ro\cdot \alpha 1+L1+L2=Ro\cdot (\alpha 3+2\pi \cdot m),(m=0,1,2,\ldots),(Ro=Ro1=Ro3) \qquad (4)$$

Rewriting the above equation (4), the second equation of the Equation Set 2 can be derived as follows:

$$\{2\pi \cdot m+(\alpha 3-\alpha 1)\}\cdot Ro=L1+L2,(m=0,1,2,\ldots),(Ro=Ro1=Ro3) \qquad (5)$$

Figure 16D:
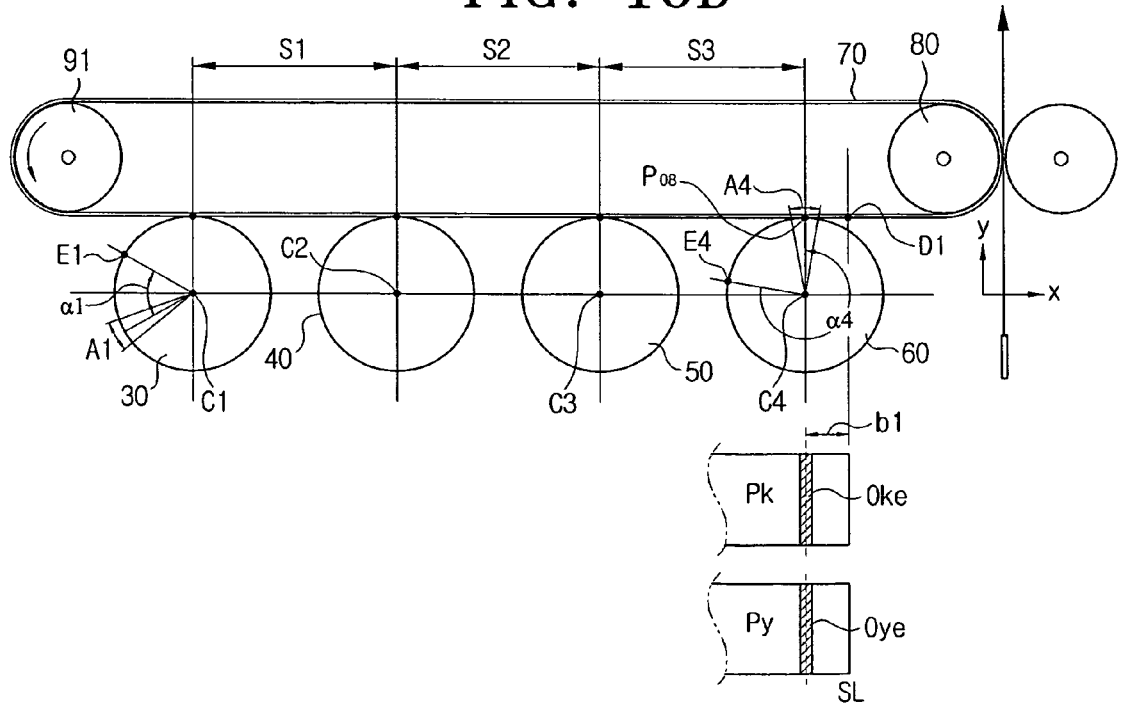

In order to align the K color image error Oke with the Y color image error Oye generated in the unit image Py by the interval A4 of the Y OPC 60 as shown in FIG. 16D, the center of the interval A4 needs be located on the point Po8 when the position D1 of the belt 70 is moved from the point Po8 by $b1=Ro\cdot \alpha 1=Ro1\cdot \alpha 1$. This condition may be represented in the following equation (6).

$$Ro\cdot \alpha 1+L1+L2+L3=Ro\cdot (\alpha 4+2\pi \cdot n),(n=0,1,2,\ldots),(Ro=Ro1=Ro4) \qquad (6)$$

The above equation (6) can be rewritten as:

$$\{2\pi \cdot n+(\alpha 4-\alpha 1)\}\cdot Ro=L1+L2+L3,(n=0,1,2,\ldots),(Ro=Ro1=Ro4) \qquad (7)$$

Equation (7) rewritten from the equation (6) corresponds to the third equation of the Equation Set 2.

The aforementioned conditions of Equation Set 2 can be used to control the installation position of OPCs 40, 50, 60 so that image errors generated by one of the OPCs 40, 50, 60 can be superimposed on the K color image error Oke generated by the interval A1 of the K OPC 30.

Additionally, contrary to the Equation Set 2, in order to superimpose the image error generated in at least neighboring OPCs 30, 40, 50, 60, the image forming apparatus needs be set to meet at least one of the following equations.

[Equation Set 3]

$$\{2\pi \cdot 1+(\alpha 2-\alpha 1)\}\cdot Ro\cdot (1\pm 0.05)=L1,(1=0,1,2,\ldots),(Ro=Ro1=Ro2) \qquad ①$$

$$\{2\pi \cdot m+(\alpha 3-\alpha 2)\}\cdot Ro\cdot (1\pm 0.05)=L2,(m=0,1,2,\ldots),(Ro=Ro2=Ro3) \qquad ②$$

$$\{2\pi \cdot n+(\alpha 4-\alpha 3)\}\cdot Ro\cdot (1\pm 0.05)=L3,(n=0,1,2,\ldots),(Ro=Ro3=Ro4) \qquad ③$$

where, the equation ① of the Equation Set 3 corresponds to the first equation of the Equation Set 2. The equations represent the conditions to align the image errors Oke; Oce generated by the two neighboring OPCs 30, 40. Of course the above equations refer to a distance between centers of rotation of the OPCs. Alternatively, the distance between points of contact on the belt 70 of each OPC could be controlled with respect to the orientation of the OPC rollers.

The second equation of the Equation Set 3 represents conditions to align the image errors Oce, Ome generated by the interval A2, A3 of the C and M color OPCs 30, 40, and the method of overlapping image errors of the two OPCs 30, 40 can be easily comprehended through the aforementioned method. In other words, if α2 value of the C color OPC 40 is set with set L2 value and Ro value, α3 value of the M color OPC 50 can be obtained through equation ② of the Equation Set 3. Accordingly, by setting the M color OPC 50 based on α3 value, the two image errors Oce, Ome can be superimposed.

Equation (3) of the Equation Set 3 represents conditions to superimpose the image errors Ome, Oye generated by the intervals A3, A4 of the M and Y color OPCs 50, 60. At this time, the image errors Ome, Oye of the two OPCs 50, 60 can be superimposed in the same manner as that explained in FIGS. 16A-16D which is used to superimpose one of the other image errors Oce, Ome, Oye on the image error Oke by the interval A1 of the K color OPC 30. In other words, when L3 and Ro are provided as set values, and the M color OPC 50 is first mounted to a certain position, α3 value of the mounted M color OPC 50 can be obtained. Then α3 is substituted for equation (3 of Equation Set 3 to obtain α4 value. Accordingly, when the Y color OPC 60 is set to correspond to the obtained α4 value, two image errors Ome, Oye can be superimposed.

In preferred embodiments of the present invention, the distances between the centers C1, C2, C3, C4 of each OPC 30, 40, 50, 60 are identically set as L1=L2=L3. Therefore, the Equation Set 2 can be rewritten as follows:

[Equation Set 4]

$$\{2\pi \cdot 1 + (\alpha 2 - \alpha 1)\} \cdot Ro \cdot (1 \pm 0.05) = L1, (l=0, 1, 2, \ldots), (Ro = Ro1 = Ro2) \quad (1)$$

$$\{2\pi \cdot m + (\alpha 3 - \alpha 1)\} \cdot Ro \cdot (1 \pm 0.05) = 2L1, (m=0, 1, 2, \ldots), (Ro = Ro1 = Ro2 = Ro3) \quad (2)$$

$$\{2\pi \cdot n + (\alpha 4 - \alpha 1)\} \cdot Ro \cdot (1 \pm 0.05) = 3L1, (n=0, 1, 2, \ldots), (Ro = Ro1 = Ro2 = Ro3 = Ro4) \quad (3)$$

In the same manner as described with reference to FIGS. 4A through 7B, the OPCs 30, 40, 50, 60 are mounted so that the intervals A1, A2, A3 and A4 of the respective OPCs 30, 40, 50, 60 are disposed at the same phase with respect to the positioning part 33b of the driven coupler 33. Of course the above equations refer to a distance between centers of rotation of the OPCs. Alternatively, the distance between points of contact on the belt 70 of each OPC could be controlled with respect to the orientation of the OPC rollers.

In this case, L1, Ro and the maximum radial displacement location on the reference OPC, that is, the location of the interval A1 (α1) are obtained. In this embodiment, the K color OPC 30 is preferably set as the reference OPC. Additionally, the maximum radial displacement locations (α2, α3 and α4) of the other OPCS 40, 50, 60 are obtained to satisfy equations 2 and 3, and the respective OPCs 40, 50, 60 are mounted accordingly. In order for visual confirmation of the radial displacement locations, the positioning part 33b of the driven coupler may be fastened in the factory to have a predetermined interval (for example, 45°) with respect to the respective radial displacement locations, as shown in FIG. 4A. Therefore, the initial position of the OPCs 30, 40, 50, 60 can be determined with reference to the positioning part 33b.

After the maximum radial displacement locations (α2, α3 and α4) of the other OPCS 40, 50, 60 are determined with respect to the location α1 of the reference OPC 30, the OPCs 30, 40, 50, 60 can be mounted in the image forming apparatus through at least two methods, which will now be described in more detail.

As a first method, as described above, the respective OPCs 30, 40, 50, 60 are mounted such that the positioning part 33b of the driven coupler is positioned at a predetermined angle with respect to the maximum radial displacement +δo. One of the OPCs, namely, OPC 30 is connected to the driving coupler 133 as shown in FIG. 3. In a state that the OPC 30 is mounted, α1 can be detected using a predetermined detecting device. In this state, α2, α3 and α4 of the other OPCs 40, 50, 60 are obtained by applying L1, L2, L3, Ro and α1 to the second and third equations of Equations Set 2. The maximum radial displacement +δo of the OPCs 40, 50, 60 are controlled using the detecting device to meet the obtained α2, α3 and α4, and the OPCs 40, 50, 60 are engaged with the driving couplers 134, 135 and 136. According to another example of the first method, the OPCs 30, 40, 50, 60 may be connected to the driving couplers 133-136 in a state that the driving coupler 133 connected to the K color OPC 30, which is the reference OPC, is set to a predetermined position and the other driving couplers 134-136 are positioned corresponding to the obtained α2, α3 and α4. Of course, the positioning parts of the driving couplers 133-136 can be adjusted by using detecting equipment.

Figure 17A:
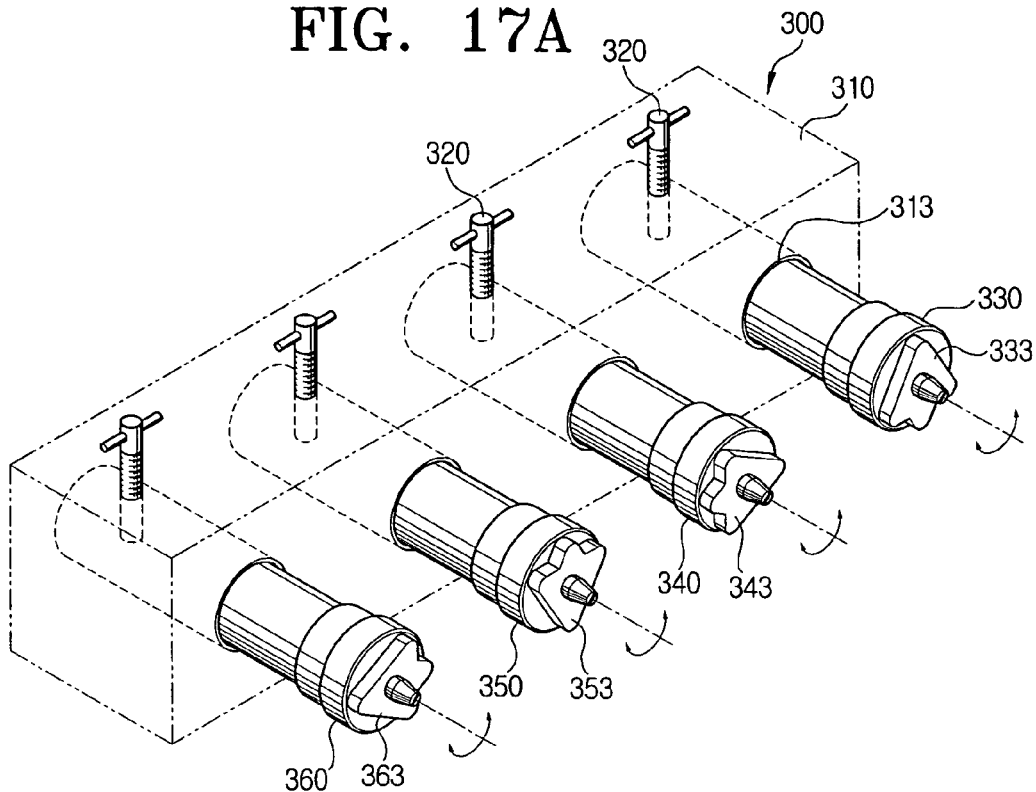
FIG. 17A is a schematic perspective view of a jig which is provided for setting an image bearing body according to an embodiment of the present invention.

A second method for setting the OPCs is to use a jig. For example, as shown in FIG. 17A, a jig device 300 may be used, in which a plurality of reference drums 330, 340, 350, 360 are adjustably mounted in a jig frame 310. The reference drums 330, 340, 350, 360 correspond to parts of the color OPCs 30, 40, 50, 60 which are mounted in the image forming apparatus. Intervals between the reference drums 330, 340, 350, 360 are preferably the same as those of the driving couplers 133-136 of the driving unit 100 (FIG. 3) where the OPCs are mounted. The reference drums 330, 340, 350, 360 respectively have at the front end thereof driven couplers 333, 343, 353 and 363 corresponding to the driven coupler 33 of the OPCs 30, 40, 50, 60. Accordingly, the driven couplers 333, 343, 353 and 363 are complimentarily mated with the corresponding driving couplers 133 to 136, respectively. Also, it will be understood that positioning parts of the driven couplers 333, 343, 353, 363 are positioned at the same phase as the positioning part 33b of the driven coupler 33 provided to the substantial OPCs 30, 40, 50, 60, that is, at a predetermined angle with respect to the maximum radial displacement +δo of the OPC.

Meanwhile, the reference drums 330, 340, 350, 360 are rotatably inserted in adjusting holes 313 formed at predetermined intervals on the jig frame 310. In addition, the jig frame 310 has fixing members 320 corresponding to the respective reference drums 330, 340, 350, 360. The plurality of fixing members 320 are fastened to the jig frame 310 in a threaded manner such that one end of each is contacted with the reference drums 330, 340, 350, 360 being inserted in the adjusting holes 313. Therefore, as the fixing member 320 is rotated toward the reference drums 330, 340, 350, 360, the one end is tightly contacted with the reference drums 330, 340, 350, 360, thereby immovably fixing the reference drums 330, 340, 350, 360. On the other hand, as the fixing member 320 is rotated away from the reference drums 330, 340, 350, 360, the reference drums 330, 340, 350, 360 and the fixing member 320 are separated from each other so that the reference drums 330, 340, 350, 360 are rotatable within the adjusting holes 313.

Using the jig device 300, the positions of the reference drums 330, 340, 350, 360, instead of the OPCs 30, 40, 50, 60 mounted in the driving unit 100, can be controlled and fixed to satisfy any of the equations in Equation Set 2 or 3.

In order to control reference positions of the reference drums 330, 340, 350, 360, the first method described above can be used. In other words, α1 of a predetermined reference drum, for example, the reference drum 330 is detected and α2, α3 and α4 of the other reference drums 340, 350, 360 are obtained with respect to α1. Based on the obtained α2, α3 and α4, the positions of the respective reference drums 330, 340, 350, 360 are controlled and fixed in order using the predetermined detecting device.

After the reference positions of the reference drums 330, 340, 350, 360 are determined, the jig device 300 and the driving unit 100 are approached to each other and the driven couplers 333, 343, 353, 363 of the position-controlled reference drums 330, 340, 350, 360 are coupled with the driving couplers 133-136. Since the driven couplers 333, 343, 353, 363 are fixed, the driving couplers 133-136 appropriately rotate to be connected with the driven couplers 333, 343, 353, 363. After the driving couplers 133-136 are position-controlled and coupled with the driven couplers 333, 343, 353, 363, the jig device 300 and the driving unit 10 are moved relative to the reference drums 330, 340, 350, 360 along an axial direction of the reference drums 330, 340, 350, 360 so as to separate the driving couplers 133-136 from the driven couplers 333, 343, 353, 363. Here, the driving unit 100 may be moved by a dedicated moving jig and connected with the jig device 300 or alternatively, the jig device 300 may be moved toward the image forming apparatus, with the driving unit 100 being mounted to the image forming apparatus, thereby controlling the driving couplers 133-136 of the driving unit 100.

The driving couplers 133-136, after being connected and separated with respect to the driven couplers 333, 343, 353, 363, are then coupled with the driven coupler 33 of the OPCs 30, 40, 50, 60. Since positions of the driving couplers 133-136 are fixed, the OPCs 30, 40, 50, 60 can be set to satisfy Equations 2 and 3.

Accordingly, by using the jig device 300, assembling time is saved in bulk production and radial displacement control of the OPCs is facilitated.

Figure 17B:
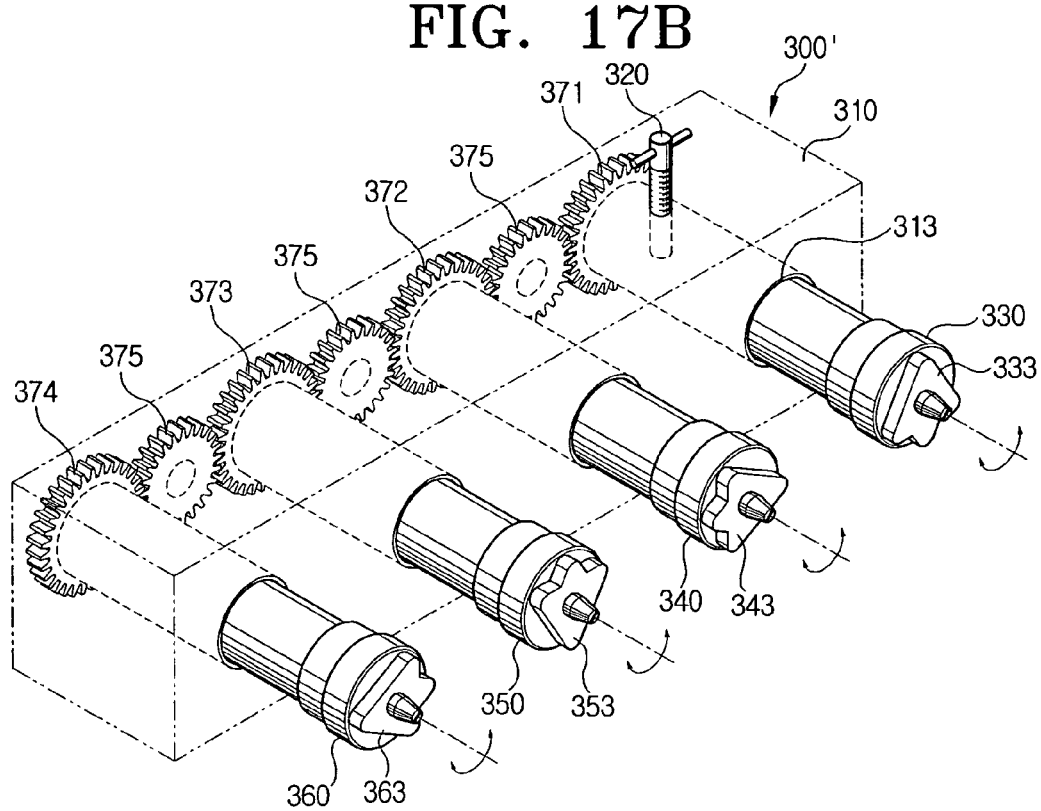
FIG. 17B is a schematic perspective view of another example of a jig which is provided for setting an image bearing body according to an embodiment of the present invention.

FIG. 17B shows a third method of using a jig device 300'. The jig device 300' as shown in FIG. 17B is similar to that shown in FIG. 17A, and therefore, the like elements are given the same reference numerals in the following description. However, in the jig device 300' of FIG. 17B, the reference drums 330, 340, 350, 360 have driven couplers 333, 343, 353, 363 at one end, respectively, and also have gears 371, 372, 373, 374 at the other end, respectively. Idle gears 375 are arranged between the respective gears 371, 372, 373, 374 such that the respective gears 371, 372, 373, 374 are disposed to rotate in associate with each other. The reference drums 330, 340, 350, 360 are arranged at predetermined intervals. Accordingly, by adjusting the position of one reference drum, the position of the other reference drums can also be adjusted accordingly. The reference drums are fixed in place when the positions are adjusted, and the fixing process requires a fixing member 320. Unlike in FIG. 17A, the respective reference drums 330, 340, 350, 360 of FIG. 17B are connected so that they can move in association with each other. Therefore, only a single fixing member 320 is required to fix one 330 of the reference drums to fix all of the reference drums 330, 340, 350, 360. For example, if the first reference drum 330 is fixed by the fixing member 320, the other reference drums 340, 350, 360 are accordingly fixed due to the gears 371, 372, 373, 374, 375. By using the jig device 300' as shown in FIG. 17B to obtain, for example, a value α1 of one reference drum 330. Then as the position of the corresponding reference drum 330 is adjusted based on the obtained value α1, values α2, α3, α4 of the other reference drums 340, 350, 360 are automatically determined, and accordingly, the position of the reference drums 340, 350, 360 are also adjusted. As a result, the image bearing bodies can be set easily and efficiently.

When the radii Ro of the respective OPCs 30, 40, 50, 60 are all the same and the distances between centers of the OPCs 30, 40, 50, 60 are all the same (L1=L2=L3=2π·Rox (x=1, 2, 3, . . . )), α2, α3 and α4 all have the same value. Therefore, as shown in FIG. 3, the positioning part of the OPCs 30, 40, 50, 60 fastened to the driving couplers 133-136 can be positioned by uniformly placing the positioning part of the driving couplers 133-136 which correspond to the OPCs 30, 40, 50, 60 along the +X axis. As a result, the image errors of each color, generated by +δo of the OPCs 30, 40, 50, 60, can be controlled to overlap in the same relative position during the sequential transfer. As described with reference to FIGS. 4A through 7B, the +δo of the OPCs 30, 40, 50, 60 can be regulated with respect to the positioning part 33b of the driven coupler 33, thereby realizing an embodiment of the present invention.

To summarize, i) The OPCs 30, 40, 50, 60 and the driving rollers 80 respectively have runouts. In order to advantageously control the frequency of image errors occurring due to +δo and +δd by the runout, the OPCs and the driving rollers are constructed so that the positioning parts 33b and 83b of the driven couplers 33 and 83 are positioned at certain locations with respect to +δo and +δd.

ii) An embodiment and the effect thereof have been described, with the embodiment satisfying the conditions of the Equation Set 1 so that at least two of the image errors (Rke, Rce, Rme, Rye) by the runout of at least one of the driving roller 80 and the supporting roller 91 overlap at the same relative location. Here, the image errors generated in the image area of the corresponding OPC can be overlapped according to relative sizes of the radius Rd of the driving roller 80 and the radius Ro of the OPC and regardless of the number of image errors generated in a unit image.

iii) Hereinbefore, Equation Set 2 and the Equation Set 3 have respectively been described as conditions of superimposition of at least two of the image errors (Oke, Oce, Ome, Oye) generated by the runout of the OPCs 30, 40, 50, 60, without regard to the runout of the driving roller 80 and the supporting roller 91. More specifically, in order to superimpose any one image error of the other OPCs 40, 50, 60 with respect to the predetermined OPC 30, the system is set up to satisfy at least one condition of Equation Set 2 or 3. In order to superimpose the image errors of at least two neighboring OPCs, the system is set up to satisfy at least one condition of the Equation Set 3. Equation Sets 2 and 3 can be generally applied without considering the relative sizes of L1, L2 and L3, which are distances between the centers of the OPCs 30, 40, 50, 60. When L1=L2=L3, the system is set up, generally, on condition of Equation Set 4. In other words, since the product is substantially manufactured to satisfy L1=L2=L3, considering relations in assembly and size with other various parts, frequency of the image error occurrence can be effectively reduced by applying any of Equation Sets 2-4.

As a third step for reducing the frequency of the image error occurrence, a method for superimposing the image error by the runout of at least one of the supporting roller 91 and the driving roller 80 corresponding to the image error by the runout of the respective OPCs 30, 40, 50, 60 will now be described.

As described in FIGS. 8A and 8B, for example, the image error Rke occurs in the image area of the K color OPC 30 caused by the interval B of the driving roller 80. By the interval B, again, the image errors Rme and Rye occur as well in the image areas of other OPCs 50, 60. The image error Oke occurs by the interval A1 of the K color OPC 30 as described in respect to FIGS. 15A and 15B. Also, the image errors Oce, Ome and Oye occur by the intervals A1, A2, A3 and A4 of the other OPCs 40, 50, 60. When at least two of the image errors respectively generated by the intervals A1-A4 and B of the OPCs 30, 40, 50, 60 and the driving roller 80 are superimposed at the same position on the belt 70, influences of the image errors on the final full color image can be reduced.

Referring to FIG. 18A, Ed refers to an angle formed by a center of the interval B defining the radial displacement +δd of the driving roller 80 counterclockwise from the +X axis, and that θox refers to an angle formed by the radial displacement +δo of the OPC disposed at the x-th position in a running direction of the belt 70 counterclockwise from the +Y axis. At least one (Rke, for example) of the image errors Rke, Rce, Rme and Rye, which may be generated by the interval B, can be superimposed with a corresponding image error (Oke) among the image errors Rke, Rce, Rme and Rye of the respective OPCs 30, 40, 50, 60, on the same position on the belt 70, through the following method. The driving roller 80 and the OPC 30 are positioned so that the interval A1 of the OPC 30 contacts with the belt 70 at a location where the maximum tangential speed Vmax of the driving roller 80 by the interval B has the most influence on the belt 70, that is, when a direction of the maximum tangential speed Vmax is aligned with the +Y axis as shown by an imaginary line in FIG. 18A. Thus, in order to superimpose the image errors by at least one of the plurality of OPCs 30, 40, 50, 60, for example, the OPC 30, with respect to the driving roller 80, the system is set up to satisfy at least one of the following equations in Equation Set 5.

[Equation Set 5]

$Rd \cdot \theta d = (2\pi l + \theta ox) \cdot Rox \cdot (1 \pm 0.05)$ $(l=1,2,3,\ldots),(x=1,2,3,\ldots)$ and $Rd = z \cdot Rox, (z=2, 3, 4, 5, \ldots)$      ①

$Rd \cdot \theta d = Rox \cdot \theta ox \cdot (1 \pm 0.05)$ $Rd = \theta ox, (x=1, 2, 3, \ldots)$      ②

$(2\pi \cdot h + \theta d) \cdot Rd = Rox \cdot \theta ox \cdot (1 \pm 0.05)$ $(h=1,2,3,\ldots),(x=1,2,3,\ldots)$ and $Rox = k \cdot Rd, (k=2,3, 4,5,\ldots)$      ③

That is, if the system is set up to satisfy at least one of the equations from Equation Set 5, the image errors occurring due to the radial displacements of the driving roller 80 and the OPCs 30, 40, 50, 60 are superimposed at the same position on the belt 70, and accordingly, the image error appears only at the superimposed location of the image.

First, a case wherein Rox<Rd will be described on the assumption that δo=δd.

According to the first equation of Equation Set 5, the image errors by the driving roller 80 and the objective OPC can be superimposed when the radius Rd of the driving roller 80 is larger than the radius Rox of the OPC of interest by integer multiples equal to or greater than 2.

Figure 18B:
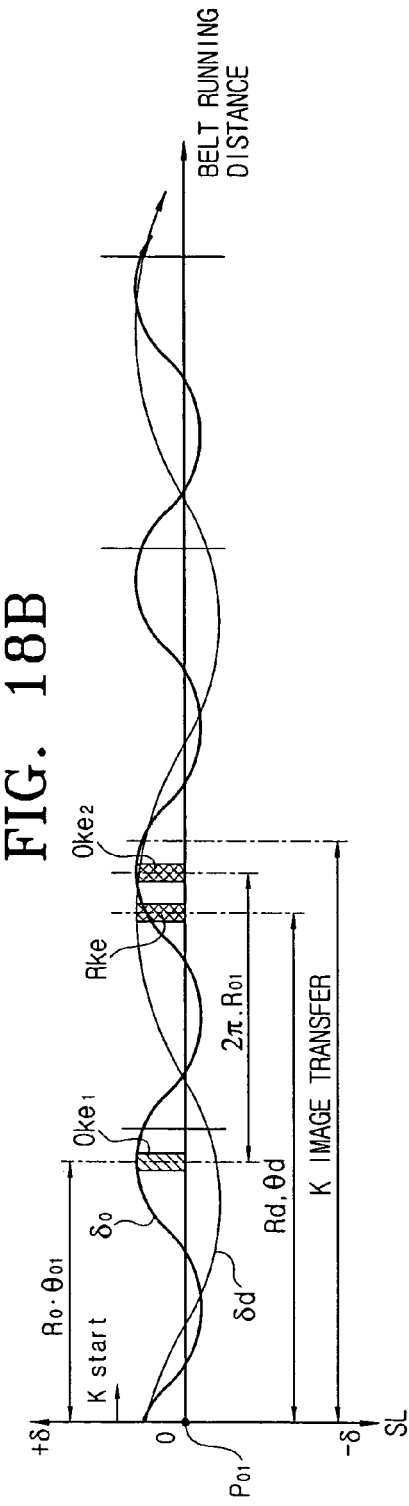
FIG. 18B is a graph of an image error caused due to the driving roller and the image bearing body in the state of FIG. 18A.

This will now be described in greater detail with reference to FIGS. 18A and 18B. FIG. 18A shows a system which is not set up to satisfy the first equation of Equation Set 3.

Here, the OPC of interest is the K color OPC 30 being disposed at the first position, and Rd=2Ro1.

When Rd=2Ro1, and the driving roller 80 rotates once, the OPC 30 rotates twice. It is assumed for purposes of this example that a unit image is formed by two cycles of rotation of the OPC 30. Accordingly, one image error caused by the interval B of the driving roller 80 and two image errors caused by the interval A1 of the OPC 30 occur within one unit image area.

Hereinbelow, a method of aligning the image error caused by the interval B of the driving roller 80 with one of the two image errors caused by the interval A1 of the OPC 30 by resetting the system to satisfy the first equation of Equation Set 5 will be described with reference to FIG. 18A.

More specifically, referring to FIG. 18A, a center of the interval A1 of the OPC 30 is set to $\ominus ox = \ominus o1 = 315°$ counterclockwise with respect to the +Y axis, and the center of the interval B is set to $\ominus d = 315°$ clockwise with respect to the +X axis. When transfer of K image begins in this state, the center of the image error Rke by the interval B during one rotational cycle of the belt 70 occurs on a location where the belt 70 is moved from the starting point 'Po1' by a distance equal to Rd·θd. In other words, the center of the image error Rke, generated in the unit image by the driving roller 80, is generated at distances of Rd·θd from SL.

While the driving roller 80 rotates by one cycle, the OPC 30 rotates by two cycles. Therefore, two image errors, that is, first and second image errors Oke1 and Oke2, casued by the interval A1 are generated within the unit image area.

A center of the first image error Oke1 occurs at a distance $Rox \cdot \ominus ox = Ro1 \cdot \ominus o1 = Ro1 \cdot 315°$ away from SL. Since the second image error Oke2 occurs at a distance $2\pi \cdot Ro1$ away from the first image error Oke1, the second image error Oke2 is distanced away from SL by $2\pi \cdot Ro1 + Ro1 \cdot \ominus o1 = (2\pi + \ominus o1) \cdot Ro1$.

Therefore, in order to align one of the first and second image errors Oke1 and Oke2 caused by the interval A1 of the OPC 30 with the image error Rke caused by the interval B of the driving roller 80 at the same position, the distance Rd·θd from SL to Rke should be the same as the distance $Rox \cdot \theta ox = Ro1 \cdot \theta o1$ from SL to the first image error Oke1, or as the distance $(2\pi + \theta o1) \cdot Ro1$ from SL to the second image error Oke2.

To generalize the above conditions, the first equation of Equation Set 5 can be obtained as follows.

$Rd \cdot \theta d = (2\pi \cdot l + \theta ox) \cdot Rox (l=1, 2, 3, \ldots),(x=1, 2, 3,\ldots)$ and $Rd=2, 3,4,5,\ldots)$      ①

By applying Rd=2Ro1 to the first equation of the equations 3, the OPC 30 and the driving roller 80 are mounted to satisfy $\ominus o1 = 2 \cdot \ominus d \cdot 2\pi$. Because $\ominus d = 315°$, $\ominus o1 = 630° - 2\pi = 270°$ is satisfied. That is, when the driving roller 80 is initially positioned at a position moved by 315° clockwise on the +X axis with respect to the interval B, according to the first equation of Equation Set 5, the interval A1 of the OPC 30 can be disposed at a position moved by 270° with respect to the +Y axis as shown in FIG. 18C. Since the interval A1 is pre-positioned, herein, at the phase 45° counterclockwise from the positioning part 33b of the driven coupler, the interval A1 can be easily adjusted to satisfy $\ominus o1 = 270°$.

When the OPC 30 and the driving roller 80 are mounted to satisfy the first equation of the equations 3, the image errors Oke2 and Rke are superimposed at the same distance, that is, by $Rd \cdot \theta d = Rd \cdot 315° = (2\pi + \theta o1) \cdot Ro1 = (2\pi + 270°) \cdot Ro1$ away from SL. Therefore, only a single overlay Te1 of superimposed image errors Oke2 and Rke and a non-superimposed image error Oke1 occur in the K color image.

Figure 18D:
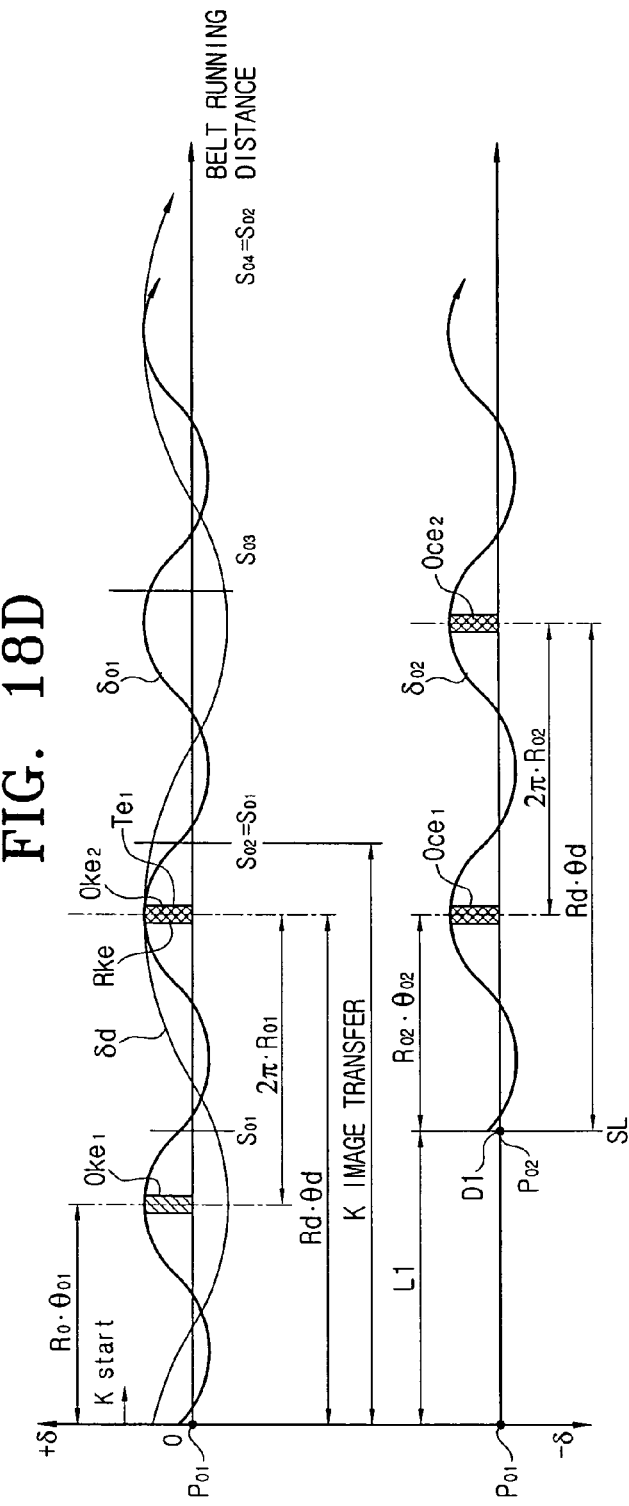
FIG. 18D is graph showing an image error caused due to the driving roller and the image bearing body in the state of FIG. 18C.

As described above, when the first OPC 30 and the driving roller 80 are arranged so that the image errors thereof are superimposed, one of the image errors occurring in the interval A2 of the neighboring OPC 40 can be superimposed with the image error by the driving roller 80. In other words, as shown in FIG. 18C, since Rd=2Ro2 in the C color OPC 40 as well, $\theta o2=\theta o1=270°$ is satisfied according to the first equation of Equation Set 3. Therefore, when the interval A2 of the C color OPC 40 is positioned 270° counterclockwise with respect to the +Y axis, the center of the second image error Oce2 caused by the interval A2 is distanced away from SL by $Rd\cdot\theta d$, as shown in FIG. 18D. Accordingly, the image error of the C color OPC 40 can also be superimposed at the same position as the superimposed image error Te1.

Since the distance between the neighboring OPCs 30 and 40 is not considered herein, the image error Rke of the driving roller 80 and the other image errors Oke1 and Oce1 are not necessarily superimposed. In order to superimpose the image errors Oke1 and Oke2 caused by the interval A1 with the image errors Oce1 and Oce2 caused by the interval A2, the OPCs 30 and 40 are arranged to satisfy the first equation of the Equation Set 2. To explain it in greater detail, the OPCs 30 and 40 have already been positioned to satisfy the first equation of Equation Set 3. Therefore, as shown in FIG. 18c, it can be understood that $\theta o2=\theta o1=\alpha2=\alpha1$. By applying $\alpha2=\alpha1$ to the first equation of the Equation Sets 2 and 3, $L1=2\pi\cdot 1\cdot Ro1$ can be satisfied. Because 1 is an integer, the distance L1 between the centers C1 and C2 is set to be an integer multiple of a circumference of the OPC 30. When 1=1, the transfer point Po2 of the C image of the OPC 40 is positioned where the belt 70 is moved from the starting point 'Po1' of the K image by SL. Therefore, the image errors (Oke1, Oke2)(Oce1, Oce2) caused by the intervals A1 and A2 are superimposed at the same position. Since the OPCs 30 and 40 are mounted to satisfy the first equation of Equation Set 5, the superimposed image errors Oke2, Oce2 are also superimposed with the image error Rke caused by the interval B of the driving roller 80.

As can be appreciated from the above description, when the radius of the driving roller 80 is bigger than the radius of the objective OPC by an integer multiple equal to or greater than two, one of the plurality of image errors generated by the OPC of interest can be superimposed with the image error caused by the driving roller 80 by setting up the system to satisfy the first equation of Equation Set 5. In the other plurality of OPCs as well, one of the image errors caused by the corresponding OPCs can be superimposed with the image error caused by the driving roller 80 by setting up the system to satisfy the first equation of Equation Set 5.

When the system is set up to satisfy the first equation of Equation Set 2, the image errors generated by the two OPCs 30 and 40 can be overlapped. Thus, the image errors generated by the OPCs 30 and 40 of interest can be reduced.

It has been illustrated that the image error Rke due to the driving roller 80 and the image error due to the two OPCs 30 and 40 are overlapped, by way of example of the OPCs 30 and 40. It should be understood, however, that if at least one of the plurality of the OPCs 30 through 60 can be selected and set to satisfy the first equation of Equation Set 5, the same effect can be obtained to reduce the image error generated due to the selected OPC.

It has been illustrated that the first equation of Equation Set 5 and the first equation of Equation Sets 2 and 3 can be satisfied at the same time by way of example. It should be understood that the same effect can be obtained from the OPC of interest when the respective OPCs 30 through 60 satisfy at least one of the equations from Equations Set 2, while also satisfying the first equation of Equation Set 5. These scenarios can be understood from the above description, and will not be described in detail for the sake of brevity.

Now a scenario in which the size of the driving roller and the OPC rollers are equal (Rd=Rox) will be described. It is assumed, for purposes of this example, that the radius deviations of the driving roller and the OPC rollers are equal, that is, $\delta D=\delta o$.

Figure 19A:
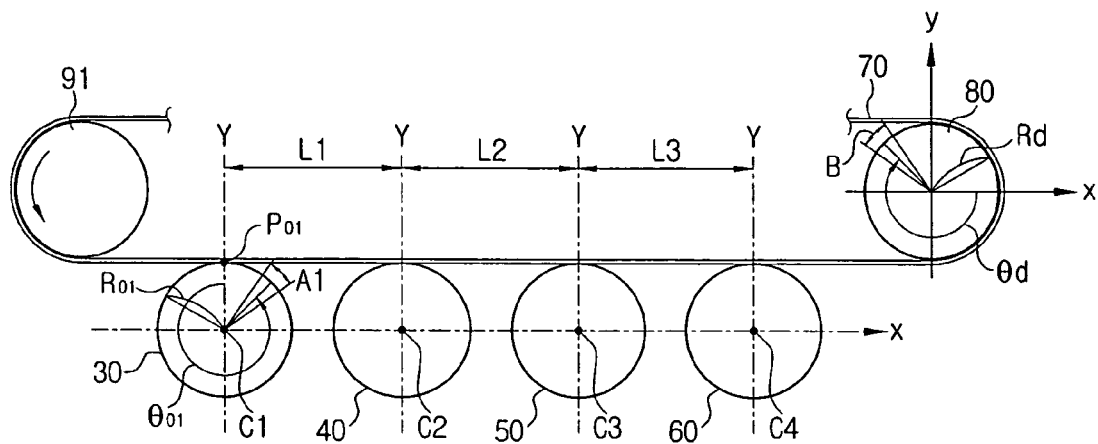
FIG. 19A is a view showing an example where the radii of the driving roller and the image bearing body are equal.

Referring to FIG. 19A, Rd=Rox=Ro1. Therefore, when the driving roller 80 rotates one time, the OPC 30 of interest also rotates one time. Suppose that the OPC 30 rotates two times and forms a unit image, two image errors Oke1 and Oke2 occur at the K unit image due to the interval A1 of the OPC 30 as illustrated in FIG. 19B. Since the interval A1 of the OPC 30 is positioned at the phase $\theta o1$ in the counterclockwise direction with respect to the +Y axis, the center of the first image error Oke1 occurs away from the transfer start point Po1 by a distance of $Ro1\cdot\theta o1$. The second image error Oke2 occurs away from Po1 by a distance of $2\pi\cdot Ro1+Ro1\cdot\theta o1$. The K unit image has two image errors Rke1 and Rke2 generated at a certain location caused by the interval B of the driving roller 80. Still referring to FIG. 19A, the center of the interval B of the driving roller 80 is located at the phase $\theta d$ in the clockwise direction with respect to the +X axis. Accordingly, the first image error Rke1 caused by the interval B appears away from the point Po1 by a distance of $Rd\cdot\theta d$, and the center of the second image error Rke2 appears away from the point Po1 by a distance of $2\pi\cdot Rd+Rd\cdot\theta d$ as illustrated in FIG. 19B.

As a result, the distance between the centers of the first image errors Rke1 and Oke1 is $d1=Ro1\cdot\theta o1-Rd\cdot\theta d$. Likewise, the distance between the centers of the second image errors Rke2 and Oke2 is $d1=Ro1\cdot\theta o1-Rd\cdot\theta d$.

Figure 19C:
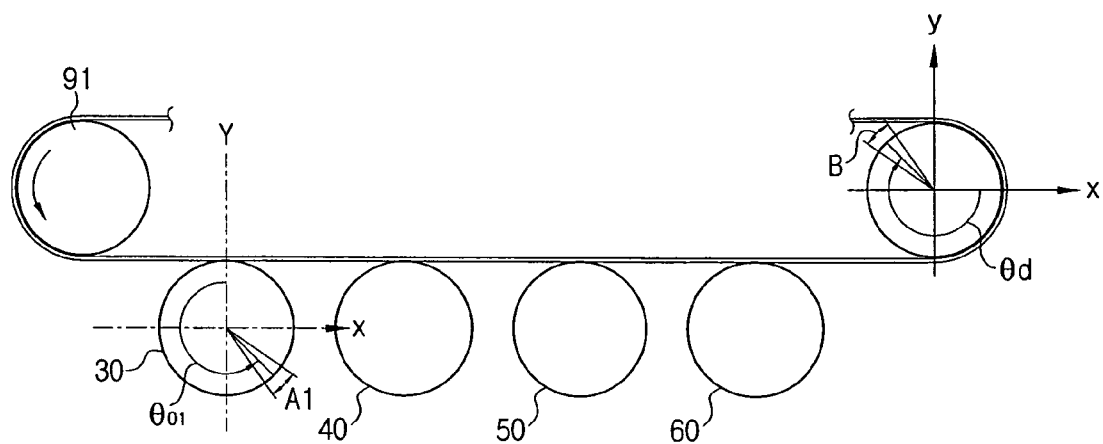
FIG. 19C is a schematic structure view of an image forming apparatus according to a fifth embodiment of the present invention.

As Rd=Ro, when the OPC 30 and the driving roller 80 are set to satisfy the condition d1=0, that is, the condition $Ro1\cdot\theta o1-Rd\cdot\theta d$, the image errors Oke2 and Oke2 of the OPC 30 can be overlapped with the image errors Rke1 and the Rke2 of the driving roller 80, respectively. As illustrated in FIG. 19A, $\theta d=225°$ and $\theta o1=315°$. Hence, when the image errors Oke1 and Oke2 of the OPC 30 overlap the image errors Rke1 and Rke2 of the driving roller 80, the OPC 30 is set to $\theta d=\theta o1=225°$ as shown in FIG. 19C. Since the interval A1 of the OPC 30 is predetermined to locate at a specific phase away from the positioning part of the driven coupler, the interval A1 of the OPC 30 is set to locate at 225° away from +Y in the counterclockwise direction as described in the exemplary embodiments of the present invention. Referring to FIG. 19D, the radial displacements $\delta o$ and $\delta d$ of the OPC 30 and the driving roller 80 appear on the belt 70 with the same pattern period and can advantageously be overlapped with each other. Consequently, only the overlapping images of the image errors Oke1 and Oke2, and Rke1 and Rke2 occur in the unit image, to thus reduce the total number of the image errors. That is, the unit image area has only the overlapping error Te3 of Oke1 and Rke1 and the overlapping error of Te4 of Oke2 and Rke2.

While the OPC 30 is set for the driving roller 80 to satisfy the second condition of Equation Set 5, if one of the neighboring OPCs 40, 50, 60 is set to satisfy one of the conditions of Equation Set 2 or 3, the image error due to the OPC of interest can be overlapped with respect to the overlapping error Te3 and Te4. A detailed description thereof has been provided above in reference to FIGS. 6A through 16, therefore a detailed description will not be repeated here for the sake of brevity.

Now a scenario in which the OPC rollers are larger than the driving roller (Rd<Rox) will be described. Again, it is assumed for purposes of this exemplary description that the radius deviations of the OPCs and the driving roller are equal, that is, $\delta D = \delta o$. As Rd<Rox, the driving roller 80 has a shorter rotational cycle than the OPCs 30, 40, 50, 60 in view of the rotational cycle over a unit of time. As a result, the image error caused by imperfections in the driving roller 80 occur more often than caused by the OPC in the unit image area. The number of image errors can be reduced as a whole by overlapping one of the plurality of the image errors of the driving roller 80 in the unit image area, with the image error of the OPC of interest. To this end, the system is set up to satisfy the third equation of Equation Set 5. An embodiment of the present invention exemplifies that the radius Rox of the OPC of interest is two times (c=2) longer than the radius Rd of the driving roller 80. Suppose that the unit image of a certain color is formed by four rotations of the driving roller 80, and correspondingly two rotations of the OPC roller. Hence, the unit image area has six image errors in total caused by the driving roller and the particular OPC roller, including four image errors caused by the driving roller 80 and two image errors caused by the OPC.

Figure 20A:
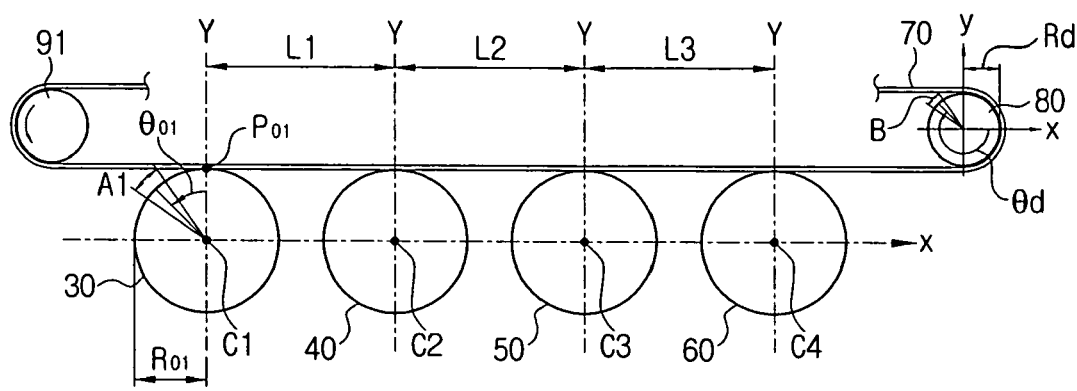
FIG. 20A is a schematic structure view showing an example where the radius of the image bearing body is larger than that of the driving roller.
Figure 20C:
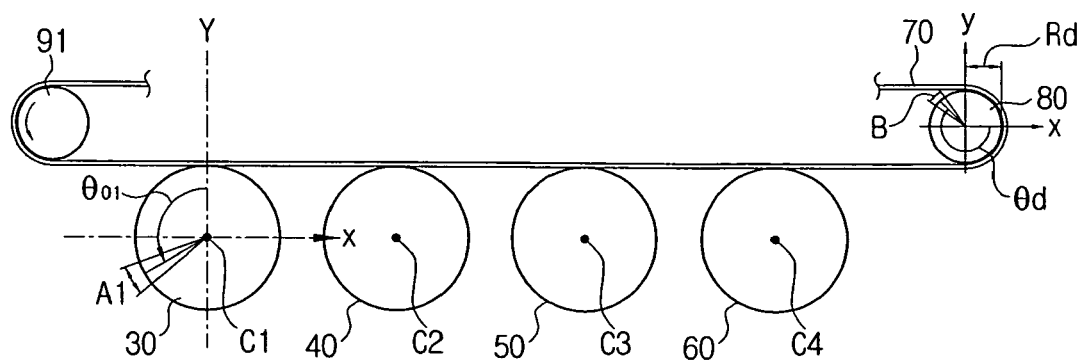
FIG. 20C is a schematic structure view provided for explanation of an image forming apparatus according to an sixth embodiment of the present invention.
Figure 20B:
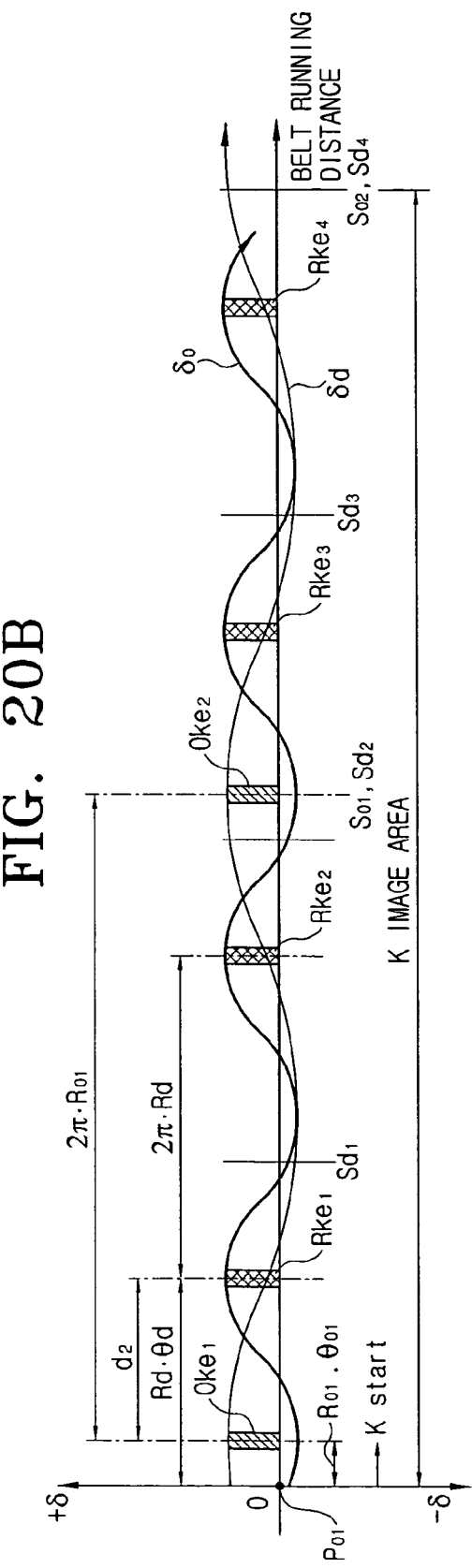
FIG. 20B is a graph provided for explanation of an image error caused due to the driving roller and the image bearing body in the state of FIG. 20A.

Referring to FIG. 20A, an example is provided in which the third equation of Equation Set 3 is not satisfied. The phase of the center of the interval B of the driving roller 80 is positioned at $\theta d = 225°$ with respect to the +X axis. If the transfer of K initiates, the K unit image is transferred onto the belt 70 as the driving roller 80 rotates four times as illustrated in FIG. 20B. Four image errors Rke1, Rke2, Rke3, and Rke4 caused by the interval B appear in the unit image area at intervals equal to $2\pi \cdot Rd$. The initial image error Rke1 occurs away from the transfer start point Po1 by a distance of $Rd \cdot \theta d = Rd \cdot 225°$. The other image errors Rke2, Rke3, and Rke4 sequentially appear away from the point Po1 as much as $(2\pi \cdot h + \theta d) \cdot Rd$ (h=1, 2, 3).

The OPC 30 is positioned at $\theta o1 = 45°$ away from the +Y axis in the counterclockwise direction. To transfer the K unit image area, the OPC 30 rotates two times. Thus, two image errors Oke1 and Oke2 due to the interval A1 occur with the distance $2\pi \cdot Ro1$ therebetween in the K unit image area as illustrated in FIG. 20B. The first image error Oke1 occurs at a position where the belt 70 is moved from the transfer start point Po1 by a distance of $Ro1 \cdot \theta o1 = Ro1 \cdot 45°$. Therefore, the distance between the first image errors Oke1 and Rke1 is $d2 = Ro1 \cdot (0.5\theta d - \theta o1) = Ro1 \cdot (112.5° - 45°) = Ro1 \cdot 67.5°$.

Figure 20D:
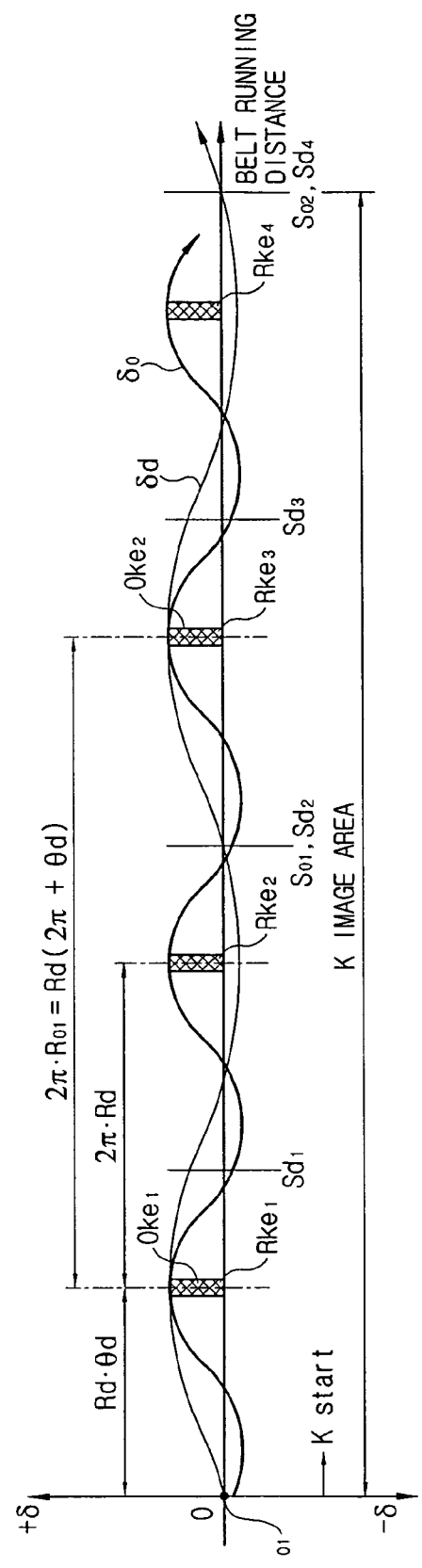
FIG. 20D is a graph provided for explanation of an image error due to the driving roller and the image bearing body in the state of FIG. 20C.

As a result, to overlap the two image errors Oke1 and Rke1, the distance from Po1 to the image errors Oke1 and Rke1 should be identical. While the driving roller 80 is set in advance, it is required to satisfy the condition $Rd \cdot \theta d = Ro1 \cdot (45° + 67.5°)$. The third equation of Equation Set 5 can be satisfied by setting the OPC 30 to position at 112.5° from +Y of the interval A1 in the counterclockwise direction, as illustrated in FIG. 20C. In FIG. 20D, the centers of the two image errors Oke1 and Rke1 are at the same location, that is, the centers are aligned away from Po1 by a distance of $Rd \cdot \theta d = Ro1 \cdot \theta o1 = Ro1 \cdot 112.5°$. The second image error Oke2 of the interval A1 overlaps with the third image error Rke3 of the interval B. Therefore, the six image errors in the K unit image area are reduced to four image errors, to thus reduce the effect of the image errors.

The image errors caused by other OPCs can be further reduced by setting the other OPCs to be in phase with the first OPC. That is, the OPC of interest can be set to satisfy at least one of the conditions of Equation Sets 2-4 while also satisfying the conditions of Equation Set 5. In this situation, at least one of the image errors due to the driving roller 80 can overlap with the image error of the OPC, and at the same time, the image errors occurring due to the OPCs can overlap with each other. Therefore, the number of the image errors can be reduced still more.

The following is an explanation as to how to overlap the image error of the driving error 80 with at least one of the image errors of at least two OPCs at the same location within the unit image. In this exemplary embodiment of the present invention, it is exemplified that all the image errors of the plurality of the OPCs 30, 40, 50, 60 are overlapped, and that the overlapping error of the OPCs 30, 40, 50, 60 is also advantageously overlapped with the image error of the driving roller 80. Note that the radiuses of the OPCs 30, 40, 50, 60 in this example are identical.

Firstly, referring to FIG. 21A, the radius Rd of the driving roller 80 is greater than the radius Rox of the OPCs 30, 40, 50, 60. The radius of the respective OPCs 30, 40, 50, 60 is identical Rox=Ro. Distances L1, L2, L3, L4, L5, and L6 defined among the centers C1-C4 of the OPCS 30, 40, 50, 60 are set to satisfy all of the conditions of Equation Set 1. That is, the positions of the OPCs 30, 40, 50, 60 are set to satisfy $L1 = L2 = L3 = Sd(2\pi \cdot Rd)$. Under these conditions, the image error due to the interval B of the driving roller 80 appears at the same location as the overlapping unit image that is transferred onto the belt 70 by the respective OPCs 30, 40, 50, 60. If the unit image area is formed during one rotation of the driving roller 80, the center of color image errors Rke, Rce, Rme, Rye caused by the interval B is distanced away from the starting line SL by a distance of $Rd \cdot \theta d(315°)$ in the unit image area, as illustrated in FIG. 21B. Since L1=L2=L3=Sd, the full color unit image area which passes through the OPCs 30, 40, 50, 60 and is overlapped on the belt 70, has a single overlapping error Rte from the image error Rke, Rce, Rme, Rye. Ultimately, by configuring the system to satisfy all of the conditions of Equation Set 1, the number of image errors due to the interval B of the driving roller 80 can be reduced to one fourth of the number of errors of Equation Set 1 is not followed, and the image quality can thereby be enhanced.

As discussed previously, the respective OPCs 30, 40, 50, 60 have radial displacement due to runout. Intervals A1, A2, A3, and A4 of the OPCs 30, 40, 50, 60 cause image errors. To overlap the image errors due the intervals A1, A2, A3, and A4, as shown in FIG. 21A, is the OPC's are set to satisfy the conditions of Equations 2-1 and 2-2. In short, L1=L2=L3 is satisfied and the radii of the OPCs 30, 40, 50, 60 are identical. The maximum radial displacement +δo of the OPCs 30, 40, 50, 60 is positioned at the same phase 270° from the +Y axis in the counterclockwise direction. As constructed above, when the driving roller 80 rotates one time, the OPCs 30, 40, 50, 60 rotate two times to create the unit image area.

Two image errors occur from each of the respective OPCs 30, 40, 50, 60, and the centers of the first image errors Oke1, Oce1, Ome1, Oye1 caused by the OPCs 30, 40, 50, 60 are positioned away from the starting line SL by a distance of $Ro \cdot 270°$, as illustrated in FIG. 21C. The centers of the second image errors Oke2, Oce2, Ome2, Oye2 caused by the OPCs 30, 40, 50, 60 are positioned away from the starting line SL by a distance of $Ro \cdot (2\pi + 270°)$. Originally, the full color overlapping image, which passed through the OPCs 30, 40, 50, 60, has 8 image errors Oke1, Oce1, Ome1, Oye1 and Oke2, Oce2, Ome2, Oye2. When the system is set to satisfy the conditions of Equation Sets 2-4, the overlapping error Ote1 of the first image errors Oke1, Oce1, Ome1, Oye1 and the overlapping error Ote2 of the second image errors Oke2, Oce2, Ome2, Oye2 only appear. Thus, the number of the image errors can be reduced to one fourth of the number of errors caused when the relative locations of the OPC's are not controlled according to Equation Set 2.

The overlapping errors Ote1 and Ote2 caused by the OPCs 30, 40, 50, 60 may appear at different positions from the overlapping error Rte due to the driving roller 80 as mentioned above. When the overlapping error Rte is overlapped with one of the overlapping errors Ote1 and Ote2 by the OPCs 30, 40, 50, 60, the number of the image errors in the unit image area can be reduced further. To this end, it is set to satisfy the first equation of Equation Set 5 in FIG. 21A. That is, $Rd=2Rox=2Ro1=2Ro2=2Ro3=2Ro4$. Note that $\theta ox=\theta o1=\theta o2=\theta o3=\theta o4=270°$. Accordingly, the distance $Rd·\theta d$ between SL and the center of Rte is the same as the distance $Ro·(2\pi+270°)$ between SL and the center of Ote2. In other words, as $Rd=2Ro$ and $Rd·\theta d=2Ro·315°=Ro·(2\pi+270°)$, the two overlapping errors Ote2 and Rte are overlapped away from SL by a distance of $Rd·\theta d$.

Figure 21D:
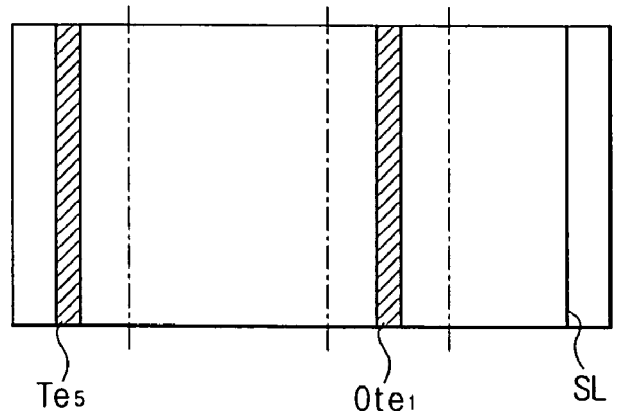
FIG. 21D is a view provided for explanation of an overlay of image errors which are caused due to the image bearing body and the driving roller in the state of FIG. 21A.

As for the scenario when $Rd=2Ro$, when the system is set to satisfy the first equation of Equation Set 5 in addition to all of the conditions of Equation Set 1 and Equation Sets 2-4, the unit image area has only the first overlapping error Ote1 caused by the OPCs 30, 40, 50, 60 and only the overlapping error Te5 of the second overlapping error Ote2 caused by the OPCs 30, 40, 50, 60 and the overlapping error Rte caused by the driving roller 80, as illustrated in FIG. 21D. Ultimately, twelve image errors including four image errors by the driving roller 80 and eight image errors by the OPCs 30 through 60 can be reduced to two image errors in the unit image area. Thus the total number of image errors is reduced considerably and the image quality is enhanced.

Figure 22D:
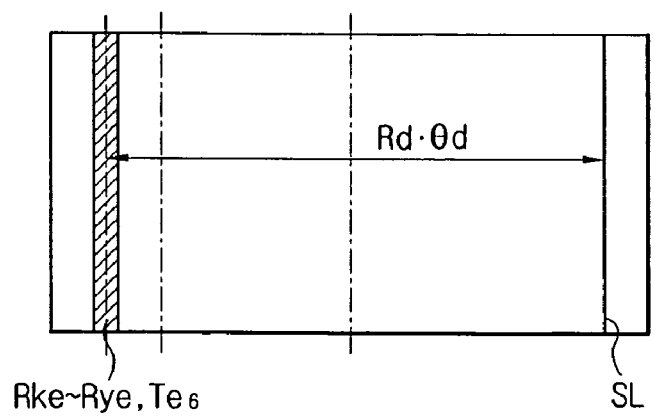
FIG. 22D is a schematic view of an overlay of image errors which are caused due to the image bearing body and the driving roller in the state of FIG. 22A.
Figure 22A:
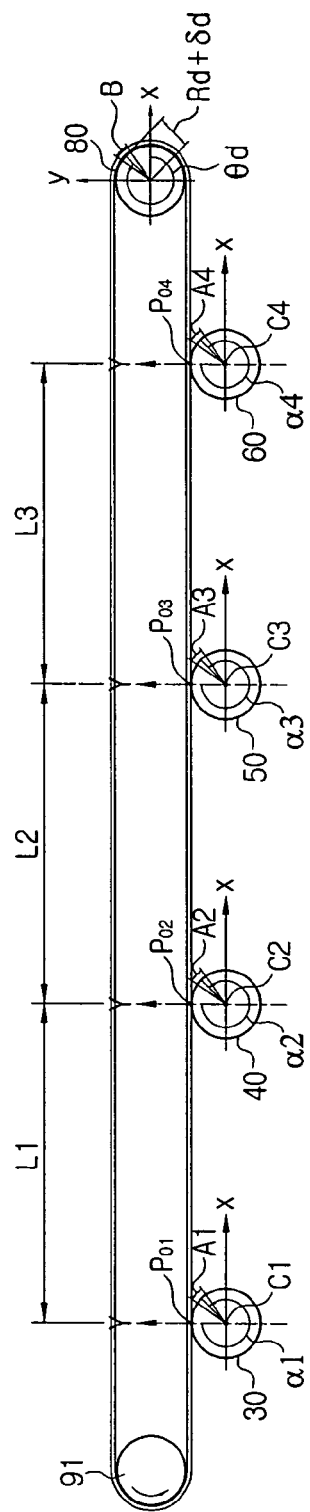
FIG. 22A is a structure view provided for explanation of an image forming apparatus according to an eighth embodiment of the present invention.
Figure 22C:
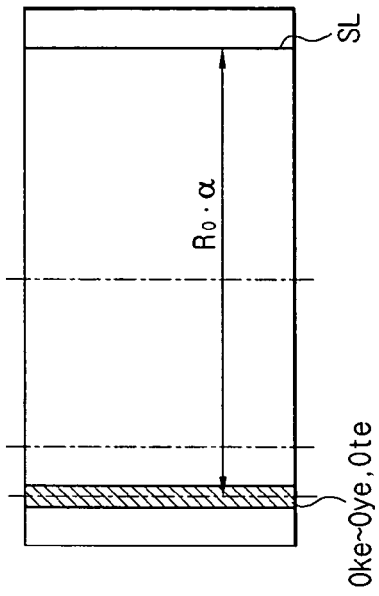
FIG. 22C is a schematic view of an image error caused due to the image bearing body in the state of FIG. 22A.
Figure 22B:
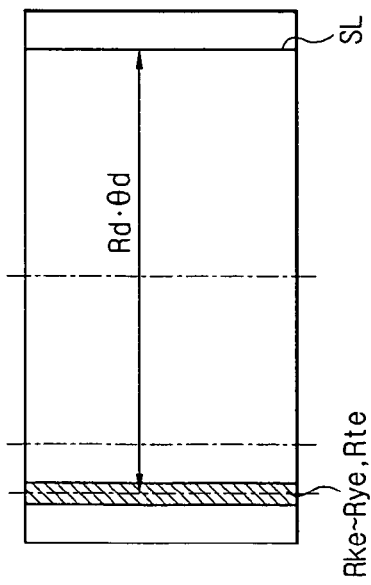
FIG. 22B is a schematic view of an image error caused due to the driving roller in the state of FIG. 22A.

When $Rd=Rox$, Equation Set 1, Equation Sets 2-4, and Equation Set 5 are all satisfied. In this case, the radii of the OPCs 30, 40, 50, 60 are identical $Rox=Ro$. Referring to FIG. 22A, the interval B of the driving roller 80 is positioned at the phase $\theta d$ away from the +X axis in the clockwise direction. In an exemplary embodiment of the present invention, $\theta d=315°$. The distance between the centers C1, C2, C3 and C4 of the OPCs 30, 40, 50, 60 is $L1=L2=L3=2\pi·Rd=Sd$. The distance between the centers of the OPCs 30, 40, 50, 60 is set to equal an integer multiple of the circumference of the driving roller 80. Such a system can satisfy Equation Set 1. To facilitate the understanding of embodiments of the present invention, suppose that the unit image area is formed by one rotation of the driving roller 80, the interval B affects the same phase of the respective OPCs 30, 40, 50, 60. More specifically, the driving roller 80 of FIG. 22A needs to rotate four times to transfer the overlapped color images of the OPCs 30, 40, 50, 60 and form the final full color image. As illustrated in FIG. 22B, the centers of the image errors Rke, Rce, Rme, Rye occurring within the color overlapping image and caused by the interval B are aligned away from the starting line SL by a distance of $Rd·\theta d=Rd·315°$. As the OPCs 30, 40, 50, 60 are set to satisfy Equation Set 1, all of the image errors Rke, Rce, Rme, Rye caused by the interval B appear at the same location during the image transfer by the OPCs 30, 40, 50, 60, regardless of the number of the rotations of the driving roller 80. Consequently, only one overlapping image error Rte occurs.

The OPCs 30, 40, 50, 60 are installed to satisfy the condition of Equation Set 2. In more detail, the OPCs 30, 40, 50, 60 are installed such that the intervals A1, A2, A3, and A4 of the respective OPCs 30, 40, 50, 60 are positioned at the same angle from the transfer start point Po1, Po2, Po3, and Po4 in the counterclockwise direction, that is, at the phase $\alpha 1=\alpha 2=\alpha 3=\alpha 4$. For further understanding of an exemplary embodiment of the present invention, $\alpha 1-\alpha 4$ are set to 315° and it is assumed that one rotation of the OPCs 30, 40, 50, 60 creates the color unit images. Referring to FIG. 22C, the centers of the image errors Oke, Oce, Ome, Oye due to the intervals A1, A2, A3, and A4 of the OPCs 30, 40, 50, 60 appear away from the starting line SL by a distance of $Ro·\alpha 1=Ro·315°$ in the unit image area. Therefore, the full color unit image area generated by the OPCs 30, 40, 50, 60 and transferred onto the belt 70 in an overlapping manner, has only the overlapping image error Ote of the image errors Oke, Oce, Ome, Oye. The overlapping image Ote is distanced from the SL by $Ro·315°$.

The system of FIG. 22A is set to satisfy the second condition of Equation Set 3. That is, $Rd=Rox$, and $\theta o1$ $(=\alpha 1)$, $\theta o2$ $(=\alpha 2)$, $\theta o3$ $(=\alpha 3)$, and $\theta o4$ $(=\alpha 4)$ of the respective OPCs 30, 40, 50, 60 equal to 315°, which is also equal to $\theta d$.

Accordingly, the image errors due to the interval B of the driving roller 80 overlap with the image errors due to the intervals A1, A2, A3, and A4 of the respective OPCs 30, 40, 50, 60. Meanwhile, as shown in FIG. 22B, the image errors Rke, Rce, Rme, Rye due to the driving roller 80 overlap as the overlapping error Rte at the same position. The image errors Oke, Oce, Ome, Oye due to the OPCs 30, 40, 50, 60 also overlap as the overlapping error Ote at the same position. In this regard, the system is implemented to further satisfying the second condition of Equation Set 5 so that the two overlapping errors Rte and Ote can advantageously overlap at the same position. As a result, as illustrated in FIG. 22D, the unit image area has only the final overlapping error Te6 produced from the two overlapping errors Rte and Ote. The center of the final overlapping error Te6 is distanced away from SL by $Rd·\theta d=Ro·\theta o1=Ro·\alpha 1$. Under the condition of $Rd=Ro$, when the second condition of Equation Set 1, Equation Sets 2-4, and Equation Set 5 are satisfied at the same time, even more image errors in the unit image area can be overlapped. Hence, the number of the image errors decreases, the image quality can be enhanced, and the reliability of the product can be elevated.

Thirdly, referring to FIG. 23A, a scenario when the OPC rollers are bigger than the driving roller is described, that is, when $Rox=h·Rd(h=2,4,6 \ldots)$. To ease the understanding of embodiments of the present invention, it is exemplified that the radius Rd of the driving roller 80 is two times longer than the radius Rox of the OPC. The number of the OPCs of interest is four, and the radii of the respective OPCs 30, 40, 50, 60 is $Rox=Ro1=Ro2=Ro3=Ro4$.

The distance between the centers C1, C2, C3, and C4 of the OPCs 30, 40, 50, 60 is $L1=L2=L3=2\times2\pi·Rd=2Sd$. Accordingly, when the driving roller 80 rotates two times, the respective OPCs 30, 40, 50, 60 make one rotation. Suppose that two rotations of the driving roller 80 create the unit image of a certain color, the interval B of the driving roller 80 produces two effects on the color unit image areas, as illustrated in FIG. 23B. Since the distance between the centers of the OPCs 30, 40, 50, 60 is an integer multiple of the circumference of the driving roller 80, the centers of the first image errors Rke1, Rce1, Rme1, Rye1 occurring at each color are aligned away from the starting line SL by a distance of $Rd·\theta d$. The centers of the second image errors Rke2, Rce2, Rme2, Rye2 are distanced from the starting line SL by $2\pi·Rd+Rd·\theta d$. As $\theta d=180°$, the first image errors Rke1, Rce1, Rme1, Rye1 appear away from the SL by a distance of $Rd·180°$, as the single overlapping image Rte1. The second image errors Rke2, Rce2, Rme2, Rye2 appear as the single overlapping image error Rte2 positioned away from SL by a distance of $2\pi \cdot Rd + Rd \cdot 180° = Rd \cdot (2\pi + 180°)$.

The distances between the centers C1, C2, C3, and C4 of the OPCs 30, 40, 50, 60, as defined in the first and second equations of Equation Set 2, are $L1=L2=L3=2\pi \cdot Ro$. Since $\alpha 1 = \alpha 2 = \alpha 3 = \alpha 4 = \theta o1$, the centers of the image errors Oke Oce, Ome, Oye due to the intervals A1, A2, A3, and A4 of the OPCs 30, 40, 50, 60 are distanced from SL by $Ro \cdot \theta o1$ in the unit image area, as illustrated in FIG. 23C. Note that in this example $\theta o1 = \alpha 1 = 270°$. Accordingly, the image errors Oke, Oce, Ome, Oye due to the OPCs 30, 40, 50, 60 appear as the single overlapping error Ote positioned away from SL by a distance of $Ro \cdot 270°$.

Figure 23D:
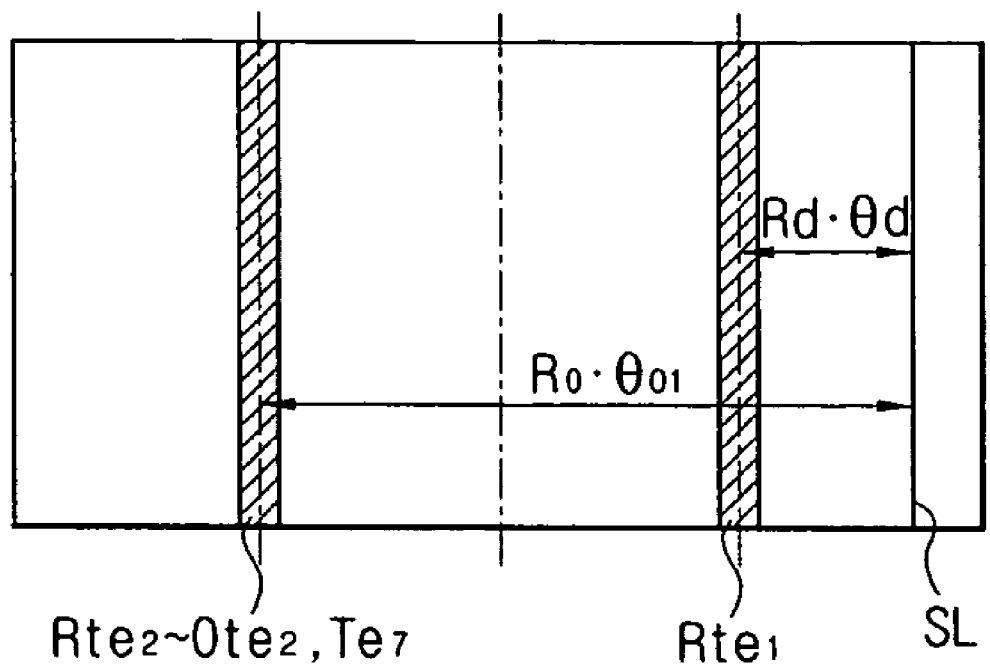
FIG. 23D is a schematic view of an overlay of image errors which are caused due to the image bearing body and the driving roller in the state of FIG. 23A.

The system of FIG. 23A is set to satisfy the third equation of Equation Set 5. Since $2Rd=Rox$, which is applied to the third equation of Equation Set 5, $(2\pi \cdot \theta d) \cdot Rd = Rox \cdot \theta ox = 2Rd \cdot \theta ox$. Since $\theta d=180°$, $(2\pi+180°) \cdot Rd = 2Rd \cdot \theta ox$. It can be seen that the above equation can be rearranged to $(2\pi+180°) = \theta ox$ and $\theta ox = 270°$. Since $\theta o1 = \theta o2 = \theta o3 = \theta o4 = 270°$, the respective OPCs 30, 40, 50, 60, as shown in FIG. 23A, satisfy the third equation of Equation Set 5. After satisfying the third equation of Equation Set 5, as aforementioned in reference to FIGS. 23B and 23C, one of the two overlapping errors Rte1 and Rte2 can be overlapped with the final overlapping error Te7 that overlaps with the other overlapping error Ote at the same position as illustrated in FIG. 23D. Because the center of the overlapping image error Ote due to the OPCs 30, 40, 50, 60 is positioned away from SL by a distance of $Ro \cdot \theta o1 = (2\pi + \theta d) \cdot Rd$, the final overlapping error Te7 appears away from SL by a distance of $Ro \cdot \theta o1 = (2\pi + \theta d) \cdot Rd$. Ultimately, the final full color unit image has only the overlapping error Rte1 and the final overlapping error Te7 as illustrated in FIG. 23D.

In the exemplary embodiments of the present invention, it has been described that the image errors mainly result from the runouts of the OPCs 30, 40, 50, 60, which substantially transfer the image onto the belt 70, and the runout of the driving roller 80, which drives the belt 70, without consideration of the effect on the supporting roller 91. Thus, the effect of the supporting roller 91 is not explained herein. It is to be understood that the driving roller 80 and the supporting roller (driven roller) 91 are interchangeable in the relationship.

Also, as indicated in the above equation sets, one will understand that almost the same effect can be obtained within an error range of ±0.05.

As set forth above, the roller and the roller manufacturing method according to embodiments of the present invention are assembled such that the positioning part of the driven coupler is positioned at a certain angle in relation with the maximum radial displacement of the roller body (drum body). Hence, it is possible to control the effect on the radial displacement of the roller.

The driving unit of the image forming apparatus according to embodiments of the present invention can control the alignment of the OPCs based on a criterion, to thus control the effect from radius deviations of the belt supporting roller and/or effects from the radius deviations of the OPCs.

Furthermore, the image forming apparatus controls the locations of the image errors occurring due to runout of the driving roller and reduces the number of image errors in the final overlapping image. Therefore, the image quality can be enhanced and the reliability of the product is increased.

In particular, the frequency of image errors due to runouts of the driving roller and/or the OPCs can be decreased even without consideration of the radii of the OPCs and the driving roller.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An image forming apparatus, comprising:
   at least one image bearing body having a radius deviation along the direction of circumference, and also having an interval A at a predetermined position with reference to the radius deviation;
   an intermediate transfer medium running in contact with each of the at least one image bearing body; and
   at least one supporting roller for guiding the running of the transfer medium while supporting the transfer medium, and having a radius deviation along the direction of circumference, and also having an interval B at a predetermined position with reference to the radius deviation,
   wherein the at least one image bearing body and the at least one supporting roller are arranged such that the respective radius deviations are substantially in registration along the transfer medium.

2. The image forming apparatus of claim 1,
   wherein, with reference to a predetermined (X, Y) coordinate system based on the center of rotation of the at least one supporting roller and the at least one image bearing body,
   the image bearing body and the supporting roller are mounted to satisfy one of the following equations:

$$Rd \cdot \theta d = (2\pi \cdot 1 + \theta ox) \cdot Rox \cdot (1 \pm 0.05)(l=1,2,3,\ldots),(x=1,2,3,\ldots),Rd=z \cdot Rox,(z=2,3,4,5,\ldots) \qquad ①$$

$$Rd \cdot \theta d = Rox \cdot (1 \pm 0.05) \cdot \theta ox, Rd = \theta ox,(x=1,2,3,\ldots) \qquad ②$$

$$(2\pi \cdot h + \theta d) \cdot Rd = Rox \cdot (1 \pm 0.05) \cdot \theta ox,(h=1,2,3,\ldots),(x=1,2,3,\ldots),Rox=k \cdot Rd,(k=2,3,4,5,\ldots) \qquad ③$$

where, $\theta d$ is the angle of center of the interval B in the direction of reverse rotation of the supporting rollers along the +X axis of the (X, Y) coordinate system,
$\theta ox$ is the angle measured from the +Y axis of the image bearing body in the running direction of the intermediate transfer medium to the center of the interval A in the reverse rotational direction of the image bearing body,
Rox is the radius of the image bearing body, and
Rd is the radius of the supporting rollers.

3. The image forming apparatus of claim 2, wherein the +X axis is defined to be parallel with reference to the running direction of the intermediate transfer medium.

4. The image forming apparatus of claim 2, wherein, when the center of the interval B is positioned on the +X axis, the intermediate transfer medium receives a driving force in contact with the interval B.

5. The image forming apparatus of claim 2, wherein, when the center of the interval B is positioned on the +X axis, the speed change of intermediate transfer medium reaches maximum.

6. The image forming apparatus of claim 2, wherein the radius of the supporting roller is larger than the radius of the image bearing body by an integer multiple, and the image bearing body and the supporting roller are arranged to satisfy the first equation.

7. The image forming apparatus of claim 2, wherein, the radius of the image bearing body is equal to the radius of the supporting roller, and the image bearing body and the supporting roller are arranged to satisfy the second equation.

8. The image forming apparatus of claim 2, wherein, the radius of the image bearing body is larger than the radius of the supporting roller by an integer multiple, and the image bearing body and the supporting roller are arranged to satisfy the third equation.

9. The image forming apparatus of claim 2, further comprising
a driving unit for driving the image bearing body and the supporting roller,
and wherein the image bearing body has a driven coupler at one end to receive
a driving force in connection with the driving unit.

10. The image forming apparatus of claim 9, wherein the driven coupler has a positioning part for determining a position of engagement with the driving unit, and the driven couplers are engaged such that the interval A of the image bearing body is formed at a predetermined angle with respect to the positioning part.

11. The image forming apparatus of claim 1, further comprising at least a second image bearing body having a radius deviation along the direction of circumference, and having an interval C at a predetermined position with reference to the radius deviation; wherein at least two image bearing bodies are arranged such that interval A and interval C are in substantial registration along the transfer medium.

12. The image forming apparatus of claim 1, further comprising at least a second image bearing body, each of the image bearing bodies having a point of contact along the transfer medium, wherein at least two of the image bearing bodies are arranged to satisfy either:
  (a) a circumference of the supporting roller is an integer multiple of a distance between respective contact points of two of the image bearing bodies, or
  (b) the distance between respective contact points of two of the image bearing bodies is an integer multiple of the circumference of the supporting roller.

13. A method of assembling an image forming apparatus having at least one supporting roller for supporting a transfer medium and having a first radius deviation, and at least one image bearing body in contact with the transfer medium and having a second radius deviation, the method comprising:
  orienting the supporting roller and the image bearing body such that the first radius deviation is substantially in registration with the second radius deviation along the transfer medium.

14. The method of claim 13, wherein the step of orienting comprises using a jig to set the relative orientation of the supporting roller and the image bearing body.

15. The method of claim 13, wherein the supporting roller and image bearing body are each engaged to a respective driven coupler, the driven couplers adapted to be engaged to a driving coupler that receives a driving force, and wherein the orienting step compnses:
  using a jig having mating parts adapted to engage the respective driven couplers of the supporting roller and the image bearing body, to set the relative orientation of the supporting roller and the image bearing body.

16. The method of claim 15, wherein the driven couplers comprise positioning parts, and the jig mating parts are adapted to mate with the positioning parts; wherein the orienting step comprises:
  using the jig to set the position of the positioning parts.

17. A jig for assembling an image forming apparatus comprising:
  a first engagement part adapted to mate with a driven coupler of an image bearing body having a positioning part at a set position with respect to a radius deviation of the image bearing body; and
  a second engagement part adapted to mate with a driven coupler of a supporting roller having a positioning part at a set position with respect to a radius deviation of the supporting roller; wherein the first and second engagement parts are adapted to set the relative orientation of the image bearing body and the supporting roller such that the respective radius deviations are substantially in registration along a transfer medium.

18. A jig for assembling an image forming apparatus comprising:
  first and second engagement parts adapted to rotate together,
  the first engagement part adapted to mate with a driven coupler of an image bearing body having a positioning part at a set position with respect to a radius deviation of the image bearing body; and
  the second engagement part adapted to mate with a driven coupler of a supporting roller having a positioning part at a set position with respect to a radius deviation of the supporting roller;
  wherein the first and second engagement parts are adapted to set the relative orientation of the image bearing body and the supporting roller such that the respective radius deviations are substantially in registration along a transfer medium.

* * * * *